(12) United States Patent
Won et al.

(10) Patent No.: US 10,324,733 B2
(45) Date of Patent: Jun. 18, 2019

(54) SHUTDOWN NOTIFICATIONS

(71) Applicant: Microsoft Technology Licensing, LLC, Redmond, WA (US)

(72) Inventors: Sung Joon Won, Seattle, WA (US); Jiwon Choi, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 14/447,109

(22) Filed: Jul. 30, 2014

(65) Prior Publication Data

US 2016/0034284 A1 Feb. 4, 2016

(51) Int. Cl.
*G06F 1/24* (2006.01)
*G06F 9/00* (2006.01)
*G06F 9/4401* (2018.01)
*G06F 9/445* (2018.01)

(52) U.S. Cl.
CPC .......... *G06F 9/442* (2013.01); *G06F 9/44505* (2013.01)

(58) Field of Classification Search
CPC ............................ G06F 9/442; G06F 9/44505
USPC ........................................................ 713/100
See application file for complete search history.

(56) References Cited

U.S. PATENT DOCUMENTS

| | | |
|---|---|---|
| 578,325 A | 3/1897 | Fleming |
| 3,410,774 A | 11/1968 | Barson et al. |
| 3,542,453 A | 11/1970 | Kantor |
| 4,046,975 A | 9/1977 | Seeger, Jr. |
| 4,065,649 A | 12/1977 | Carter et al. |
| 4,086,451 A | 4/1978 | Boulanger |
| 4,237,347 A | 12/1980 | Burundukov et al. |
| 4,239,338 A | 12/1980 | Borrelli et al. |
| 4,243,861 A | 1/1981 | Strandwitz |

(Continued)

FOREIGN PATENT DOCUMENTS

| | | |
|---|---|---|
| CA | 990023 | 6/1976 |
| CN | 1440513 | 9/2003 |

(Continued)

OTHER PUBLICATIONS

"Corrected Notice of Allowance", U.S. Appl. No. 13/564,520, dated Aug. 14, 2015, 2 pages.

(Continued)

*Primary Examiner* — Robert A Cassity

(57) ABSTRACT

Shutdown notification techniques are described in which notifications associated with various applications and functionality of a device are presented in conjunction with a shutdown sequence. In one or more implementations, a shutdown of the device may be initiated automatically in response to low power conditions, device/application errors, restarts, or explicitly by a user. A notification system of a device may be configured to enable designation of particular notifications to show upon shutdown. Notifications to output at shutdown may be selected based upon various criteria including but not limited to selection based on a perceived importance, notification type, particular application(s), and/or particular user contacts. When a shutdown is initiated, a check is performed to determine whether any designated notifications are available. Then, available notifications may be exposed in various ways prior to complete shutdown, such as by showing the notifications as part of a user interface(s) for the shutdown sequence.

20 Claims, 10 Drawing Sheets

(56) References Cited

U.S. PATENT DOCUMENTS

| | | | |
|---|---|---|---|
| 4,251,791 | A | 2/1981 | Yanagisawa et al. |
| 4,279,021 | A | 7/1981 | See et al. |
| 4,294,507 | A | 10/1981 | Johnson |
| 4,302,648 | A | 11/1981 | Sado et al. |
| 4,317,013 | A | 2/1982 | Larson |
| 4,326,193 | A | 4/1982 | Markley et al. |
| 4,365,130 | A | 12/1982 | Christensen |
| 4,492,829 | A | 1/1985 | Rodrique |
| 4,527,021 | A | 7/1985 | Morikawa et al. |
| 4,559,426 | A | 12/1985 | Van Zeeland et al. |
| 4,576,436 | A | 3/1986 | Daniel |
| 4,577,822 | A | 3/1986 | Wilkerson |
| 4,588,187 | A | 5/1986 | Dell |
| 4,607,147 | A | 8/1986 | Ono et al. |
| 4,615,579 | A | 10/1986 | Whitehead |
| 4,643,604 | A | 2/1987 | Enrico |
| 4,651,133 | A | 3/1987 | Ganesan et al. |
| 4,735,394 | A | 4/1988 | Facco |
| 4,735,495 | A | 4/1988 | Henkes |
| 4,758,087 | A | 7/1988 | Hicks, Jr. |
| 4,799,752 | A | 1/1989 | Carome |
| 5,004,673 | A | 4/1991 | Vlannes |
| 5,008,497 | A | 4/1991 | Asher |
| 5,019,898 | A | 5/1991 | Chao et al. |
| 5,067,573 | A | 11/1991 | Uchida |
| 5,106,181 | A | 4/1992 | Rockwell, III |
| 5,111,223 | A | 5/1992 | Omura |
| 5,128,829 | A | 7/1992 | Loew |
| 5,220,521 | A | 6/1993 | Kikinis |
| 5,249,978 | A | 10/1993 | Gazda et al. |
| 5,283,559 | A | 2/1994 | Kalendra et al. |
| 5,305,389 | A | 4/1994 | Palmer |
| 5,313,535 | A | 5/1994 | Williams |
| 5,319,455 | A | 6/1994 | Hoarty et al. |
| 5,331,443 | A | 7/1994 | Stanisci |
| 5,339,382 | A | 8/1994 | Whitehead |
| 5,340,528 | A | 8/1994 | Machida et al. |
| 5,349,403 | A | 9/1994 | Lo |
| 5,363,075 | A | 11/1994 | Fanucchi |
| 5,375,076 | A | 12/1994 | Goodrich et al. |
| 5,406,415 | A | 4/1995 | Kelly |
| 5,480,118 | A | 1/1996 | Cross |
| 5,510,783 | A | 4/1996 | Findlater et al. |
| 5,546,271 | A | 8/1996 | Gut et al. |
| 5,548,477 | A | 8/1996 | Kumar et al. |
| 5,549,212 | A | 8/1996 | Kanoh et al. |
| 5,558,577 | A | 9/1996 | Kato |
| 5,576,981 | A | 11/1996 | Parker et al. |
| 5,618,232 | A | 4/1997 | Martin |
| 5,621,494 | A | 4/1997 | Kazumi et al. |
| 5,648,643 | A | 7/1997 | Knowles et al. |
| 5,681,220 | A | 10/1997 | Bertram et al. |
| 5,712,995 | A | 1/1998 | Cohn |
| 5,737,183 | A | 4/1998 | Kobayashi et al. |
| 5,745,376 | A | 4/1998 | Barker et al. |
| 5,748,114 | A | 5/1998 | Koehn |
| 5,750,939 | A | 5/1998 | Makinwa et al. |
| 5,771,042 | A | 6/1998 | Santos-Gomez |
| 5,772,903 | A | 6/1998 | Hirsch |
| 5,781,406 | A | 7/1998 | Hunte |
| 5,806,955 | A | 9/1998 | Parkyn, Jr. et al. |
| 5,807,175 | A | 9/1998 | Davis et al. |
| 5,808,713 | A | 9/1998 | Broer et al. |
| 5,818,361 | A | 10/1998 | Acevedo |
| 5,828,770 | A | 10/1998 | Leis et al. |
| 5,838,403 | A | 11/1998 | Jannson et al. |
| 5,842,027 | A | 11/1998 | Oprescu et al. |
| 5,850,135 | A | 12/1998 | Kuki et al. |
| 5,861,990 | A | 1/1999 | Tedesco |
| 5,874,697 | A | 2/1999 | Selker et al. |
| 5,880,725 | A | 3/1999 | Southgate |
| 5,905,485 | A | 5/1999 | Podoloff |
| 5,920,315 | A | 7/1999 | Santos-Gomez |
| 5,924,555 | A | 7/1999 | Sadamori et al. |
| 5,926,170 | A | 7/1999 | Oba |
| 5,929,946 | A | 7/1999 | Sharp et al. |
| 5,957,191 | A | 9/1999 | Okada et al. |
| 5,971,635 | A | 10/1999 | Wise |
| 5,973,677 | A | 10/1999 | Gibbons |
| 5,991,087 | A | 11/1999 | Rallison |
| 5,999,147 | A | 12/1999 | Teitel |
| 6,002,389 | A | 12/1999 | Kasser |
| 6,005,209 | A | 12/1999 | Burleson et al. |
| 6,012,714 | A | 1/2000 | Worley et al. |
| 6,040,823 | A | 3/2000 | Seffernick et al. |
| 6,044,717 | A | 4/2000 | Biegelsen et al. |
| 6,046,857 | A | 4/2000 | Morishima et al. |
| 6,061,644 | A | 5/2000 | Leis |
| 6,072,551 | A | 6/2000 | Jannson et al. |
| 6,108,200 | A | 8/2000 | Fullerton |
| 6,112,797 | A | 9/2000 | Colson et al. |
| 6,124,906 | A | 9/2000 | Kawada et al. |
| 6,128,007 | A | 10/2000 | Seybold |
| 6,129,444 | A | 10/2000 | Tognoni |
| 6,144,439 | A | 11/2000 | Carollo |
| 6,147,859 | A | 11/2000 | Abboud |
| 6,151,486 | A | 11/2000 | Holshouser et al. |
| 6,169,829 | B1 | 1/2001 | Laming et al. |
| 6,178,443 | B1 | 1/2001 | Lin |
| 6,181,852 | B1 | 1/2001 | Adams et al. |
| 6,188,391 | B1 | 2/2001 | Seely et al. |
| 6,228,926 | B1 | 5/2001 | Golumbic |
| 6,232,934 | B1 | 5/2001 | Heacock et al. |
| 6,234,820 | B1 | 5/2001 | Perino et al. |
| 6,254,105 | B1 | 7/2001 | Rinde et al. |
| 6,256,447 | B1 | 7/2001 | Laine |
| 6,264,787 | B1 | 7/2001 | Burbank |
| 6,278,490 | B1 | 8/2001 | Fukuda et al. |
| 6,279,060 | B1 | 8/2001 | Luke et al. |
| 6,300,986 | B1 | 10/2001 | Travis |
| 6,323,949 | B1 | 11/2001 | Lading et al. |
| 6,329,617 | B1 | 12/2001 | Burgess |
| 6,344,791 | B1 | 2/2002 | Armstrong |
| 6,353,503 | B1 | 3/2002 | Spitzer et al. |
| 6,366,440 | B1 | 4/2002 | Kung |
| 6,380,497 | B1 | 4/2002 | Hashimoto et al. |
| 6,385,641 | B1 | 5/2002 | Jiang |
| 6,417,892 | B1 | 7/2002 | Sharp et al. |
| 6,437,682 | B1 | 8/2002 | Vance |
| 6,441,362 | B1 | 8/2002 | Ogawa |
| 6,469,755 | B1 | 10/2002 | Adachi et al. |
| 6,483,580 | B1 | 11/2002 | Xu et al. |
| 6,506,983 | B1 | 1/2003 | Babb et al. |
| 6,511,378 | B1 | 1/2003 | Bhatt et al. |
| 6,529,179 | B1 | 3/2003 | Hashimoto et al. |
| 6,532,147 | B1 | 3/2003 | Christ, Jr. |
| 6,543,949 | B1 | 4/2003 | Ritchey et al. |
| 6,545,577 | B2 | 4/2003 | Yap |
| 6,553,165 | B1 | 4/2003 | Temkin et al. |
| 6,565,439 | B2 | 5/2003 | Shinohara et al. |
| 6,574,030 | B1 | 6/2003 | Mosier |
| 6,597,347 | B1 | 7/2003 | Yasutake |
| 6,600,121 | B1 | 7/2003 | Olodort et al. |
| 6,603,408 | B1 | 8/2003 | Gaba |
| 6,608,664 | B1 | 8/2003 | Hasegawa |
| 6,617,536 | B2 | 9/2003 | Kawaguchi |
| 6,648,485 | B1 | 11/2003 | Colgan et al. |
| 6,651,943 | B2 | 11/2003 | Cho et al. |
| 6,661,436 | B2 | 12/2003 | Barksdale et al. |
| 6,664,983 | B2 | 12/2003 | Ludolph |
| 6,681,333 | B1 | 1/2004 | Cho |
| 6,685,369 | B2 | 2/2004 | Lien |
| 6,695,273 | B2 | 2/2004 | Iguchi |
| 6,700,617 | B1 | 3/2004 | Hamamura et al. |
| 6,704,864 | B1 | 3/2004 | Philyaw |
| 6,721,019 | B2 | 4/2004 | Kono et al. |
| 6,725,318 | B1 | 4/2004 | Sherman et al. |
| 6,738,049 | B2 | 5/2004 | Kiser et al. |
| 6,774,888 | B1 | 8/2004 | Genduso |
| 6,776,546 | B2 | 8/2004 | Kraus et al. |
| 6,781,819 | B2 | 8/2004 | Yang et al. |
| 6,784,869 | B1 | 8/2004 | Clark et al. |
| 6,790,054 | B1 | 9/2004 | Boonsue |
| 6,792,328 | B2 | 9/2004 | Laughery et al. |

(56) References Cited

U.S. PATENT DOCUMENTS

| | | |
|---|---|---|
| 6,795,146 B2 | 9/2004 | Dozov et al. |
| 6,813,143 B2 | 11/2004 | Makela |
| 6,819,082 B2 | 11/2004 | Yang |
| 6,819,316 B2 | 11/2004 | Schulz et al. |
| 6,847,488 B2 | 1/2005 | Travis |
| 6,856,506 B2 | 2/2005 | Doherty et al. |
| 6,859,219 B1 | 2/2005 | Sall |
| 6,859,565 B2 | 2/2005 | Baron |
| 6,861,961 B2 | 3/2005 | Sandbach et al. |
| 6,864,573 B2 | 3/2005 | Robertson et al. |
| 6,870,671 B2 | 3/2005 | Travis |
| 6,877,134 B1 | 4/2005 | Fuller et al. |
| 6,880,132 B2 | 4/2005 | Uemura |
| 6,895,164 B2 | 5/2005 | Saccomanno |
| 6,898,315 B2 | 5/2005 | Guha |
| 6,901,403 B1 | 5/2005 | Bata et al. |
| 6,902,214 B2 | 6/2005 | Smith |
| 6,914,197 B2 | 7/2005 | Doherty et al. |
| 6,916,584 B2 | 7/2005 | Sreenivasan et al. |
| 6,922,333 B2 | 7/2005 | Weng et al. |
| 6,929,291 B2 | 8/2005 | Chen |
| 6,950,950 B2 | 9/2005 | Sawyers et al. |
| 6,970,957 B1 | 11/2005 | Oshins et al. |
| 6,976,799 B2 | 12/2005 | Kim et al. |
| 6,980,177 B2 | 12/2005 | Struyk |
| 7,002,624 B1 | 2/2006 | Uchino et al. |
| 7,006,080 B2 | 2/2006 | Gettemy |
| 7,007,238 B2 | 2/2006 | Glaser |
| 7,018,678 B2 | 3/2006 | Gronbeck et al. |
| 7,019,491 B2 | 3/2006 | Bozzone et al. |
| 7,020,848 B2 | 3/2006 | Rosenzweig et al. |
| 7,023,430 B2 | 4/2006 | Liu et al. |
| 7,025,908 B1 | 4/2006 | Hayashi et al. |
| 7,028,253 B1 | 4/2006 | Lieberman et al. |
| 7,031,894 B2 | 4/2006 | Niu et al. |
| 7,051,149 B2 | 5/2006 | Wang et al. |
| 7,068,496 B2 | 6/2006 | Wong et al. |
| 7,083,295 B1 | 8/2006 | Hanna |
| 7,091,436 B2 | 8/2006 | Serban |
| 7,095,404 B2 | 8/2006 | Vincent et al. |
| 7,099,005 B1 | 8/2006 | Fabrikant et al. |
| 7,099,149 B2 | 8/2006 | Krieger et al. |
| 7,101,048 B2 | 9/2006 | Travis |
| 7,102,683 B2 | 9/2006 | Perry et al. |
| 7,104,679 B2 | 9/2006 | Shin et al. |
| 7,106,222 B2 | 9/2006 | Ward et al. |
| 7,116,309 B1 | 10/2006 | Kimura et al. |
| 7,123,292 B1 | 10/2006 | Seeger et al. |
| 7,129,979 B1 | 10/2006 | Lee |
| 7,136,282 B1 | 11/2006 | Rebeske |
| 7,151,635 B2 | 12/2006 | Bidnyk et al. |
| 7,152,985 B2 | 12/2006 | Benitez et al. |
| 7,153,017 B2 | 12/2006 | Yamashita et al. |
| D535,292 S | 1/2007 | Shi et al. |
| 7,159,174 B2 | 1/2007 | Johnson et al. |
| 7,162,153 B2 | 1/2007 | Harter, Jr. et al. |
| 7,169,460 B1 | 1/2007 | Chen et al. |
| 7,181,699 B2 | 2/2007 | Morrow et al. |
| 7,189,362 B2 | 3/2007 | Nordin et al. |
| 7,194,662 B2 | 3/2007 | Do et al. |
| 7,196,758 B2 | 3/2007 | Crawford et al. |
| 7,199,554 B2 | 4/2007 | Kim et al. |
| 7,199,931 B2 | 4/2007 | Boettiger et al. |
| 7,201,508 B2 | 4/2007 | Misaras |
| 7,202,837 B2 | 4/2007 | Ihara |
| 7,212,709 B2 | 5/2007 | Hosoi |
| 7,212,723 B2 | 5/2007 | McLeod et al. |
| 7,213,323 B2 | 5/2007 | Baker et al. |
| 7,213,991 B2 | 5/2007 | Chapman et al. |
| 7,224,830 B2 | 5/2007 | Nefian et al. |
| 7,239,505 B2 | 7/2007 | Keely et al. |
| 7,260,221 B1 | 8/2007 | Atsmon |
| 7,260,823 B2 | 8/2007 | Schlack et al. |
| 7,261,827 B2 | 8/2007 | Ootsu et al. |
| 7,277,087 B2 | 10/2007 | Hill et al. |
| 7,277,880 B1 | 10/2007 | Sekine et al. |
| 7,283,353 B1 | 10/2007 | Jordan et al. |
| 7,287,738 B2 | 10/2007 | Pitlor |
| 7,295,720 B2 | 11/2007 | Raskar |
| 7,301,759 B2 | 11/2007 | Hsiung |
| 7,311,526 B2 | 12/2007 | Rohrbach et al. |
| 7,331,793 B2 | 2/2008 | Hernandez et al. |
| 7,333,690 B1 | 2/2008 | Peale et al. |
| 7,370,342 B2 | 5/2008 | Ismail et al. |
| 7,372,565 B1 | 5/2008 | Holden et al. |
| 7,374,312 B2 | 5/2008 | Feng et al. |
| 7,375,885 B2 | 5/2008 | Ijzerman et al. |
| 7,379,094 B2 | 5/2008 | Yoshida et al. |
| 7,400,377 B2 | 7/2008 | Evans et al. |
| 7,423,557 B2 | 9/2008 | Kang |
| 7,431,489 B2 | 10/2008 | Yeo et al. |
| 7,437,678 B2 | 10/2008 | Awada et al. |
| 7,443,443 B2 | 10/2008 | Raskar et al. |
| 7,447,934 B2 | 11/2008 | Dasari et al. |
| 7,457,108 B2 | 11/2008 | Ghosh |
| 7,467,948 B2 | 12/2008 | Lindberg et al. |
| 7,469,386 B2 | 12/2008 | Bear et al. |
| 7,486,165 B2 | 2/2009 | Ligtenberg et al. |
| 7,496,642 B2 | 2/2009 | Gill et al. |
| 7,499,037 B2 | 3/2009 | Lube |
| 7,499,216 B2 | 3/2009 | Niv et al. |
| 7,502,803 B2 | 3/2009 | Culter et al. |
| 7,503,684 B2 | 3/2009 | Ueno et al. |
| 7,509,042 B2 | 3/2009 | Mori et al. |
| 7,513,627 B2 | 4/2009 | Larson et al. |
| 7,515,143 B2 | 4/2009 | Keam et al. |
| 7,528,374 B2 | 5/2009 | Smitt et al. |
| 7,532,227 B2 | 5/2009 | Nakajima et al. |
| 7,542,052 B2 | 6/2009 | Solomon et al. |
| 7,558,594 B2 | 7/2009 | Wilson |
| 7,559,834 B1 | 7/2009 | York |
| 7,561,131 B2 | 7/2009 | Ijzerman et al. |
| 7,572,045 B2 | 8/2009 | Hoelen et al. |
| RE40,891 E | 9/2009 | Yasutake |
| 7,587,419 B2 | 9/2009 | Thorpe et al. |
| 7,612,882 B2 | 11/2009 | Wu et al. |
| 7,620,244 B1 | 11/2009 | Collier |
| 7,622,907 B2 | 11/2009 | Vranish |
| 7,626,582 B1 | 12/2009 | Nicolas et al. |
| 7,631,327 B2 | 12/2009 | Dempski et al. |
| 7,634,478 B2 | 12/2009 | Yang et al. |
| 7,636,921 B2 | 12/2009 | Louie |
| 7,639,876 B2 | 12/2009 | Clary et al. |
| 7,643,213 B2 | 1/2010 | Boettiger et al. |
| 7,656,392 B2 | 2/2010 | Bolender |
| 7,668,842 B2 | 2/2010 | LaChapelle et al. |
| 7,675,598 B2 | 3/2010 | Hong |
| 7,686,694 B2 | 3/2010 | Cole |
| 7,693,911 B2 | 4/2010 | Wories et al. |
| 7,705,558 B2 | 4/2010 | Silverman |
| 7,715,187 B2 | 5/2010 | Hotelling et al. |
| 7,716,003 B1 | 5/2010 | Wack et al. |
| 7,716,317 B2 | 5/2010 | Kumar et al. |
| 7,719,769 B2 | 5/2010 | Sugihara et al. |
| 7,722,792 B2 | 5/2010 | Uezaki et al. |
| 7,724,952 B2 | 5/2010 | Shum et al. |
| 7,728,923 B2 | 6/2010 | Kim et al. |
| 7,728,933 B2 | 6/2010 | Kim et al. |
| 7,729,493 B2 | 6/2010 | Krieger et al. |
| 7,730,113 B1 | 6/2010 | Payette et al. |
| 7,731,147 B2 | 6/2010 | Rha |
| 7,733,326 B1 | 6/2010 | Adiseshan |
| 7,773,076 B2 | 8/2010 | Pittel et al. |
| 7,773,121 B1 | 8/2010 | Huntsberger et al. |
| 7,774,155 B2 | 8/2010 | Sato et al. |
| 7,775,567 B2 | 8/2010 | Ligtenberg et al. |
| 7,777,972 B2 | 8/2010 | Chen et al. |
| 7,782,341 B2 | 8/2010 | Kothandaraman |
| 7,782,342 B2 | 8/2010 | Koh |
| 7,788,474 B2 | 8/2010 | Switzer et al. |
| 7,813,715 B2 | 10/2010 | McKillop et al. |
| 7,815,358 B2 | 10/2010 | Inditsky |
| 7,817,428 B2 | 10/2010 | Greer, Jr. et al. |
| 7,818,336 B1 | 10/2010 | Amidon et al. |

(56) References Cited

U.S. PATENT DOCUMENTS

| | | |
|---|---|---|
| 7,822,338 B2 | 10/2010 | Wernersson |
| 7,826,508 B2 | 11/2010 | Reid et al. |
| 7,844,985 B2 | 11/2010 | Hendricks et al. |
| 7,852,621 B2 | 12/2010 | Lin et al. |
| 7,855,716 B2 | 12/2010 | McCreary et al. |
| 7,865,639 B2 | 1/2011 | McCoy et al. |
| 7,871,811 B2 | 1/2011 | Fang et al. |
| 7,882,115 B2 | 2/2011 | Hirsch |
| 7,884,807 B2 | 2/2011 | Hovden et al. |
| 7,890,882 B1 | 2/2011 | Nelson |
| 7,893,921 B2 | 2/2011 | Sato |
| 7,898,797 B2 | 3/2011 | Fan et al. |
| 7,904,832 B2 | 3/2011 | Ubillos |
| 7,907,394 B2 | 3/2011 | Richardson et al. |
| 7,908,273 B2 | 3/2011 | DiMaria et al. |
| D636,397 S | 4/2011 | Green |
| 7,918,559 B2 | 4/2011 | Tesar |
| 7,927,654 B2 | 4/2011 | Hagood et al. |
| 7,928,964 B2 | 4/2011 | Kolmykov-Zotov et al. |
| 7,936,501 B2 | 5/2011 | Smith et al. |
| 7,944,520 B2 | 5/2011 | Ichioka et al. |
| 7,945,717 B2 | 5/2011 | Rivalsi |
| 7,957,082 B2 | 6/2011 | Mi et al. |
| 7,965,268 B2 | 6/2011 | Gass et al. |
| 7,966,184 B2 | 6/2011 | O'Conor et al. |
| 7,967,462 B2 | 6/2011 | Ogiro et al. |
| 7,970,246 B2 | 6/2011 | Travis et al. |
| 7,973,771 B2 | 7/2011 | Geaghan |
| 7,976,393 B2 | 7/2011 | Haga et al. |
| 7,978,281 B2 | 7/2011 | Vergith et al. |
| 7,987,490 B2 | 7/2011 | Ansari et al. |
| 8,010,663 B2 | 8/2011 | Firminger et al. |
| 8,014,644 B2 | 9/2011 | Morimoto et al. |
| 8,016,255 B2 | 9/2011 | Lin |
| 8,018,386 B2 | 9/2011 | Qi et al. |
| 8,018,579 B1 | 9/2011 | Krah |
| 8,026,904 B2 | 9/2011 | Westerman |
| 8,035,614 B2 | 10/2011 | Bell et al. |
| 8,035,624 B2 | 10/2011 | Bell et al. |
| 8,053,688 B2 | 11/2011 | Conzola et al. |
| 8,059,391 B2 | 11/2011 | Chang et al. |
| 8,065,624 B2 | 11/2011 | Morin et al. |
| 8,069,356 B2 | 11/2011 | Rathi et al. |
| RE42,992 E | 12/2011 | David |
| 8,077,160 B2 | 12/2011 | Land et al. |
| 8,090,885 B2 | 1/2012 | Callaghan et al. |
| 8,098,233 B2 | 1/2012 | Hotelling et al. |
| 8,102,362 B2 | 1/2012 | Ricks et al. |
| 8,108,430 B2 | 1/2012 | Wong et al. |
| 8,115,499 B2 | 2/2012 | Osoinach et al. |
| 8,115,718 B2 | 2/2012 | Chen et al. |
| 8,117,362 B2 | 2/2012 | Rodriguez et al. |
| 8,118,274 B2 | 2/2012 | McClure et al. |
| 8,118,681 B2 | 2/2012 | Mattice et al. |
| 8,120,166 B2 | 2/2012 | Koizumi et al. |
| 8,128,800 B2 | 3/2012 | Seo et al. |
| 8,130,203 B2 | 3/2012 | Westerman |
| 8,131,118 B1 | 3/2012 | Jing et al. |
| 8,143,983 B1 | 3/2012 | Lauder et al. |
| 8,149,219 B2 | 4/2012 | Lii et al. |
| 8,150,893 B2 | 4/2012 | Bohannon et al. |
| 8,154,524 B2 | 4/2012 | Wilson et al. |
| 8,162,282 B2 | 4/2012 | Hu et al. |
| 8,162,524 B2 | 4/2012 | Van Ostrand et al. |
| 8,165,988 B2 | 4/2012 | Shau et al. |
| D659,139 S | 5/2012 | Gengler |
| 8,169,185 B2 | 5/2012 | Partovi et al. |
| 8,169,421 B2 | 5/2012 | Wright et al. |
| 8,176,436 B2 | 5/2012 | Arend et al. |
| 8,179,236 B2 | 5/2012 | Weller et al. |
| 8,184,190 B2 | 5/2012 | Dosluoglu |
| 8,189,973 B2 | 5/2012 | Travis et al. |
| 8,200,704 B2 | 6/2012 | Petakov et al. |
| 8,216,074 B2 | 7/2012 | Sakuma |
| 8,223,489 B2 | 7/2012 | Shih |
| 8,229,509 B2 | 7/2012 | Paek et al. |
| 8,229,522 B2 | 7/2012 | Kim et al. |
| 8,231,099 B2 | 7/2012 | Chen |
| 8,244,667 B1 | 8/2012 | Weinberger et al. |
| 8,246,170 B2 | 8/2012 | Yamamoto et al. |
| 8,248,791 B2 | 8/2012 | Wang et al. |
| 8,255,708 B1 | 8/2012 | Zhang |
| 8,259,091 B2 | 9/2012 | Yeh |
| 8,264,310 B2 | 9/2012 | Lauder et al. |
| 8,267,368 B2 | 9/2012 | Torii et al. |
| 8,269,731 B2 | 9/2012 | Molne |
| 8,274,784 B2 | 9/2012 | Franz et al. |
| 8,279,589 B2 | 10/2012 | Kim |
| 8,280,861 B1 | 10/2012 | Park et al. |
| 8,285,810 B2 | 10/2012 | Svendsen et al. |
| 8,291,349 B1 | 10/2012 | Park et al. |
| 8,296,380 B1 | 10/2012 | Kelly et al. |
| 8,310,508 B2 | 11/2012 | Hekstra et al. |
| 8,310,768 B2 | 11/2012 | Lin et al. |
| 8,322,290 B1 | 12/2012 | Mignano |
| 8,325,416 B2 | 12/2012 | Lesage et al. |
| 8,332,402 B2 | 12/2012 | Forstall et al. |
| 8,341,037 B2 | 12/2012 | Bachman et al. |
| 8,342,857 B2 | 1/2013 | Palli et al. |
| 8,345,920 B2 | 1/2013 | Ferren et al. |
| 8,354,806 B2 | 1/2013 | Adrian et al. |
| 8,358,400 B2 | 1/2013 | Escuti |
| 8,362,975 B2 | 1/2013 | Uehara |
| 8,373,664 B2 | 2/2013 | Wright |
| 8,387,078 B2 | 2/2013 | Memmott |
| 8,389,078 B2 | 3/2013 | Lin et al. |
| 8,402,071 B2 | 3/2013 | Skillcorn |
| 8,416,206 B2 | 4/2013 | Carpendale et al. |
| 8,416,559 B2 | 4/2013 | Agata et al. |
| 8,434,019 B2 | 4/2013 | Nelson |
| 8,466,902 B2 | 6/2013 | Boer et al. |
| 8,472,119 B1 | 6/2013 | Kelly |
| 8,497,657 B2 | 7/2013 | Franks et al. |
| 8,498,100 B1 | 7/2013 | Whitt, III et al. |
| 8,513,547 B2 | 8/2013 | Ooi |
| 8,515,501 B2 | 8/2013 | Lee et al. |
| 8,526,993 B2 | 9/2013 | Bria et al. |
| 8,538,351 B2 | 9/2013 | Wilson et al. |
| 8,543,227 B1 | 9/2013 | Perek et al. |
| 8,548,608 B2 | 10/2013 | Perek et al. |
| 8,560,004 B1 | 10/2013 | Tsvetkov et al. |
| 8,560,678 B2 | 10/2013 | Tseng |
| 8,564,944 B2 | 10/2013 | Whitt, III et al. |
| 8,570,725 B2 | 10/2013 | Whitt, III et al. |
| 8,571,539 B1 | 10/2013 | Ranganathan et al. |
| 8,576,143 B1 | 11/2013 | Kelly |
| 8,582,206 B2 | 11/2013 | Travis |
| 8,589,341 B2 | 11/2013 | Golde et al. |
| 8,594,702 B2 | 11/2013 | Naaman et al. |
| 8,599,542 B1 | 12/2013 | Healey et al. |
| 8,600,120 B2 | 12/2013 | Gonion et al. |
| 8,600,526 B2 | 12/2013 | Nielsen et al. |
| 8,610,015 B2 | 12/2013 | Whitt et al. |
| 8,612,888 B2 | 12/2013 | Pennington et al. |
| 8,614,666 B2 | 12/2013 | Whitman et al. |
| 8,627,228 B2 | 1/2014 | Yosef et al. |
| 8,629,815 B2 | 1/2014 | Brin et al. |
| 8,646,999 B2 | 2/2014 | Shaw et al. |
| 8,654,030 B1 | 2/2014 | Mercer |
| 8,692,212 B1 | 4/2014 | Craft |
| 8,698,845 B2 | 4/2014 | Lemay |
| 8,699,215 B2 | 4/2014 | Whitt, III et al. |
| 8,700,931 B2 | 4/2014 | Gudlavenkatasiva et al. |
| 8,705,229 B2 | 4/2014 | Ashcraft et al. |
| 8,719,603 B2 | 5/2014 | Belesiu |
| 8,723,842 B2 | 5/2014 | Kaneda et al. |
| 8,724,302 B2 | 5/2014 | Whitt et al. |
| 8,738,090 B2 | 5/2014 | Kanda |
| 8,738,723 B1 | 5/2014 | Faaborg et al. |
| 8,745,513 B2 | 6/2014 | Crystal |
| 8,749,529 B2 | 6/2014 | Powell et al. |
| 8,756,510 B2 | 6/2014 | Bhumkar et al. |
| 8,769,431 B1 | 7/2014 | Prasad |
| 8,780,540 B2 | 7/2014 | Whitt, III et al. |

(56) References Cited

U.S. PATENT DOCUMENTS

| | | |
|---|---|---|
| 8,780,541 B2 | 7/2014 | Whitt et al. |
| 8,793,282 B2 | 7/2014 | Hedinsson et al. |
| 8,819,079 B2 | 8/2014 | Bush et al. |
| 8,843,744 B2 | 9/2014 | Sentinelli et al. |
| 8,854,799 B2 | 10/2014 | Whitt, III et al. |
| 8,873,227 B2 | 10/2014 | Whitt et al. |
| 8,964,379 B2 | 2/2015 | Rihn et al. |
| 8,990,255 B2 | 3/2015 | Metsatahti et al. |
| 9,001,028 B2 | 4/2015 | Baker |
| 9,003,162 B2 | 4/2015 | Lomet et al. |
| 9,075,566 B2 | 7/2015 | Whitt, III et al. |
| 9,158,384 B2 | 10/2015 | Whitt, III et al. |
| 9,176,901 B2 | 11/2015 | Whitt, III et al. |
| 9,268,373 B2 | 2/2016 | Whitt et al. |
| 9,269,150 B1 | 2/2016 | Seitz |
| 9,304,235 B2 | 4/2016 | Sainiema et al. |
| 9,354,748 B2 | 5/2016 | Lutian et al. |
| 9,514,211 B2 | 12/2016 | Sengupta et al. |
| 9,678,542 B2 | 6/2017 | Whitt et al. |
| 9,787,576 B2 | 10/2017 | Leeb et al. |
| 9,824,808 B2 | 11/2017 | Rihn et al. |
| 9,836,464 B2 | 12/2017 | Larsen et al. |
| 2001/0020455 A1 | 2/2001 | Schifferl |
| 2001/0023818 A1 | 9/2001 | Masaru et al. |
| 2001/0035859 A1 | 11/2001 | Kiser et al. |
| 2002/0000977 A1 | 1/2002 | Vranish |
| 2002/0035455 A1 | 3/2002 | Niu et al. |
| 2002/0038196 A1 | 3/2002 | Johnson et al. |
| 2002/0044216 A1 | 4/2002 | Cha |
| 2002/0103616 A1 | 8/2002 | Park et al. |
| 2002/0113882 A1 | 8/2002 | Pollard et al. |
| 2002/0126445 A1 | 9/2002 | Minaguchi et al. |
| 2002/0134828 A1 | 9/2002 | Sandbach et al. |
| 2002/0138772 A1* | 9/2002 | Crawford .................. G06F 1/30 713/300 |
| 2002/0154099 A1 | 10/2002 | Oh |
| 2002/0163510 A1 | 11/2002 | Williams et al. |
| 2002/0171939 A1 | 11/2002 | Song |
| 2002/0190823 A1 | 12/2002 | Yap |
| 2002/0191028 A1 | 12/2002 | Senechalle et al. |
| 2003/0016282 A1 | 1/2003 | Koizumi |
| 2003/0021404 A1 | 1/2003 | Wengrovitz |
| 2003/0028688 A1 | 2/2003 | Tiphane et al. |
| 2003/0036365 A1 | 2/2003 | Kuroda |
| 2003/0044215 A1 | 3/2003 | Monney et al. |
| 2003/0108720 A1 | 6/2003 | Kashino |
| 2003/0128285 A1 | 7/2003 | Itoh |
| 2003/0132916 A1 | 7/2003 | Kramer |
| 2003/0137706 A1 | 7/2003 | Rmanujam et al. |
| 2003/0148740 A1 | 8/2003 | Yau et al. |
| 2003/0163611 A1 | 8/2003 | Nagao |
| 2003/0165017 A1 | 9/2003 | Amitai |
| 2003/0179453 A1 | 9/2003 | Mori et al. |
| 2003/0195937 A1 | 10/2003 | Kircher, Jr. |
| 2003/0197687 A1 | 10/2003 | Shetter |
| 2003/0197806 A1 | 10/2003 | Perry et al. |
| 2003/0198008 A1 | 10/2003 | Leapman et al. |
| 2003/0204698 A1 | 10/2003 | Sachedina et al. |
| 2004/0005184 A1 | 1/2004 | Kim et al. |
| 2004/0024580 A1 | 2/2004 | Salmonsen et al. |
| 2004/0042724 A1 | 3/2004 | Gombert et al. |
| 2004/0048941 A1 | 3/2004 | Raffel et al. |
| 2004/0056843 A1 | 3/2004 | Lin et al. |
| 2004/0095333 A1 | 5/2004 | Morag et al. |
| 2004/0100457 A1 | 5/2004 | Mandle |
| 2004/0115994 A1 | 6/2004 | Wulff et al. |
| 2004/0139169 A1 | 7/2004 | O'Brien et al. |
| 2004/0141637 A1 | 7/2004 | Bacus et al. |
| 2004/0151466 A1 | 8/2004 | Crossman-Bosworth et al. |
| 2004/0156168 A1 | 8/2004 | LeVasseur et al. |
| 2004/0162830 A1 | 8/2004 | Shirwadkar et al. |
| 2004/0169641 A1 | 9/2004 | Bean et al. |
| 2004/0174709 A1 | 9/2004 | Buelow, II et al. |
| 2004/0189822 A1 | 9/2004 | Shimada |
| 2004/0212553 A1 | 10/2004 | Wang et al. |
| 2004/0212598 A1 | 10/2004 | Kraus et al. |
| 2004/0212601 A1 | 10/2004 | Cake et al. |
| 2004/0258924 A1 | 12/2004 | Berger et al. |
| 2004/0268000 A1 | 12/2004 | Barker et al. |
| 2005/0002073 A1 | 1/2005 | Nakamura et al. |
| 2005/0022135 A1 | 1/2005 | de Waal |
| 2005/0030728 A1 | 2/2005 | Kawashima et al. |
| 2005/0052831 A1 | 3/2005 | Chen |
| 2005/0055498 A1 | 3/2005 | Beckert et al. |
| 2005/0057515 A1 | 3/2005 | Bathiche |
| 2005/0057521 A1 | 3/2005 | Aull et al. |
| 2005/0059489 A1 | 3/2005 | Kim |
| 2005/0068460 A1 | 3/2005 | Lin |
| 2005/0094895 A1 | 5/2005 | Baron |
| 2005/0099400 A1 | 5/2005 | Lee |
| 2005/0100272 A1 | 5/2005 | Gilman |
| 2005/0100690 A1 | 5/2005 | Mayer et al. |
| 2005/0134717 A1 | 6/2005 | Misawa |
| 2005/0146512 A1 | 7/2005 | Hill et al. |
| 2005/0231156 A1 | 10/2005 | Yan |
| 2005/0236848 A1 | 10/2005 | Kim et al. |
| 2005/0240949 A1 | 10/2005 | Liu et al. |
| 2005/0246352 A1 | 11/2005 | Moore et al. |
| 2005/0264653 A1 | 12/2005 | Starkweather et al. |
| 2005/0264988 A1 | 12/2005 | Nicolosi |
| 2005/0265035 A1 | 12/2005 | Brass et al. |
| 2005/0285703 A1 | 12/2005 | Wheeler et al. |
| 2006/0007644 A1 | 1/2006 | Huilgol et al. |
| 2006/0010400 A1 | 1/2006 | Dehlin et al. |
| 2006/0020903 A1 | 1/2006 | Wang et al. |
| 2006/0028400 A1 | 2/2006 | Lapstun et al. |
| 2006/0028838 A1 | 2/2006 | Imade |
| 2006/0030295 A1 | 2/2006 | Adams et al. |
| 2006/0049993 A1 | 3/2006 | Lin et al. |
| 2006/0053417 A1* | 3/2006 | Henderson .............. G06F 9/442 717/168 |
| 2006/0061597 A1 | 3/2006 | Hui |
| 2006/0070384 A1 | 4/2006 | Ertel |
| 2006/0080401 A1 | 4/2006 | Gill et al. |
| 2006/0082973 A1 | 4/2006 | Egbert et al. |
| 2006/0083004 A1 | 4/2006 | Cok |
| 2006/0085658 A1 | 4/2006 | Allen et al. |
| 2006/0102914 A1 | 5/2006 | Smits et al. |
| 2006/0103633 A1 | 5/2006 | Gioeli |
| 2006/0125799 A1 | 6/2006 | Hillis et al. |
| 2006/0132423 A1 | 6/2006 | Travis |
| 2006/0132806 A1 | 6/2006 | Shchegrov et al. |
| 2006/0132914 A1 | 6/2006 | Weiss et al. |
| 2006/0146573 A1 | 7/2006 | Iwauchi et al. |
| 2006/0154725 A1 | 7/2006 | Glaser et al. |
| 2006/0155723 A1 | 7/2006 | Kumar et al. |
| 2006/0156415 A1 | 7/2006 | Rubinstein et al. |
| 2006/0181514 A1 | 8/2006 | Newman |
| 2006/0181521 A1 | 8/2006 | Perreault et al. |
| 2006/0183331 A1 | 8/2006 | Hofmann |
| 2006/0187216 A1 | 8/2006 | Trent, Jr. et al. |
| 2006/0195522 A1 | 8/2006 | Miyazaki |
| 2006/0197755 A1 | 9/2006 | Bawany |
| 2006/0215244 A1 | 9/2006 | Yosha et al. |
| 2006/0221448 A1 | 10/2006 | Nivon et al. |
| 2006/0227393 A1 | 10/2006 | Herloski |
| 2006/0228073 A1 | 10/2006 | Mukawa et al. |
| 2006/0235548 A1 | 10/2006 | Gaudette |
| 2006/0238510 A1 | 10/2006 | Panotopoulos et al. |
| 2006/0238550 A1 | 10/2006 | Page |
| 2006/0250381 A1 | 11/2006 | Geaghan |
| 2006/0254042 A1 | 11/2006 | Chou et al. |
| 2006/0256738 A1 | 11/2006 | Kenoyer et al. |
| 2006/0261778 A1 | 11/2006 | Elizalde Rodarte |
| 2006/0262772 A1 | 11/2006 | Guichard et al. |
| 2006/0271691 A1 | 11/2006 | Jacobs et al. |
| 2006/0279501 A1 | 12/2006 | Lu et al. |
| 2007/0002587 A1 | 1/2007 | Miyashita |
| 2007/0003267 A1 | 1/2007 | Shibutani |
| 2007/0005334 A1 | 1/2007 | Salmonsen |
| 2007/0013682 A1 | 1/2007 | Lin et al. |
| 2007/0019181 A1 | 1/2007 | Sinclair et al. |
| 2007/0023703 A1 | 2/2007 | Sunaoshi et al. |
| 2007/0024742 A1 | 2/2007 | Raskar et al. |

(56) References Cited

U.S. PATENT DOCUMENTS

| | | |
|---|---|---|
| 2007/0033225 A1 | 2/2007 | Davis |
| 2007/0046625 A1 | 3/2007 | Yee |
| 2007/0047221 A1 | 3/2007 | Park |
| 2007/0051792 A1 | 3/2007 | Wheeler et al. |
| 2007/0056385 A1 | 3/2007 | Lorenz |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0076434 A1 | 4/2007 | Uehara et al. |
| 2007/0081091 A1 | 4/2007 | Pan et al. |
| 2007/0114967 A1 | 5/2007 | Peng |
| 2007/0116929 A1 | 5/2007 | Fujimori et al. |
| 2007/0126393 A1 | 6/2007 | Bersenev |
| 2007/0133156 A1 | 6/2007 | Ligtenberg et al. |
| 2007/0138806 A1 | 6/2007 | Ligtenberg et al. |
| 2007/0145945 A1 | 6/2007 | McGinley et al. |
| 2007/0161262 A1 | 7/2007 | Lloyd |
| 2007/0176902 A1 | 8/2007 | Newman et al. |
| 2007/0182663 A1 | 8/2007 | Biech |
| 2007/0182722 A1 | 8/2007 | Hotelling et al. |
| 2007/0185590 A1 | 8/2007 | Reindel et al. |
| 2007/0188478 A1 | 8/2007 | Silverstein et al. |
| 2007/0189667 A1 | 8/2007 | Wakita et al. |
| 2007/0194752 A1 | 8/2007 | McBurney |
| 2007/0200830 A1 | 8/2007 | Yamamoto |
| 2007/0201246 A1 | 8/2007 | Yeo et al. |
| 2007/0201859 A1 | 8/2007 | Sarrat |
| 2007/0208687 A1 | 9/2007 | O'Conor et al. |
| 2007/0214180 A1 | 9/2007 | Crawford |
| 2007/0214228 A1 | 9/2007 | Horvitz et al. |
| 2007/0220708 A1 | 9/2007 | Lewis |
| 2007/0222766 A1 | 9/2007 | Bolender |
| 2007/0233803 A1* | 10/2007 | Stienhans ............... G06F 9/442 709/208 |
| 2007/0234420 A1 | 10/2007 | Novotney et al. |
| 2007/0236408 A1 | 10/2007 | Yamaguchi et al. |
| 2007/0236467 A1 | 10/2007 | Marshall et al. |
| 2007/0236475 A1 | 10/2007 | Wherry |
| 2007/0236873 A1 | 10/2007 | Yukawa et al. |
| 2007/0247338 A1 | 10/2007 | Marchetto |
| 2007/0247432 A1 | 10/2007 | Oakley |
| 2007/0247800 A1 | 10/2007 | Smith et al. |
| 2007/0250788 A1 | 10/2007 | Rigolet |
| 2007/0253545 A1 | 11/2007 | Chatterjee et al. |
| 2007/0257821 A1 | 11/2007 | Son et al. |
| 2007/0260892 A1 | 11/2007 | Paul et al. |
| 2007/0263119 A1 | 11/2007 | Shum et al. |
| 2007/0268200 A1* | 11/2007 | Fuller .................. G06F 3/14 345/1.1 |
| 2007/0271527 A1 | 11/2007 | Paas et al. |
| 2007/0274094 A1 | 11/2007 | Schultz et al. |
| 2007/0274095 A1 | 11/2007 | Destain |
| 2007/0274099 A1 | 11/2007 | Tai et al. |
| 2007/0283179 A1 | 12/2007 | Burnett et al. |
| 2007/0288478 A1 | 12/2007 | DiMaria et al. |
| 2008/0001924 A1 | 1/2008 | de los Reyes et al. |
| 2008/0002350 A1 | 1/2008 | Farrugia |
| 2008/0005348 A1 | 1/2008 | Kosiba et al. |
| 2008/0005423 A1 | 1/2008 | Jacobs et al. |
| 2008/0013809 A1 | 1/2008 | Zhu et al. |
| 2008/0014534 A1 | 1/2008 | Barwicz et al. |
| 2008/0018611 A1 | 1/2008 | Serban et al. |
| 2008/0019150 A1 | 1/2008 | Park et al. |
| 2008/0019684 A1 | 1/2008 | Shyu et al. |
| 2008/0025350 A1 | 1/2008 | Arbore et al. |
| 2008/0030937 A1 | 2/2008 | Russo et al. |
| 2008/0037284 A1 | 2/2008 | Rudisill |
| 2008/0040578 A1 | 2/2008 | Kang et al. |
| 2008/0048654 A1 | 2/2008 | Takahashi et al. |
| 2008/0049704 A1 | 2/2008 | Witteman et al. |
| 2008/0053222 A1 | 3/2008 | Ehrensvard et al. |
| 2008/0059535 A1 | 3/2008 | Lindsley et al. |
| 2008/0059888 A1 | 3/2008 | Dunko |
| 2008/0061565 A1 | 3/2008 | Lee et al. |
| 2008/0068451 A1 | 3/2008 | Hyatt |
| 2008/0074398 A1 | 3/2008 | Wright |
| 2008/0084499 A1 | 4/2008 | Kisacanin et al. |
| 2008/0088593 A1 | 4/2008 | Smoot |
| 2008/0090626 A1 | 4/2008 | Griffin et al. |
| 2008/0092054 A1 | 4/2008 | Bhumkar et al. |
| 2008/0104437 A1 | 5/2008 | Lee |
| 2008/0106592 A1 | 5/2008 | Mikami |
| 2008/0111518 A1 | 5/2008 | Toya |
| 2008/0120571 A1 | 5/2008 | Chang et al. |
| 2008/0122803 A1 | 5/2008 | Izadi et al. |
| 2008/0126989 A1 | 5/2008 | Flores et al. |
| 2008/0150913 A1 | 6/2008 | Bell et al. |
| 2008/0151478 A1 | 6/2008 | Chern |
| 2008/0158185 A1 | 7/2008 | Westerman |
| 2008/0158189 A1 | 7/2008 | Kim |
| 2008/0167832 A1 | 7/2008 | Soss |
| 2008/0174570 A1 | 7/2008 | Jobs et al. |
| 2008/0177185 A1 | 7/2008 | Nakao et al. |
| 2008/0179507 A2 | 7/2008 | Han |
| 2008/0180411 A1 | 7/2008 | Solomon et al. |
| 2008/0182622 A1 | 7/2008 | Makarowski et al. |
| 2008/0186660 A1 | 8/2008 | Yang |
| 2008/0186683 A1 | 8/2008 | Ligtenberg et al. |
| 2008/0189303 A1 | 8/2008 | Bush et al. |
| 2008/0203277 A1 | 8/2008 | Warszauer et al. |
| 2008/0211787 A1 | 9/2008 | Nakao et al. |
| 2008/0219025 A1 | 9/2008 | Spitzer et al. |
| 2008/0225205 A1 | 9/2008 | Travis |
| 2008/0228969 A1 | 9/2008 | Cheah et al. |
| 2008/0232061 A1 | 9/2008 | Wang et al. |
| 2008/0233326 A1 | 9/2008 | Hegemier et al. |
| 2008/0238884 A1 | 10/2008 | Harish |
| 2008/0253822 A1 | 10/2008 | Matias |
| 2008/0258679 A1 | 10/2008 | Manico et al. |
| 2008/0278269 A1 | 11/2008 | Ramirez et al. |
| 2008/0297878 A1 | 12/2008 | Brown et al. |
| 2008/0303479 A1 | 12/2008 | Park et al. |
| 2008/0309636 A1 | 12/2008 | Feng et al. |
| 2008/0316002 A1 | 12/2008 | Brunet et al. |
| 2008/0316768 A1 | 12/2008 | Travis |
| 2008/0320190 A1 | 12/2008 | Lydon et al. |
| 2009/0002218 A1 | 1/2009 | Rigazio et al. |
| 2009/0007001 A1 | 1/2009 | Morin et al. |
| 2009/0009476 A1 | 1/2009 | Daley, III |
| 2009/0013275 A1 | 1/2009 | May et al. |
| 2009/0033623 A1 | 2/2009 | Lin |
| 2009/0049194 A1 | 2/2009 | Csaszar et al. |
| 2009/0065267 A1 | 3/2009 | Sato |
| 2009/0073060 A1 | 3/2009 | Shimasaki et al. |
| 2009/0073957 A1 | 3/2009 | Newland et al. |
| 2009/0079639 A1 | 3/2009 | Hotta et al. |
| 2009/0083562 A1 | 3/2009 | Park et al. |
| 2009/0084757 A1 | 4/2009 | Erokhin et al. |
| 2009/0096738 A1 | 4/2009 | Chen et al. |
| 2009/0102419 A1 | 4/2009 | Gwon et al. |
| 2009/0113301 A1 | 4/2009 | Fisher et al. |
| 2009/0127005 A1 | 5/2009 | Zachut et al. |
| 2009/0134838 A1 | 5/2009 | Raghuprasad |
| 2009/0135142 A1 | 5/2009 | Fu et al. |
| 2009/0140985 A1 | 6/2009 | Liu |
| 2009/0142020 A1 | 6/2009 | Van Ostrand et al. |
| 2009/0144642 A1 | 6/2009 | Crystal |
| 2009/0146975 A1 | 6/2009 | Chang |
| 2009/0146992 A1 | 6/2009 | Fukunaga et al. |
| 2009/0147102 A1 | 6/2009 | Kakinuma et al. |
| 2009/0158168 A1 | 6/2009 | Heo et al. |
| 2009/0158186 A1 | 6/2009 | Bonev |
| 2009/0161385 A1 | 6/2009 | Parker et al. |
| 2009/0163147 A1 | 6/2009 | Steigerwald et al. |
| 2009/0160944 A1 | 7/2009 | Trevelyan et al. |
| 2009/0167728 A1 | 7/2009 | Geaghan et al. |
| 2009/0167930 A1 | 7/2009 | Safaee-Rad et al. |
| 2009/0182901 A1 | 7/2009 | Callaghan et al. |
| 2009/0189974 A1 | 7/2009 | Deering |
| 2009/0193024 A1 | 7/2009 | Dhananjaya |
| 2009/0195497 A1 | 8/2009 | Fitzgerald et al. |
| 2009/0196510 A1 | 8/2009 | Gokturk et al. |
| 2009/0198581 A1 | 8/2009 | Lidestri |
| 2009/0199128 A1 | 8/2009 | Matthews et al. |

(56) References Cited

U.S. PATENT DOCUMENTS

| | | |
|---|---|---|
| 2009/0200384 A1 | 8/2009 | Masalkar |
| 2009/0219250 A1 | 9/2009 | Ure |
| 2009/0224416 A1 | 9/2009 | Laakkonen et al. |
| 2009/0231275 A1 | 9/2009 | Odgers |
| 2009/0231465 A1 | 9/2009 | Senba |
| 2009/0235203 A1 | 9/2009 | Iizuka |
| 2009/0246707 A1 | 10/2009 | Li et al. |
| 2009/0251008 A1 | 10/2009 | Sugaya |
| 2009/0251623 A1 | 10/2009 | Koyama |
| 2009/0259865 A1 | 10/2009 | Sheynblat et al. |
| 2009/0262492 A1 | 10/2009 | Whitchurch et al. |
| 2009/0265416 A1 | 10/2009 | Svendsen et al. |
| 2009/0265670 A1 | 10/2009 | Kim et al. |
| 2009/0268386 A1 | 10/2009 | Lin |
| 2009/0284613 A1 | 11/2009 | Kim |
| 2009/0285491 A1 | 11/2009 | Ravenscroft et al. |
| 2009/0296328 A1 | 12/2009 | Lin et al. |
| 2009/0296331 A1 | 12/2009 | Choy |
| 2009/0303137 A1 | 12/2009 | Kusaka et al. |
| 2009/0303204 A1 | 12/2009 | Nasiri et al. |
| 2009/0316072 A1 | 12/2009 | Okumura et al. |
| 2009/0320244 A1 | 12/2009 | Lin |
| 2009/0321490 A1 | 12/2009 | Groene et al. |
| 2009/0322278 A1 | 12/2009 | Franks et al. |
| 2010/0001963 A1 | 1/2010 | Doray et al. |
| 2010/0005168 A1 | 1/2010 | Williams et al. |
| 2010/0005397 A1 | 1/2010 | Lanahan et al. |
| 2010/0013319 A1 | 1/2010 | Kamiyama et al. |
| 2010/0018858 A1 | 1/2010 | Seki |
| 2010/0021108 A1 | 1/2010 | Kang et al. |
| 2010/0023691 A1 | 1/2010 | Shin |
| 2010/0026656 A1 | 2/2010 | Hotelling et al. |
| 2010/0033491 A1* | 2/2010 | Sugamata .............. G09G 3/344 345/530 |
| 2010/0038821 A1 | 2/2010 | Jenkins et al. |
| 2010/0042648 A1 | 2/2010 | Cannon et al. |
| 2010/0045540 A1 | 2/2010 | Lai et al. |
| 2010/0045609 A1 | 2/2010 | Do et al. |
| 2010/0045633 A1 | 2/2010 | Gettemy |
| 2010/0051356 A1 | 3/2010 | Stern et al. |
| 2010/0051432 A1 | 3/2010 | Lin et al. |
| 2010/0053534 A1 | 3/2010 | Hsieh et al. |
| 2010/0053771 A1 | 3/2010 | Travis et al. |
| 2010/0058231 A1 | 3/2010 | Duarte et al. |
| 2010/0072351 A1 | 3/2010 | Mahowald |
| 2010/0074291 A1 | 3/2010 | Nakamura |
| 2010/0075517 A1 | 3/2010 | Ni et al. |
| 2010/0077237 A1 | 3/2010 | Sawyers |
| 2010/0079865 A1 | 4/2010 | Saarikko et al. |
| 2010/0081377 A1 | 4/2010 | Chatterjee et al. |
| 2010/0085321 A1 | 4/2010 | Pundsack |
| 2010/0094934 A1 | 4/2010 | Svendsen et al. |
| 2010/0102182 A1 | 4/2010 | Lin |
| 2010/0102206 A1 | 4/2010 | Cazaux et al. |
| 2010/0103112 A1 | 4/2010 | Yoo et al. |
| 2010/0103131 A1 | 4/2010 | Segal et al. |
| 2010/0103332 A1 | 4/2010 | Li et al. |
| 2010/0123686 A1 | 5/2010 | Klinghult et al. |
| 2010/0133398 A1 | 6/2010 | Chiu et al. |
| 2010/0135036 A1 | 6/2010 | Matsuba et al. |
| 2010/0138809 A1 | 6/2010 | Shenfield et al. |
| 2010/0142130 A1 | 6/2010 | Wang et al. |
| 2010/0149073 A1 | 6/2010 | Chaum et al. |
| 2010/0149111 A1 | 6/2010 | Olien |
| 2010/0149117 A1 | 6/2010 | Chien et al. |
| 2010/0149134 A1 | 6/2010 | Westerman et al. |
| 2010/0149377 A1 | 6/2010 | Shintani et al. |
| 2010/0154171 A1 | 6/2010 | Lombardi et al. |
| 2010/0156798 A1 | 6/2010 | Archer |
| 2010/0157085 A1 | 6/2010 | Sasaki |
| 2010/0159995 A1 | 6/2010 | Stallings et al. |
| 2010/0161522 A1 | 6/2010 | Tirpak et al. |
| 2010/0162109 A1 | 6/2010 | Chatterjee et al. |
| 2010/0164857 A1 | 7/2010 | Liu et al. |
| 2010/0164897 A1 | 7/2010 | Morin et al. |
| 2010/0171891 A1 | 7/2010 | Kaji et al. |
| 2010/0174421 A1 | 7/2010 | Tsai et al. |
| 2010/0177388 A1 | 7/2010 | Cohen et al. |
| 2010/0180063 A1 | 7/2010 | Ananny et al. |
| 2010/0188299 A1 | 7/2010 | Rinehart et al. |
| 2010/0188338 A1 | 7/2010 | Longe |
| 2010/0191783 A1 | 7/2010 | Mason |
| 2010/0191827 A1 | 7/2010 | Martin |
| 2010/0201953 A1 | 8/2010 | Freeman et al. |
| 2010/0205178 A1 | 8/2010 | Bush et al. |
| 2010/0206614 A1 | 8/2010 | Park et al. |
| 2010/0206644 A1 | 8/2010 | Yeh |
| 2010/0211575 A1 | 8/2010 | Collins et al. |
| 2010/0214214 A1 | 8/2010 | Corson et al. |
| 2010/0214257 A1 | 8/2010 | Wussler et al. |
| 2010/0222110 A1 | 9/2010 | Kim et al. |
| 2010/0231498 A1 | 9/2010 | Large et al. |
| 2010/0231510 A1 | 9/2010 | Sampsell et al. |
| 2010/0231556 A1 | 9/2010 | Mines et al. |
| 2010/0235546 A1 | 9/2010 | Terlizzi et al. |
| 2010/0237970 A1 | 9/2010 | Liu |
| 2010/0238075 A1 | 9/2010 | Pourseyed |
| 2010/0238138 A1 | 9/2010 | Goertz et al. |
| 2010/0238320 A1 | 9/2010 | Washisu |
| 2010/0238620 A1 | 9/2010 | Fish |
| 2010/0245221 A1 | 9/2010 | Khan |
| 2010/0245289 A1 | 9/2010 | Svajda |
| 2010/0250988 A1 | 9/2010 | Okuda et al. |
| 2010/0262582 A1 | 10/2010 | Garcia-Ascanio |
| 2010/0271771 A1 | 10/2010 | Wu et al. |
| 2010/0274932 A1 | 10/2010 | Kose |
| 2010/0279768 A1 | 11/2010 | Huang et al. |
| 2010/0281382 A1 | 11/2010 | Meaney et al. |
| 2010/0282953 A1 | 11/2010 | Tam |
| 2010/0289457 A1 | 11/2010 | Onnerud et al. |
| 2010/0291331 A1 | 11/2010 | Schaefer |
| 2010/0295812 A1 | 11/2010 | Burns et al. |
| 2010/0296163 A1 | 11/2010 | Saarikko |
| 2010/0299417 A1 | 11/2010 | Austin et al. |
| 2010/0299642 A1 | 11/2010 | Merrell et al. |
| 2010/0299697 A1 | 11/2010 | Austin et al. |
| 2010/0302378 A1 | 12/2010 | Marks et al. |
| 2010/0304793 A1 | 12/2010 | Kim |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0315774 A1 | 12/2010 | Walker et al. |
| 2010/0321301 A1 | 12/2010 | Casparian et al. |
| 2010/0321339 A1 | 12/2010 | Kimmel |
| 2010/0321877 A1 | 12/2010 | Moser |
| 2010/0324457 A1 | 12/2010 | Bean et al. |
| 2010/0325155 A1 | 12/2010 | Skinner et al. |
| 2010/0331059 A1 | 12/2010 | Apgar et al. |
| 2010/0332456 A1 | 12/2010 | Prahlad et al. |
| 2011/0002577 A1 | 1/2011 | Van Ostrand |
| 2011/0007047 A1 | 1/2011 | Fujioka et al. |
| 2011/0012866 A1 | 1/2011 | Keam |
| 2011/0012873 A1 | 1/2011 | Prest et al. |
| 2011/0018799 A1 | 1/2011 | Lin |
| 2011/0019123 A1 | 1/2011 | Prest et al. |
| 2011/0031287 A1 | 2/2011 | Le Gette et al. |
| 2011/0032215 A1 | 2/2011 | Sirotich et al. |
| 2011/0036965 A1 | 2/2011 | Zhang et al. |
| 2011/0037721 A1 | 2/2011 | Cranfill et al. |
| 2011/0038049 A1 | 2/2011 | Vallius et al. |
| 2011/0043479 A1 | 2/2011 | van Aerle et al. |
| 2011/0043990 A1 | 2/2011 | Mickey et al. |
| 2011/0044579 A1 | 2/2011 | Travis et al. |
| 2011/0044582 A1 | 2/2011 | Travis et al. |
| 2011/0050946 A1 | 3/2011 | Lee et al. |
| 2011/0055407 A1 | 3/2011 | Lydon et al. |
| 2011/0055434 A1* | 3/2011 | Pyers .................. G06F 1/3203 710/14 |
| 2011/0055765 A1 | 3/2011 | Neubrand et al. |
| 2011/0057899 A1 | 3/2011 | Sleeman et al. |
| 2011/0060926 A1 | 3/2011 | Brooks et al. |
| 2011/0069148 A1 | 3/2011 | Jones et al. |
| 2011/0072299 A1 | 3/2011 | Callaghan et al. |

(56) References Cited

U.S. PATENT DOCUMENTS

| | | |
|---|---|---|
| 2011/0072391 A1 | 3/2011 | Hanggie et al. |
| 2011/0074688 A1 | 3/2011 | Hull et al. |
| 2011/0075440 A1 | 3/2011 | Wang |
| 2011/0081946 A1 | 4/2011 | Singh et al. |
| 2011/0087531 A1 | 4/2011 | Winters et al. |
| 2011/0087674 A1 | 4/2011 | Schokking et al. |
| 2011/0095994 A1 | 4/2011 | Birnbaum |
| 2011/0096035 A1 | 4/2011 | Shen |
| 2011/0096513 A1 | 4/2011 | Kim |
| 2011/0099199 A1 | 4/2011 | Stalenhoef et al. |
| 2011/0099512 A1 | 4/2011 | Jeong |
| 2011/0102326 A1 | 5/2011 | Casparian et al. |
| 2011/0102356 A1 | 5/2011 | Kemppinen et al. |
| 2011/0106798 A1 | 5/2011 | Li et al. |
| 2011/0115747 A1 | 5/2011 | Powell et al. |
| 2011/0118025 A1 | 5/2011 | Lukas et al. |
| 2011/0119597 A1 | 5/2011 | Yellamraju et al. |
| 2011/0122071 A1 | 5/2011 | Powell |
| 2011/0134017 A1 | 6/2011 | Burke |
| 2011/0134032 A1 | 6/2011 | Chiu et al. |
| 2011/0134112 A1 | 6/2011 | Koh et al. |
| 2011/0154198 A1 | 6/2011 | Bachman et al. |
| 2011/0157046 A1 | 6/2011 | Lee et al. |
| 2011/0157087 A1 | 6/2011 | Kanehira et al. |
| 2011/0157101 A1 | 6/2011 | Chang |
| 2011/0161174 A1 | 6/2011 | Simms et al. |
| 2011/0161409 A1 | 6/2011 | Nair et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0167992 A1 | 7/2011 | Eventoff et al. |
| 2011/0169762 A1 | 7/2011 | Weiss |
| 2011/0169778 A1 | 7/2011 | Nungester et al. |
| 2011/0170289 A1 | 7/2011 | Allen et al. |
| 2011/0175930 A1 | 7/2011 | Hwang et al. |
| 2011/0176035 A1 | 7/2011 | Poulsen |
| 2011/0179864 A1 | 7/2011 | Raasch et al. |
| 2011/0181754 A1 | 7/2011 | Iwasaki |
| 2011/0183120 A1 | 7/2011 | Sharygin et al. |
| 2011/0184646 A1 | 7/2011 | Wong et al. |
| 2011/0184824 A1 | 7/2011 | George et al. |
| 2011/0193787 A1 | 8/2011 | Morishige et al. |
| 2011/0193938 A1 | 8/2011 | Oderwald et al. |
| 2011/0197156 A1 | 8/2011 | Strait et al. |
| 2011/0202878 A1 | 8/2011 | Park et al. |
| 2011/0205372 A1 | 8/2011 | Miramontes |
| 2011/0216039 A1 | 9/2011 | Chen et al. |
| 2011/0216266 A1 | 9/2011 | Travis |
| 2011/0221659 A1 | 9/2011 | King et al. |
| 2011/0227913 A1 | 9/2011 | Hyndman |
| 2011/0228462 A1 | 9/2011 | Dang |
| 2011/0231192 A1 | 9/2011 | O'Conor et al. |
| 2011/0231682 A1 | 9/2011 | Kakish et al. |
| 2011/0231745 A1 | 9/2011 | Levesque et al. |
| 2011/0234502 A1 | 9/2011 | Yun et al. |
| 2011/0234535 A1 | 9/2011 | Hung et al. |
| 2011/0234881 A1 | 9/2011 | Wakabayashi et al. |
| 2011/0235179 A1 | 9/2011 | Simmonds |
| 2011/0242063 A1 | 10/2011 | Li et al. |
| 2011/0242138 A1 | 10/2011 | Tribble |
| 2011/0242298 A1 | 10/2011 | Bathiche et al. |
| 2011/0242440 A1 | 10/2011 | Noma et al. |
| 2011/0242670 A1 | 10/2011 | Simmonds |
| 2011/0248152 A1 | 10/2011 | Svajda et al. |
| 2011/0248920 A1 | 10/2011 | Larsen |
| 2011/0248941 A1 | 10/2011 | Abdo et al. |
| 2011/0261001 A1 | 10/2011 | Liu |
| 2011/0261083 A1 | 10/2011 | Wilson |
| 2011/0267272 A1 | 11/2011 | Meyer et al. |
| 2011/0267300 A1 | 11/2011 | Serban et al. |
| 2011/0283185 A1 | 11/2011 | Obasanjo et al. |
| 2011/0290686 A1 | 12/2011 | Huang |
| 2011/0291993 A1 | 12/2011 | Miyazaki et al. |
| 2011/0295697 A1 | 12/2011 | Boston et al. |
| 2011/0295913 A1 | 12/2011 | Enbutsu |
| 2011/0297566 A1 | 12/2011 | Gallagher et al. |
| 2011/0298919 A1 | 12/2011 | Maglaque |
| 2011/0304577 A1 | 12/2011 | Brown |
| 2011/0304815 A1 | 12/2011 | Newell |
| 2011/0304962 A1 | 12/2011 | Su |
| 2011/0306424 A1 | 12/2011 | Kazama et al. |
| 2011/0310038 A1 | 12/2011 | Park et al. |
| 2011/0316807 A1 | 12/2011 | Corrion |
| 2012/0002052 A1 | 1/2012 | Muramatsu et al. |
| 2012/0003958 A1 | 1/2012 | Hossain et al. |
| 2012/0005602 A1 | 1/2012 | Anttila et al. |
| 2012/0007821 A1 | 1/2012 | Zaliva |
| 2012/0008015 A1 | 1/2012 | Manabe |
| 2012/0011462 A1 | 1/2012 | Westerman et al. |
| 2012/0013519 A1 | 1/2012 | Hakansson et al. |
| 2012/0019165 A1 | 1/2012 | Igaki et al. |
| 2012/0019686 A1 | 1/2012 | Manabe |
| 2012/0020112 A1 | 1/2012 | Fisher et al. |
| 2012/0020556 A1 | 1/2012 | Manabe |
| 2012/0021618 A1 | 1/2012 | Schultz |
| 2012/0023459 A1 | 1/2012 | Westerman |
| 2012/0024682 A1 | 2/2012 | Huang et al. |
| 2012/0026048 A1 | 2/2012 | Vazquez et al. |
| 2012/0030213 A1 | 2/2012 | Arrouye et al. |
| 2012/0030616 A1 | 2/2012 | Howes et al. |
| 2012/0032891 A1 | 2/2012 | Parivar |
| 2012/0033306 A1 | 2/2012 | Valera et al. |
| 2012/0033369 A1 | 2/2012 | Wu et al. |
| 2012/0041721 A1 | 2/2012 | Chen |
| 2012/0044140 A1 | 2/2012 | Koyama et al. |
| 2012/0044179 A1 | 2/2012 | Hudson |
| 2012/0044379 A1 | 2/2012 | Manabe |
| 2012/0047368 A1 | 2/2012 | Chinn et al. |
| 2012/0050975 A1 | 3/2012 | Garelli et al. |
| 2012/0054674 A1 | 3/2012 | Beykpour et al. |
| 2012/0062850 A1 | 3/2012 | Travis |
| 2012/0062998 A1 | 3/2012 | Schultz et al. |
| 2012/0068919 A1 | 3/2012 | Lauder et al. |
| 2012/0069413 A1 | 3/2012 | Schultz |
| 2012/0069540 A1 | 3/2012 | Lauder et al. |
| 2012/0071008 A1 | 3/2012 | Sessford |
| 2012/0072167 A1 | 3/2012 | Cretella, Jr. et al. |
| 2012/0075249 A1 | 3/2012 | Hoch |
| 2012/0081316 A1 | 4/2012 | Sirpal et al. |
| 2012/0084710 A1 | 4/2012 | Sirpal et al. |
| 2012/0087078 A1 | 4/2012 | Medica et al. |
| 2012/0092279 A1 | 4/2012 | Martin |
| 2012/0094257 A1 | 4/2012 | Pillischer et al. |
| 2012/0099263 A1 | 4/2012 | Lin |
| 2012/0099749 A1 | 4/2012 | Rubin et al. |
| 2012/0102438 A1 | 4/2012 | Robinson et al. |
| 2012/0105321 A1 | 5/2012 | Wang et al. |
| 2012/0106082 A1 | 5/2012 | Wu et al. |
| 2012/0113031 A1 | 5/2012 | Lee et al. |
| 2012/0113223 A1 | 5/2012 | Hilliges et al. |
| 2012/0113579 A1 | 5/2012 | Agata et al. |
| 2012/0113964 A1 | 5/2012 | Petersen et al. |
| 2012/0115553 A1 | 5/2012 | Mahe et al. |
| 2012/0117409 A1 | 5/2012 | Lee et al. |
| 2012/0120493 A1 | 5/2012 | Simmonds et al. |
| 2012/0126445 A1 | 5/2012 | Rasmussen et al. |
| 2012/0127118 A1 | 5/2012 | Nolting et al. |
| 2012/0130927 A1 | 5/2012 | Shimogori |
| 2012/0133561 A1 | 5/2012 | Konanur et al. |
| 2012/0133797 A1 | 5/2012 | Sato et al. |
| 2012/0134623 A1 | 5/2012 | Boudreau et al. |
| 2012/0140396 A1 | 6/2012 | Zeliff et al. |
| 2012/0144331 A1 | 6/2012 | Tolonen et al. |
| 2012/0145525 A1 | 6/2012 | Ishikawa |
| 2012/0146943 A1 | 6/2012 | Fairley et al. |
| 2012/0155015 A1 | 6/2012 | Govindasamy et al. |
| 2012/0161406 A1 | 6/2012 | Mersky |
| 2012/0162126 A1 | 6/2012 | Yuan et al. |
| 2012/0162693 A1 | 6/2012 | Ito |
| 2012/0166980 A1 | 6/2012 | Yosef et al. |
| 2012/0166997 A1 | 6/2012 | Cho et al. |
| 2012/0170284 A1 | 7/2012 | Shedletsky |

(56) References Cited

U.S. PATENT DOCUMENTS

| | | |
|---|---|---|
| 2012/0175487 A1 | 7/2012 | Goto |
| 2012/0176322 A1 | 7/2012 | Karmi et al. |
| 2012/0176474 A1 | 7/2012 | Border |
| 2012/0182242 A1 | 7/2012 | Lindahl et al. |
| 2012/0182249 A1 | 7/2012 | Endo et al. |
| 2012/0182743 A1 | 7/2012 | Chou |
| 2012/0185803 A1 | 7/2012 | Wang et al. |
| 2012/0194393 A1 | 8/2012 | Uttermann et al. |
| 2012/0194448 A1 | 8/2012 | Rothkopf |
| 2012/0195553 A1 | 8/2012 | Hasegawa et al. |
| 2012/0200532 A1 | 8/2012 | Powell et al. |
| 2012/0200802 A1 | 8/2012 | Large |
| 2012/0204191 A1 | 8/2012 | Shia et al. |
| 2012/0206937 A1 | 8/2012 | Travis et al. |
| 2012/0208168 A1 | 8/2012 | Atkinson et al. |
| 2012/0209573 A1 | 8/2012 | Karrat |
| 2012/0209922 A1 | 8/2012 | Bhatia et al. |
| 2012/0223866 A1 | 9/2012 | Ayala Vazquez et al. |
| 2012/0224073 A1 | 9/2012 | Miyahara |
| 2012/0229634 A1 | 9/2012 | Laett et al. |
| 2012/0235635 A1 | 9/2012 | Sato |
| 2012/0235790 A1 | 9/2012 | Zhao et al. |
| 2012/0235885 A1 | 9/2012 | Miller et al. |
| 2012/0235921 A1 | 9/2012 | Laubach |
| 2012/0242561 A1 | 9/2012 | Sugihara |
| 2012/0243102 A1 | 9/2012 | Takeda et al. |
| 2012/0243165 A1 | 9/2012 | Chang et al. |
| 2012/0246377 A1 | 9/2012 | Bhesania |
| 2012/0246596 A1 | 9/2012 | Ording et al. |
| 2012/0249443 A1 | 10/2012 | Anderson et al. |
| 2012/0256929 A1 | 10/2012 | Koenig et al. |
| 2012/0256959 A1 | 10/2012 | Ye et al. |
| 2012/0262657 A1 | 10/2012 | Nakanishi et al. |
| 2012/0268912 A1 | 10/2012 | Minami et al. |
| 2012/0271823 A1 | 10/2012 | Asikainen et al. |
| 2012/0274811 A1 | 11/2012 | Bakin |
| 2012/0278744 A1 | 11/2012 | Kozitsyn et al. |
| 2012/0284297 A1 | 11/2012 | Aguera-Arcas et al. |
| 2012/0287562 A1 | 11/2012 | Wu et al. |
| 2012/0290654 A1 | 11/2012 | Detwiller et al. |
| 2012/0292535 A1 | 11/2012 | Choi et al. |
| 2012/0300275 A1 | 11/2012 | Vilardell et al. |
| 2012/0304092 A1 | 11/2012 | Jarrett et al. |
| 2012/0304116 A1 | 11/2012 | Donahue et al. |
| 2012/0311481 A1 | 12/2012 | Reyna |
| 2012/0312955 A1 | 12/2012 | Randolph |
| 2012/0323933 A1 | 12/2012 | He et al. |
| 2012/0326003 A1 | 12/2012 | Solow et al. |
| 2012/0328349 A1 | 12/2012 | Isaac et al. |
| 2012/0331141 A1 | 12/2012 | Carter et al. |
| 2013/0007665 A1 | 1/2013 | Chaudhri et al. |
| 2013/0009413 A1 | 1/2013 | Chiu et al. |
| 2013/0016468 A1 | 1/2013 | Oh |
| 2013/0017696 A1 | 1/2013 | Alvarez Rivera |
| 2013/0019273 A1 | 1/2013 | Ma et al. |
| 2013/0024424 A1 | 1/2013 | Prahlad et al. |
| 2013/0024805 A1 | 1/2013 | In et al. |
| 2013/0027354 A1 | 1/2013 | Yabuta et al. |
| 2013/0027356 A1 | 1/2013 | Nishida |
| 2013/0027613 A1 | 1/2013 | Kim et al. |
| 2013/0027867 A1 | 1/2013 | Lauder et al. |
| 2013/0030892 A1 | 1/2013 | Liu et al. |
| 2013/0044074 A1 | 2/2013 | Park et al. |
| 2013/0047118 A1 | 2/2013 | Hooper et al. |
| 2013/0063465 A1 | 3/2013 | Zaman |
| 2013/0063873 A1 | 3/2013 | Wodrich et al. |
| 2013/0067126 A1 | 3/2013 | Casparian et al. |
| 2013/0076617 A1 | 3/2013 | Csaszar et al. |
| 2013/0083466 A1 | 4/2013 | Becze et al. |
| 2013/0088431 A1 | 4/2013 | Ballagas et al. |
| 2013/0090998 A1 | 4/2013 | Moore et al. |
| 2013/0091204 A1 | 4/2013 | Loh et al. |
| 2013/0097685 A1 | 4/2013 | Kennedy et al. |
| 2013/0106592 A1 | 5/2013 | Morgan et al. |
| 2013/0106766 A1 | 5/2013 | Yilmaz et al. |
| 2013/0106813 A1 | 5/2013 | Hotelling et al. |
| 2013/0107144 A1 | 5/2013 | Marhefka et al. |
| 2013/0120466 A1 | 5/2013 | Chen et al. |
| 2013/0120760 A1 | 5/2013 | Raguin et al. |
| 2013/0128102 A1 | 5/2013 | Yano |
| 2013/0148864 A1 | 6/2013 | Dolson et al. |
| 2013/0159417 A1 | 6/2013 | Meckler et al. |
| 2013/0162554 A1 | 6/2013 | Lauder et al. |
| 2013/0170802 A1 | 7/2013 | Pitwon |
| 2013/0172906 A1 | 7/2013 | Olson et al. |
| 2013/0187753 A1 | 7/2013 | Chiriyankandath |
| 2013/0187866 A1 | 7/2013 | Kim et al. |
| 2013/0198176 A1 | 8/2013 | Kim |
| 2013/0201094 A1 | 8/2013 | Travis |
| 2013/0207937 A1 | 8/2013 | Lutian et al. |
| 2013/0216108 A1 | 8/2013 | Hwang et al. |
| 2013/0217451 A1 | 8/2013 | Komiyama et al. |
| 2013/0222353 A1 | 8/2013 | Large |
| 2013/0222681 A1 | 8/2013 | Wan |
| 2013/0226931 A1 | 8/2013 | Hazel et al. |
| 2013/0227836 A1 | 9/2013 | Whitt, III |
| 2013/0228023 A1 | 9/2013 | Drasnin |
| 2013/0228433 A1 | 9/2013 | Shaw |
| 2013/0228434 A1 | 9/2013 | Whitt, III |
| 2013/0228435 A1 | 9/2013 | Whitt, III |
| 2013/0228439 A1 | 9/2013 | Whitt, III |
| 2013/0229100 A1 | 9/2013 | Siddiqui et al. |
| 2013/0229335 A1 | 9/2013 | Whitman |
| 2013/0229347 A1 | 9/2013 | Lutz, III |
| 2013/0229350 A1 | 9/2013 | Shaw et al. |
| 2013/0229351 A1 | 9/2013 | Whitt, III |
| 2013/0229354 A1 | 9/2013 | Whitt, III et al. |
| 2013/0229356 A1 | 9/2013 | Marwah |
| 2013/0229357 A1 | 9/2013 | Powell |
| 2013/0229363 A1 | 9/2013 | Whitman |
| 2013/0229366 A1 | 9/2013 | Dighde |
| 2013/0229380 A1 | 9/2013 | Lutz, III |
| 2013/0229386 A1 | 9/2013 | Bathiche |
| 2013/0229534 A1 | 9/2013 | Panay |
| 2013/0229568 A1 | 9/2013 | Belesiu et al. |
| 2013/0229570 A1 | 9/2013 | Beck et al. |
| 2013/0229756 A1 | 9/2013 | Whitt, III |
| 2013/0229757 A1 | 9/2013 | Whitt, III et al. |
| 2013/0229758 A1 | 9/2013 | Belesiu |
| 2013/0229759 A1 | 9/2013 | Whitt, III et al. |
| 2013/0229760 A1 | 9/2013 | Whitt, III |
| 2013/0229761 A1 | 9/2013 | Shaw |
| 2013/0229762 A1 | 9/2013 | Whitt, III |
| 2013/0229773 A1 | 9/2013 | Siddiqui et al. |
| 2013/0230346 A1 | 9/2013 | Shaw |
| 2013/0231755 A1 | 9/2013 | Perek |
| 2013/0232280 A1 | 9/2013 | Perek |
| 2013/0232348 A1 | 9/2013 | Oler |
| 2013/0232349 A1 | 9/2013 | Oler et al. |
| 2013/0232350 A1 | 9/2013 | Belesiu et al. |
| 2013/0232353 A1 | 9/2013 | Belesiu |
| 2013/0232571 A1 | 9/2013 | Belesiu |
| 2013/0242495 A1 | 9/2013 | Bathiche et al. |
| 2013/0254708 A1 | 9/2013 | Dorcey |
| 2013/0262886 A1 | 10/2013 | Nishimura |
| 2013/0278552 A1 | 10/2013 | Kamin-Lyndgaard |
| 2013/0283212 A1 | 10/2013 | Zhu et al. |
| 2013/0288722 A1 | 10/2013 | Ramanujam et al. |
| 2013/0300590 A1 | 11/2013 | Dietz |
| 2013/0300647 A1 | 11/2013 | Drasnin |
| 2013/0300684 A1 | 11/2013 | Kim et al. |
| 2013/0301199 A1 | 11/2013 | Whitt |
| 2013/0301206 A1 | 11/2013 | Whitt |
| 2013/0304941 A1 | 11/2013 | Drasnin |
| 2013/0304944 A1 | 11/2013 | Young |
| 2013/0305184 A1 | 11/2013 | Kim et al. |
| 2013/0322000 A1 | 12/2013 | Whitt |
| 2013/0322001 A1 | 12/2013 | Whitt |
| 2013/0328761 A1 | 12/2013 | Boulanger |
| 2013/0329301 A1 | 12/2013 | Travis |
| 2013/0329360 A1 | 12/2013 | Aldana |
| 2013/0332628 A1 | 12/2013 | Panay |
| 2013/0335330 A1 | 12/2013 | Lane |
| 2013/0335387 A1 | 12/2013 | Emerton |

(56) References Cited

U.S. PATENT DOCUMENTS

| | | |
|---|---|---|
| 2013/0335902 A1 | 12/2013 | Campbell |
| 2013/0335903 A1 | 12/2013 | Raken |
| 2013/0339446 A1 | 12/2013 | Balassanian et al. |
| 2013/0339757 A1 | 12/2013 | Reddy |
| 2013/0342464 A1 | 12/2013 | Bathiche et al. |
| 2013/0342465 A1 | 12/2013 | Bathiche |
| 2013/0343291 A1 | 12/2013 | Gao et al. |
| 2013/0346408 A1 | 12/2013 | Duarte et al. |
| 2013/0346636 A1 | 12/2013 | Bathiche |
| 2013/0346725 A1 | 12/2013 | Lomet et al. |
| 2013/0346882 A1 | 12/2013 | Shiplacoff et al. |
| 2013/0346922 A1 | 12/2013 | Shiplacoff et al. |
| 2014/0012401 A1 | 1/2014 | Perek et al. |
| 2014/0022265 A1 | 1/2014 | Canan |
| 2014/0022629 A1 | 1/2014 | Powell |
| 2014/0043275 A1 | 2/2014 | Whitman |
| 2014/0048399 A1 | 2/2014 | Whitt, III |
| 2014/0049894 A1 | 2/2014 | Rihn |
| 2014/0053097 A1 | 2/2014 | Shin et al. |
| 2014/0053108 A1 | 2/2014 | Johansson |
| 2014/0055624 A1 | 2/2014 | Gaines |
| 2014/0059139 A1 | 2/2014 | Filev et al. |
| 2014/0063198 A1 | 3/2014 | Boulanger |
| 2014/0063367 A1 | 3/2014 | Yang et al. |
| 2014/0078063 A1 | 3/2014 | Bathiche |
| 2014/0086081 A1 | 3/2014 | Mack et al. |
| 2014/0089833 A1 | 3/2014 | Hwang et al. |
| 2014/0092765 A1 | 4/2014 | Agarwal et al. |
| 2014/0098085 A1 | 4/2014 | Lee |
| 2014/0104665 A1 | 4/2014 | Popovich et al. |
| 2014/0111865 A1 | 4/2014 | Kobayashi |
| 2014/0116982 A1 | 5/2014 | Schellenberg et al. |
| 2014/0118241 A1 | 5/2014 | Chai |
| 2014/0119802 A1 | 5/2014 | Shaw |
| 2014/0123273 A1 | 5/2014 | Matus |
| 2014/0125864 A1 | 5/2014 | Rihn |
| 2014/0131000 A1 | 5/2014 | Bornemann et al. |
| 2014/0132550 A1 | 5/2014 | McCracken et al. |
| 2014/0133456 A1 | 5/2014 | Donepudi et al. |
| 2014/0135060 A1 | 5/2014 | Mercer |
| 2014/0143247 A1 | 5/2014 | Rathnavelu et al. |
| 2014/0143351 A1 | 5/2014 | Deng |
| 2014/0143439 A1 | 5/2014 | Ramamurthy |
| 2014/0143708 A1 | 5/2014 | Yang et al. |
| 2014/0148170 A1 | 5/2014 | Damji et al. |
| 2014/0148938 A1 | 5/2014 | Zhang |
| 2014/0153390 A1 | 6/2014 | Ishii et al. |
| 2014/0155031 A1 | 6/2014 | Lee et al. |
| 2014/0155123 A1* | 6/2014 | Lee .............. H04M 1/72519 455/563 |
| 2014/0164957 A1 | 6/2014 | Shin et al. |
| 2014/0164990 A1 | 6/2014 | Kim et al. |
| 2014/0185215 A1 | 7/2014 | Whitt |
| 2014/0185220 A1 | 7/2014 | Whitt |
| 2014/0189557 A1 | 7/2014 | O'Connell et al. |
| 2014/0194095 A1 | 7/2014 | Wynne et al. |
| 2014/0195620 A1 | 7/2014 | Srinivasan et al. |
| 2014/0195976 A1 | 7/2014 | Ow et al. |
| 2014/0196143 A1 | 7/2014 | Fliderman et al. |
| 2014/0240842 A1 | 8/2014 | Nguyen et al. |
| 2014/0258937 A1 | 9/2014 | Lee |
| 2014/0283142 A1 | 9/2014 | Shepherd et al. |
| 2014/0310646 A1 | 10/2014 | Vranjes et al. |
| 2014/0314374 A1 | 10/2014 | Fattal et al. |
| 2014/0351722 A1 | 11/2014 | Frederickson et al. |
| 2014/0362506 A1 | 12/2014 | Whitt, III et al. |
| 2014/0378099 A1 | 12/2014 | Huang et al. |
| 2015/0020122 A1 | 1/2015 | Shin et al. |
| 2015/0026092 A1 | 1/2015 | Abboud et al. |
| 2015/0046500 A1 | 2/2015 | Bush et al. |
| 2015/0070119 A1 | 3/2015 | Rihn et al. |
| 2015/0086174 A1 | 3/2015 | Abecassis et al. |
| 2015/0117444 A1 | 4/2015 | Sandblad et al. |
| 2015/0123775 A1 | 5/2015 | Kerdemelidis |
| 2015/0161834 A1 | 6/2015 | Spahl et al. |
| 2015/0172264 A1 | 6/2015 | Hardy |
| 2015/0187187 A1 | 7/2015 | Del Toro et al. |
| 2015/0199075 A1 | 7/2015 | Kuscher et al. |
| 2015/0212660 A1 | 7/2015 | Su |
| 2015/0243236 A1* | 8/2015 | Jain .............. G09G 3/20 345/690 |
| 2015/0261262 A1 | 9/2015 | Whitt, III et al. |
| 2015/0268699 A1 | 9/2015 | Bathiche et al. |
| 2015/0317026 A1 | 11/2015 | Choi et al. |
| 2015/0317062 A1 | 11/2015 | Jarrett et al. |
| 2015/0325211 A1 | 11/2015 | Lee et al. |
| 2015/0356121 A1 | 12/2015 | Schmelzer |
| 2016/0019279 A1 | 1/2016 | Sengupta et al. |
| 2016/0033784 A1 | 2/2016 | Levola et al. |
| 2016/0034155 A1 | 2/2016 | Vranjes et al. |
| 2016/0034156 A1 | 2/2016 | Vranjes et al. |
| 2016/0034157 A1 | 2/2016 | Vranjes et al. |
| 2016/0034159 A1 | 2/2016 | Vranjes et al. |
| 2016/0034424 A1 | 2/2016 | Won |
| 2016/0034459 A1 | 2/2016 | Larsen et al. |
| 2016/0034695 A1 | 2/2016 | Won et al. |
| 2016/0036692 A1 | 2/2016 | Leeb et al. |
| 2016/0037481 A1 | 2/2016 | Won et al. |
| 2016/0110403 A1 | 4/2016 | Lomet et al. |
| 2016/0124467 A1 | 5/2016 | Whitt et al. |
| 2017/0177038 A1 | 6/2017 | Whitt et al. |

FOREIGN PATENT DOCUMENTS

| | | |
|---|---|---|
| CN | 1904823 | 1/2007 |
| CN | 101036104 | 9/2007 |
| CN | 101105512 | 1/2008 |
| CN | 101644979 | 2/2010 |
| CN | 202441167 | 9/2012 |
| CN | 103455149 | 12/2013 |
| CN | 103543904 | 1/2014 |
| EP | 0271956 | 6/1988 |
| EP | 0977022 | 2/2000 |
| EP | 1223722 | 7/2002 |
| EP | 1425763 | 6/2004 |
| EP | 1591891 | 11/2005 |
| EP | 1847924 | 10/2007 |
| EP | 2083310 | 7/2009 |
| EP | 2144177 | 1/2010 |
| EP | 2353978 | 8/2011 |
| EP | 2378607 | 10/2011 |
| EP | 2381290 | 10/2011 |
| EP | 2618247 | 7/2013 |
| EP | 2662761 | 11/2013 |
| EP | 2752691 | 7/2014 |
| FR | 2942811 | 9/2010 |
| GB | 2123213 | 1/1984 |
| GB | 2178570 | 2/1987 |
| GB | 2482931 | 2/2012 |
| GB | 2504944 | 2/2014 |
| JP | 56108127 | 8/1981 |
| JP | H104540 | 1/1998 |
| JP | H10234057 | 9/1998 |
| JP | 10301055 | 11/1998 |
| JP | 10326124 | 12/1998 |
| JP | 1173239 | 3/1999 |
| JP | 2000106021 | 4/2000 |
| JP | 2000347037 | 12/2000 |
| JP | 2001174746 | 6/2001 |
| JP | 2002162912 | 6/2002 |
| JP | 2002300438 | 10/2002 |
| JP | 3602207 | 12/2004 |
| JP | 2005331565 | 12/2005 |
| JP | 2006160155 | 6/2006 |
| JP | 2006294361 | 10/2006 |
| JP | 2009003053 | 1/2009 |
| JP | 2009122551 | 6/2009 |
| KR | 20010039013 | 5/2001 |
| KR | 20040066647 | 7/2004 |
| KR | 20070001771 | 1/2007 |
| KR | 20080006404 | 1/2008 |
| KR | 20080009490 | 1/2008 |
| KR | 20080055051 | 6/2008 |
| KR | 20090084316 | 8/2009 |

(56) References Cited

FOREIGN PATENT DOCUMENTS

| | | |
|---|---|---|
| KR | 20110064265 | 6/2011 |
| KR | 1020110087178 | 8/2011 |
| NL | 1038411 | 5/2012 |
| TW | 201407202 | 2/2014 |
| WO | WO-1991008915 | 6/1991 |
| WO | WO-1999064784 | 12/1999 |
| WO | WO-0051299 | 8/2000 |
| WO | WO-2000079327 | 12/2000 |
| WO | WO-0128309 | 4/2001 |
| WO | WO-2001033282 | 5/2001 |
| WO | WO-2003106134 | 12/2003 |
| WO | WO-2005027696 | 3/2005 |
| WO | WO-2005059874 | 6/2005 |
| WO | WO-2006044818 | 4/2006 |
| WO | WO-2006054056 | 5/2006 |
| WO | WO-2007057500 | 5/2007 |
| WO | WO-2008055039 | 5/2008 |
| WO | WO-2009034484 | 3/2009 |
| WO | WO-2010011983 | 1/2010 |
| WO | WO-2010105272 | 9/2010 |
| WO | WO-2010147609 | 12/2010 |
| WO | WO-2011016200 | 2/2011 |
| WO | WO-2011131978 | 10/2011 |
| WO | WO-2012036717 | 3/2012 |
| WO | WO-2012063410 | 5/2012 |
| WO | WO-2012177811 | 12/2012 |
| WO | WO-2013012699 | 1/2013 |
| WO | WO-2013033067 | 3/2013 |
| WO | WO-2013049908 | 4/2013 |
| WO | WO-2014051920 | 4/2014 |
| WO | WO-2014071308 | 5/2014 |
| WO | WO-2014085502 | 6/2014 |
| WO | WO-2014088343 | 6/2014 |
| WO | WO-2014130383 | 8/2014 |
| WO | WO-2016014368 | 1/2016 |
| WO | WO-2016064575 | 4/2016 |

OTHER PUBLICATIONS

"Corrected Notice of Allowance", U.S. Appl. No. 13/564,520, dated Sep. 17, 2015, 2 pages.
"Corrected Notice of Allowance", U.S. Appl. No. 14/457,881, dated Aug. 20, 2015, 2 pages.
"Corrected Notice of Allowance", U.S. Appl. No. 14/457,881, dated Oct. 2, 2015, 2 pages.
"Non-Final Office Action", U.S. Appl. No. 14/162,529, dated Sep. 18, 2015, 13 pages.
"Non-Final Office Action", U.S. Appl. No. 14/447,306, dated Oct. 1, 2015, 16 pages.
"Notice of Allowance", U.S. Appl. No. 14/727,001, dated Oct. 2, 2015, 4 pages.
"Adobe Audition / Customizing Workspaces", Retrieved From: <http://help.adobe.com/en_US/audition/cs/using/WS9FA7B8D7-5991-4e05-B13C-4C85DAF1F051.html> Jul. 5, 2014, May 18, 2011, 6 Pages.
"Always Connected", Available at: http://www.samsung.com/global/microsite/galaxycamera/nx/, Jun. 24, 2013, 5 pages.
"Display Control", Retrieved From: <http://www.portrait.com/technology/display-control.html> Jul. 4, 2014, Jun. 24, 2013, 5 Pages.
"Extended European Search Report", EP Application No. 11866699.9, dated Jan. 15, 2015, 6 pages.
"Extended European Search Report", EP Application No. 11866772.4, dated Jan. 15, 2015, 6 pages.
"Final Office Action", U.S. Appl. No. 13/774,875, dated Jun. 4, 2015, 10 pages.
"Final Office Action", U.S. Appl. No. 13/863,369, dated Jul. 21, 2015, 17 pages.
"First Examination Report", NZ Application No. 618284, dated May 20, 2014, 2 pages.
"Foreign Office Action", CL Application No. 3370-2013, dated May 7, 2015, 6 pages.
"Foreign Office Action", CL Application No. 3370-2013, dated Oct. 29, 2015, 6 pages.
"Foreign Office Action", CN Application No. 201180071196.8, dated Sep. 11, 2014, 13 pages.
"Foreign Office Action", CO Application No. 13300265, dated Apr. 21, 2015, 11 Pages.
"Foreign Office Action", CO Application No. 13300265, dated Sep. 24, 2014, 10 Pages.
"Foreign Office Action", JP Application No. 2014-512824, dated Nov. 6, 2015, 5 pages.
"Foreign Office Action", PH Application No. PH/1/2013/502367, dated Apr. 24, 2015, 3 pages.
"Foreign Office Action", RU Application No. 2013152630, dated Oct. 26, 2015, 5 pages.
"Further Examination Report", NZ Application No. 618284, dated Jul. 13, 2015, 2 pages.
"International Search Report and Written Opinion", Application No. PCT/US2014/016658, dated Apr. 23, 2014, 10 pages.
"International Search Report and Written Opinion", Application No. PCT/US2015/042371, dated Oct. 2, 2015, 10 pages.
"International Search Report and Written Opinion", Application No. PCT/US2015/042226, dated Oct. 27, 2015, 10 Pages.
"International Search Report and Written Opinion", Application No. PCT/US2015/042205, dated Oct. 30, 2015, 10 pages.
"International Search Report and Written Opinion", Application No. PCT/US2015/042218, dated Nov. 6, 2015, 10 pages.
"International Search Report and Written Opinion", Application No. PCT/US2013/060247, dated Dec. 10, 2013, 10 pages.
"International Search Report and Written Opinion", Application No. PCT/USUS15/042259, dated Oct. 12, 2015, 11 Pages.
"International Search Report and Written Opinion", Application No. PCT/US2015/041930, dated Oct. 20, 2015, 12 Pages.
"International Search Report and Written Opinion", Application No. PCT/US2015/041900, dated Oct. 21, 2015, 12 pages.
"International Search Report and Written Opinion", Application No. PCT/US2015/041909, dated Oct. 20, 2015, 13 pages.
"Manage Multiple Windows", Retrieved From: <http://windows.microsoft.com/en-hk/windows/manage-multiple-windows#1TC=windows-7> Jul. 8, 2014, 4 Pages.
"Merge Operator", Retrieved on: Jun. 3, 2014, Available at: https://github.com/facebook/rocksdb/wiki/Merge-Operator, 10 pages.
"New Technology from MIT may Enable Cheap, Color, Holographic Video Displays", Retrieved from <http://www.gizmag.com/holograph-3d-color-video-display-inexpensive-mit/28029/> on Feb. 25, 2015, Jun. 24, 2013, 8 pages.
"Non-Final Office Action", U.S. Appl. No. 13/118,347, dated Dec. 3, 2014, 28 pages.
"Non-Final Office Action", U.S. Appl. No. 13/657,646, dated Aug. 12, 2014, 14 pages.
"Non-Final Office Action", U.S. Appl. No. 13/774,875, dated Sep. 16, 2015, 8 pages.
"Non-Final Office Action", U.S. Appl. No. 13/774,875, dated Nov. 24, 2014, 8 pages.
"Non-Final Office Action", U.S. Appl. No. 13/863,369, dated Dec. 21, 2015, 17 pages.
"Non-Final Office Action", U.S. Appl. No. 13/863,369, dated Feb. 27, 2015, 16 pages.
"Notice of Allowance", U.S. Appl. No. 13/118,347, dated Apr. 1, 2015, 7 pages.
"Notice of Allowance", U.S. Appl. No. 13/657,646, dated Feb. 6, 2015, 15 pages.
"Notice of Allowance", U.S. Appl. No. 14/447,464, dated Nov. 9, 2015, 10 pages.
"Organize Your Desktop Workspace for More Comfort with WindowSpace", Retrieved From: <http://www.ntwind.com/software/windowspace.html> Jul. 4, 2014, Sep. 19, 2008, 5 Pages.
"Restriction Requirement", U.S. Appl. No. 14/447,419, dated Aug. 4, 2015, 6 pages.
"Restriction Requirement", U.S. Appl. No. 14/454,545, dated Oct. 2, 2015, 6 pages.

(56) References Cited

OTHER PUBLICATIONS

"SizeUp the Missing Window Manager", Retrieved From: <https://www.irradiatedsoftware.com/sizeup/> Jul. 4, 2014, Jan. 17, 2013, 4 Pages.

"Split the Windows® Desktop: How to Divide a Single Large Desktop into Multiple Smaller Ones", retrieved from <http://www.actualtools.com/multiplemonitors/split-windows-desktop-how-to-divide-single-large-desktop-into-smaller-ones.shtml> on Jul. 7, 2014, Apr. 10, 2014, 3 pages.

"Using Flickr to Organise a Collection of Images", Available at: http://www.jiscdigitalmedia.ac.uk/guide/using-flickr-to-organise-a-collection-of-images, Apr. 2, 2013, 17 pages.

"Window Magnet", Retrieved From: <http://magnet.crowdcafe.com/> Jul. 4, 2014, Jun. 23, 2011, 2 Pages.

"Working with Windows", Retrieved From: <http://windows.microsoft.com/en-us/windows/working-with-windows#1TC=windows-7> Jul. 4, 2014, 10 Pages.

Ando,"Development of Three-Dimensional Microstages Using Inclined Deep-Reactive Ion Etching", Journal of Microelectromechanical Systems, Jun. 1, 2007, 10 pages.

Ashraf,"Winsplit Revolution: Tile, Resize, and Position Windows for Efficient Use of Your Screen", Retrieved From: <http://dottech.org/11240/winsplit-revolution-tile-resize-and-position-windows-for-efficient-use-of-your-screen/> Jul. 8, 2014, Dec. 18, 2011, 4 Pages.

Callaghan,"Types of writes", Available at: http://smalldatum.blogspot.in/2014/04/types-of-writes.html, Apr. 17, 2014, 3 pages.

Chang-Yen,"A Monolithic PDMS Waveguide System Fabricated Using Soft-Lithography Techniques", In Journal of Lightwave Technology, vol. 23, No. 6, Jun. 2005, 6 pages.

Charles,"Design of Optically Path Length Matched, Three-Dimensional Photonic Circuits Comprising Uniquely Routed Waveguides", In Proceedings of Applied Optics, vol. 51, Issue 27, Sep. 20, 2012, 11 pages.

Chen,"A Study of Fiber-to-Fiber Losses in Waveguide Grating Routers", In Journal of Lightwave Technology, vol. 15, No. 10, Oct. 1997, 5 pages.

Cohen,"Automatic Strategies in the Siemens RTL Tiled Window Manager", In Proceedings: The 2nd IEEE Conference on Computer Workstations, Mar. 7, 1988, pp. 111-119.

Cottier,"Label-free Highly Sensitive Detection of (small) Molecules by Wavelength Interrogation of Integrated Optical Chips", n Proceedings of Sensors and Actuators B: Chemical, vol. 91, Issue 1-3, Jun. 1, 2003, pp. 241-251.

Dumon,"Compact Arrayed Waveguide Grating Devices in Silicon-on-Insulator", In Proceedings of the IEEE/LEOS Symposium Benelux Chapter, May 27, 2014, 4 pages.

Garcia,"COMET: Content Mediator Architecture for Content-Aware Networks", In IEEE Future Network & Mobile Summit, 2011, 8 pages.

Gila,"First Results From a Multi-Ion Beam Lithography and Processing System at The University of Florida", AIP Conference Proceedings, Jun. 1, 2011, 6 pages.

Glendenning,"Polymer Micro-Optics via Micro Injection Moulding", Available at: https://web.archive.org/web/20120310003606/http://www.microsystems.uk.com/english/polymer_optics_injection_moulding.html, Jan. 10, 2011, 6 pages.

Greiner,"Bandpass engineering of lithographically scribed channel-waveguide Bragg gratings", In Proceedings of Optics Letters, vol. 29, No. 8, Apr. 15, 2004, pp. 806-808.

Hepburn,"Color: The Location Based Social Photo App", Available at: http://www.digitalbuzzblog.com/color-the-location-based-social-photo-iphone-app/, Mar. 27, 2011, 12 pages.

Hollister,"Windows 8 Primer: How to Navigate Microsoft's New Operating System", retrieved from <http://www.theverge.com/2012/10/28/3562172/windows-8-gestures-keyboard-shortcuts-tips-tricks-how-to-guide> on Aug. 7, 2014, Oct. 28, 2012, 30 pages.

Hua,"Engineering of Head-mounted Projective Displays", In Proceedings of Applied Optics, vol. 39, No. 22, Aug. 1, 2000, 11 pages.

Ismail,"Improved Arrayed-Waveguide-Grating Layout Avoiding Systematic Phase Errors", In Proceedings of Optics Express, vol. 19, No. 9, Apr. 25, 2011, pp. 8781-8794.

Jarvenpaa,"Compact near-to-eye display with integrated gaze tracker", Second International Conference on Computer Engineering and Applications, Mar. 19, 2010, 9 pages.

Johnson,"Samsung Galaxy Tab Pro 10.1 Review", Retrieved From: <http://hothardware.com/ReviewSamsung-Galaxy-Tab-Pro-101-Review/?page=3#!baG2DY> Jul. 9, 2014, Mar. 21, 2014, 10 Pages.

Kandogan,"Elastic Windows: Improved Spatial Layout and Rapid Multiple Window Operations", In Proceedings of the Workshop on Advanced Visual Interfaces, May 27, 1996, 10 Pages.

Kishore,"Split or Divide Your Desktop Screen into Multiple Parts", retrieved from <http://www.online-tech-tips.com/free-software-downloads/split-or-divide-your-desktop-screen-into-multiple-parts/> on Jul. 7, 2014, Oct. 18, 2008, 7 pages.

Ksentini,"Building the Bridges between QoS and QoE for Network Control Mechanisms", In Dissertation of University of Rennes, Jul. 3, 2013, 66 pages.

L,"All-Nanoparticle Concave Diffraction Grating Fabricated by Self-Assembly onto Magnetically-Recorded Templates", In Proceedings of Optical Express, vol. 21, Issue 1, Jan. 2013, 1 page.

Lanman,"Near-eye Light Field Displays", In Journal of ACM Transactions on Graphics, vol. 32, No. 6, Nov. 2013, 10 pages.

Levandoski,"Latch-Free, Log-Structured Storage for Multiple Access Methods", U.S. Appl. No. 13/924,567, filed Jun. 22, 2013, 51 pages.

Levandoski,"The BW-Tree: A B-tree for New Hardware Platforms", In IEEE 29th International Conference on Data Engineering, Apr. 8, 2013, 12 pages.

Mei,"An all fiber interferometric gradient hydrophone with optical path length compensation", In Proceedings of Summaries of Papers Presented at the Conference on Lasers and Electro-Optics, May 28, 1999, 2 pages.

Morga,"History of SAW Devices", In Proceedings of the IEEE International Frequency Control Symposium, May 27, 1998, 22 pages.

Muller,"MultiSplitPane: Splitting without Nesting", Java.net, retrieved from <http://today.java.net/pub/a/today/2006/03/23/multi-split-pane.html> on Mar. 23, 2006, Mar. 23, 2006, 6 pages.

O'Reilly,"How to Use the Microsoft Surface Touch Screen and Keyboard", Retrieved From: <http://www.cnet.com/how-to/how-to-use-the-microsoft-surface-touch-screen-and-keyboard/> Jul. 5, 2014, Nov. 6, 2012, 5 Pages.

Paul,"Three Windows Multitasking Features That Help Maximize Your Screen Space", Retrieved From: <http://www.pcworld.com/article/2094124/three-windows-multitasking-features-that-help-maximize-your-screen-space.html> Jul. 4, 2014, Feb. 4, 2014, 4 Pages.

Prohaska,"Fast Updates with TokuDB", Available at: http://www.tokutek.com/2013/02/fast-updates-with-tokudb/, Feb. 12, 2013, 2 pages.

Smalley,"Anisotropic Leaky-Mode Modulator for Holographic Video Displays", In Proceedings of Nature, vol. 498, Jun. 20, 2013, 6 pages.

Teng,"Fabrication of nanoscale zero-mode waveguides using microlithography for single molecule sensing", In Proceedings of Nanotechnology, vol. 23, No. 45, Jul. 7, 2012, 7 pages.

Tien,"Microcontact Printing of SAMs", In Proceedings of Thin Films, vol. 24, May 28, 2014, 24 pages.

Vranjes,"Application Window Divider Control for Window Layout Management", U.S. Appl. No. 13/863,369, filed Apr. 15, 2013, 21 pages.

Wiebe,"Using screen space efficiently with Gridmove", Available at: http://lowerthought.wordpress.com/2010/05/15/using-screen-space-efficiently-with-gridmove/, May 15, 2010, 2 pages.

"Final Office Action", U.S. Appl. No. 13/371,725, dated Mar. 3, 2015, 30 pages.

"Notice of Allowance", U.S. Appl. No. 13/564,520, dated May 8, 2015, 4 pages.

"Notice of Allowance", U.S. Appl. No. 14/200,595, dated Feb. 17, 2015, 2 pages.

"Notice of Allowance", U.S. Appl. No. 14/200,595, dated Feb. 25, 2015, 4 pages.

(56) References Cited

OTHER PUBLICATIONS

"International Search Report and Written Opinion", Application No. PCT/US2015/021127, dated Jun. 9, 2015, 12 pages.
"Corrected Notice of Allowance", U.S. Appl. No. 14/200,595, dated Jun. 4, 2015, 3 pages.
"Non-Final Office Action", U.S. Appl. No. 14/727,001, dated Jul. 10, 2015, 7 pages.
"Notice of Allowance", U.S. Appl. No. 14/457,881, dated Jul. 22, 2015, 7 pages.
"Accessing Device Sensors", retrieved from <https://developer.palm.com/content/api/dev-guide/pdk/accessing-device-sensors.html> on May 25, 2012, 2011, 4 pages.
"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.
"Advanced Configuration and Power Management Specification", Intel Corporation, Microsoft Corporation, Toshiba Corp. Revision 1, Dec. 22, 1996, 364 pages.
"Advisory Action", U.S. Appl. No. 13/939,032, dated Feb. 24, 2014, 2 pages.
"Advisory Action", U.S. Appl. No. 14/199,924, dated May 28, 2014, 2 pages.
"Apple®—45W MagSafe 2 Power Adapter with Magnetic DC Connector-", Retrieved from <http://www.bestbuy.com/site/Apple%26%23174%3B---45W-MagSafe-2-Power-Adapter-with-Magnetic-DC-Connector/5856526.p?id=1218696408860&skuld=5856526#tab=overview> on May 14, 2013, 2013, 4 Pages.
"Basic Cam Motion Curves", Retrieved From: <http://ocw.metu.edu.tr/pluginfile.php/6886/mod_resource/content/1/ch8/8-3.htm> Nov. 22, 2013, Middle East Technical University,1999, 14 Pages.
"Can I Customize my Samsung Galaxy S® 4 Lock Screen? Which Features can I Access When the Device is Locked?", Retrieved From: <http://www.samsung.com/us/support/howtoguide/N0000006/10632/127767> Jul. 3, 2014, May 16, 2014, 12 Pages.
"Cholesteric Liquid Crystal", Retrieved from: <http://en.wikipedia.org/wiki/Cholesteric_liquid_crystal> on Aug. 6, 2012, Jun. 10, 2012, 2 pages.
"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, Jan. 2013, 1 page.
"Controlling Your Desktop's Power Management", Retrieved From: <http://www.vorkon.de/SU1210.001/drittanbieter/Dokumentation/openSUSE_11.2/manual/sec.gnomeuser.start.power_mgmt.html> Jul. 7, 2014, 6 Pages.
"Corrected Notice of Allowance", U.S. Appl. No. 13/470,633, dated Apr. 9, 2013, 2 pages.
"Corrected Notice of Allowance", U.S. Appl. No. 13/470,633, dated Jul. 2, 2013, 2 pages.
"Corrected Notice of Allowance", U.S. Appl. No. 13/563,435, dated Jan. 14, 2014, 2 pages.
"Corrected Notice of Allowance", U.S. Appl. No. 13/563,435, dated Mar. 20, 2014, 2 pages.
"Corrected Notice of Allowance", U.S. Appl. No. 13/563,435, dated Jan. 22, 2014, 2 pages.
"Corrected Notice of Allowance", U.S. Appl. No. 13/565,124, dated Apr. 3, 2014, 4 pages.
"Corrected Notice of Allowance", U.S. Appl. No. 13/565,124, dated Mar. 10, 2014, 2 pages.
"Corrected Notice of Allowance", U.S. Appl. No. 13/565,124, dated Apr. 14, 2014, 2 pages.
"Corrected Notice of Allowance", U.S. Appl. No. 13/651,327, dated Sep. 12, 2013, 2 pages.
"Corrected Notice of Allowance", U.S. Appl. No. 13/651,327, dated Sep. 23, 2013, 2 pages.
"Corrected Notice of Allowance", U.S. Appl. No. 13/651,726, dated Sep. 17, 2013, 2 pages.
"Corrected Notice of Allowance", U.S. Appl. No. 13/656,520, dated Jan. 16, 2014, 3 pages.
"Corrected Notice of Allowance", U.S. Appl. No. 13/715,133, dated Apr. 2, 2014, 2 pages.
"Corrected Notice of Allowance", U.S. Appl. No. 13/938,930, dated May 6, 2014, 2 pages.
"Corrected Notice of Allowance", U.S. Appl. No. 13/938,930, dated Jun. 6, 2014, 2 pages.
"Corrected Notice of Allowance", U.S. Appl. No. 13/939,002, dated May 22, 2014, 2 pages.
"Corrected Notice of Allowance", U.S. Appl. No. 13/939,002, dated Jun. 19, 2014, 2 pages.
"Corrected Notice of Allowance", U.S. Appl. No. 13/939,002, dated May 5, 2014, 2 pages.
"Corrected Notice of Allowance", U.S. Appl. No. 13/939,032, dated Jun. 26, 2014, 2 pages.
"Corrected Notice of Allowance", U.S. Appl. No. 14/199,924, dated Aug. 29, 2014, 2 pages.
"Corrected Notice of Allowance", U.S. Appl. No. 14/199,924, dated Sep. 5, 2014, 2 pages.
"Corrected Notice of Allowance", U.S. Appl. No. 14/199,924, dated Sep. 19, 2014, 2 pages.
"Developing Next-Generation Human Interfaces using Capacitive and Infrared Proximity Sensing", Silicon Laboratories, Inc., Available at <http://www.silabs.com/pages/DownloadDoc.aspx?FILEURL=support%20documents/technicaldocs/capacitive%20and%20proximity%20sensing_wp.pdf&src=SearchResults>,Aug. 30, 2010, pp. 1-10.
"Directional Backlighting for Display Panels", U.S. Appl. No. 13/021,448, dated Feb. 4, 2011, 38 pages.
"DR2PA", retrieved from <http://www.architainment.co.uk/wp-content/uploads/2012/08/DR2PA-AU-US-size-Data-Sheet-Rev-H_LOGO.pdf> on Sep. 17, 2012, Jan. 2012, 4 pages.
"Edwards 1508 Series Surface Wall Mount Electromagnetic Door Holder", Edwards Signaling, retrieved from <http://www.thesignalsource.com/documents/1508.pdf>, 2000, 1 page.
"Final Office Action", U.S. Appl. No. 12/163,614, dated Nov. 8, 2012, 15 pages.
"Final Office Action", U.S. Appl. No. 12/163,614, dated Aug. 19, 2011, 15 pages.
"Final Office Action", U.S. Appl. No. 13/021,448, dated Jan. 16, 2014, 33 Pages.
"Final Office Action", U.S. Appl. No. 13/371,725, dated Apr. 2, 2014, 22 pages.
"Final Office Action", U.S. Appl. No. 13/408,257, dated Mar. 28, 2014, 17 pages.
"Final Office Action", U.S. Appl. No. 13/471,001, dated Jul. 25, 2013, 20 pages.
"Final Office Action", U.S. Appl. No. 13/471,139, dated Sep. 16, 2013, 13 pages.
"Final Office Action", U.S. Appl. No. 13/471,336, dated Aug. 28, 2013, 18 pages.
"Final Office Action", U.S. Appl. No. 13/494,651, dated Jun. 11, 2014, 19 pages.
"Final Office Action", U.S. Appl. No. 13/525,070, dated Apr. 24, 2014, 21 pages.
"Final Office Action", U.S. Appl. No. 13/564,520, dated Jan. 15, 2014, 7 pages.
"Final Office Action", U.S. Appl. No. 13/603,918, dated Mar. 21, 2014, 14 pages.
"Final Office Action", U.S. Appl. No. 13/651,195, dated Apr. 18, 2013, 13 pages.
"Final Office Action", U.S. Appl. No. 13/651,232, dated May 21, 2013, 21 pages.
"Final Office Action", U.S. Appl. No. 13/651,287, dated May 3, 2013, 16 pages.
"Final Office Action", U.S. Appl. No. 13/651,976, dated Jul. 25, 2013, 21 pages.
"Final Office Action", U.S. Appl. No. 13/653,321, dated Aug. 2, 2013, 17 pages.
"Final Office Action", U.S. Appl. No. 13/653,682, dated Jun. 11, 2014, 11 pages.
"Final Office Action", U.S. Appl. No. 13/653,682, dated Oct. 18, 2013, 16 pages.

(56) References Cited

OTHER PUBLICATIONS

"Final Office Action", U.S. Appl. No. 13/656,055, dated Oct. 23, 2013, 14 pages.
"Final Office Action", U.S. Appl. No. 13/780,228, dated Mar. 28, 2014, 13 pages.
"Final Office Action", U.S. Appl. No. 13/938,930, dated Nov. 8, 2013, 10 pages.
"Final Office Action", U.S. Appl. No. 13/939,002, dated Nov. 8, 2013, 7 pages.
"Final Office Action", U.S. Appl. No. 13/939,032, dated Dec. 20, 2013, 5 pages.
"Final Office Action", U.S. Appl. No. 14/063,912, dated Apr. 29, 2014, 10 pages.
"Final Office Action", U.S. Appl. No. 14/199,924, dated May 6, 2014, 5 pages.
"FingerWorks Installation and Operation Guide for the TouchStream ST and TouchStream LP", FingerWorks, Inc. Retrieved from <http://ec1.images-amazon.com/media/i3d/01/A/man-migrate/MANUAL000049862.pdf>, 2002, 14 pages.
"First One Handed Fabric Keyboard with Bluetooth Wireless Technology", Retrieved from: <http://press.xtvworld.com/article3817.html> on May 8, 2012, Jan. 6, 2005, 2 pages.
"For Any Kind of Proceeding 2011 Springtime as Well as Coil Nailers as Well as Hotter Summer Season", Lady Shoe Worlds, retrieved from <http://www.ladyshoesworld.com/2011/09/18/for-any-kind-of-proceeding-2011-springtime-as-well-as-coil-nailers-as-well-as-hotter-summer-season/> on Nov. 3, 2011,Sep. 8, 2011, 2 pages.
"Force and Position Sensing Resistors: An Emerging Technology", Interlink Electronics, Available at <http://staff.science.uva.nl/~vlaander/docu/FSR/An_Exploring_Technology.pdf>,Feb. 1990, pp. 1-6.
"Foreign Notice of Allowance", CN Application No. 201320096755.7, dated Jan. 27, 2014, 2 pages.
"Foreign Notice of Allowance", CN Application No. 201320097065.3, dated Nov. 21, 2013, 2 pages.
"Foreign Office Action", CN Application No. 201110272868.3, dated Apr. 1, 2013, 10 pages.
"Foreign Office Action", CN Application No. 201320097065.3, dated Jun. 18, 2013, 2 pages.
"Foreign Office Action", CN Application No. 201320097066.8, dated Oct. 24, 2013, 5 Pages.
"Foreign Office Action", CN Application No. 201320097079.5, dated Sep. 26, 2013, 4 pages.
"Foreign Office Action", CN Application No. 201320328022.1, dated Feb. 17, 2014, 4 Pages.
"Foreign Office Action", CN Application No. 201320328022.1, dated Oct. 18, 2013, 3 Pages.
"Frogpad Introduces Wearable Fabric Keyboard with Bluetooth Technology", Retrieved from: <http://www.geekzone.co.nz/content.asp?contentid=3898> on May 7, 2012, Jan. 7, 2005, 3 pages.
"How to Use the iPad's Onscreen Keyboard", Retrieved from <http://www.dummies.com/how-to/content/how-to-use-the-ipads-onscreen-keyboard.html> on Aug. 28, 2012, 2012, 3 pages.
"iControlPad 2—The open source controller", Retrieved from <http://www.kickstarter.com/projects/1703567677/icontrolpad-2-the-open-source-controller> on Nov. 20, 2012, 2012, 15 pages.
"i-Interactor electronic pen", Retrieved from: <http://www.alibaba.com/product-gs/331004878/i_Interactor_electronic_pen.html> on Jun. 19, 2012, 2012, 5 pages.
"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.
"Interlink Electronics FSR (TM) Force Sensing Resistors (TM)", Retrieved at <<http://akizukidenshi.com/download/ds/interlinkelec/94-00004+Rev+B%20FSR%20Integration%20Guide.pdf on Mar. 21, 2013, 36 pages.
"International Search Report and Written Opinion", Application No. PCT/US2013/028479, dated Jun. 17, 2013, 10 pages.

"International Search Report and Written Opinion", Application No. PCT/US2014/031531, dated Jun. 20, 2014, 10 Pages.
"International Search Report and Written Opinion", Application No. PCT/US2013/051421, dated Dec. 6, 2013, 10 pages.
"International Search Report and Written Opinion", Application No. PCT/US2013/065154, dated Feb. 5, 2014, 10 pages.
"International Search Report and Written Opinion", Application No. PCT/US2014/020050, dated May 9, 2014, 10 pages.
"International Search Report and Written Opinion", Application No. PCT/US2013/043961, dated Oct. 17, 2013, 11 pages.
"International Search Report and Written Opinion", Application No. PCT/US2013/053683, dated Nov. 28, 2013, 11 pages.
"International Search Report and Written Opinion", Application No. PCT/US2014/016654, dated May 16, 2014, 11 pages.
"International Search Report and Written Opinion", Application No. PCT/US2013/028481, dated Jun. 19, 2014, 11 pages.
"International Search Report and Written Opinion", Application No. PCT/US2013/028948, dated Jun. 21, 2013, 11 pages.
"International Search Report and Written Opinion", Application No. PCT/US2013/029461, dated Jun. 21, 2013, 11 pages.
"International Search Report and Written Opinion", Application No. PCT/US2013/040968, dated Sep. 5, 2013, 11 pages.
"International Search Report and Written Opinion", Application No. PCT/US2013/067912, dated Feb. 13, 2014, 12 pages.
"International Search Report and Written Opinion", Application No. PCT/US2013/075180, dated May 6, 2014, 12 pages.
"International Search Report and Written Opinion", Application No. PCT/US2013/044871, dated Aug. 14, 2013, 12 pages.
"International Search Report and Written Opinion", Application No. PCT/US2013/042550, dated Sep. 24, 2013, 14 pages.
"International Search Report and Written Opinion", Application No. PCT/US2014/013928, dated May 12, 2014, 17 pages.
"International Search Report and Written Opinion", Application No. PCT/US2013/045283, dated Mar. 12, 2014, 19 pages.
"International Search Report and Written Opinion", Application No. PCT/US2013/055679, dated Nov. 18, 2013, 8 pages.
"International Search Report and Written Opinion", Application No. PCT/US2011/050471, dated Apr. 9, 2012, 8 pages.
"International Search Report and Written Opinion", Application No. PCT/US2013/044873, dated Nov. 22, 2013, 9 pages.
"International Search Report and Written Opinion", Application No. PCT/US2013/063156, dated Dec. 5, 2013, 9 pages.
"International Search Report and Written Opinion", Application No. PCT/US2013/067905, dated Apr. 15, 2014, 9 pages.
"International Search Report and Written Opinion", Application No. PCT/US2013/042790, dated Aug. 8, 2013, 9 pages.
"International Search Report and Written Opinion", Application No. PCT/US2013/045049, dated Sep. 16, 2013, 9 pages.
"International Search Report", Application No. PCT/US2010/045676, dated Apr. 28, 2011, 2 Pages.
"International Search Report", Application No. PCT/US2010/046129, dated Mar. 2, 2011, 3 Pages.
"Lock Screen Overview (Windows Runtime Apps)", Retrieved From: <http://msdn.microsoft.com/en-in/library/windows/apps/hh779720.aspx> Jul. 8, 2014, Dec. 31, 2012, 5 Pages.
"Magnetic Cell Phone Holder", Extreme Computing, retrieved from <http://www.extremecomputing.com/magnetholder.html> on May 7, 2008, 1 page.
"Membrane Keyboards & Membrane Keypads", Retrieved from: <http://www.pannam.com/> on May 9, 2012, Mar. 4, 2009, 2 pages.
"Microsoft Develops Glasses-Free Eye-Tracking 3D Display", Tech-FAQ—retrieved from <http://www.tech-faq.com/microsoft-develops-glasses-free-eye-tracking-3d-display.html> on Nov. 2, 2011, Nov. 2, 2011, 3 pages.
"Microsoft Reveals Futuristic 3D Virtual HoloDesk Patent", Retrieved from <http://www.patentbolt.com/2012/05/microsoft-reveals-futuristic-3d-virtual-holodesk-patent.htmlt> on May 28, 2012, May 23, 2012, 9 pages.
"Microsoft Tablet PC", Retrieved from <http://web.archive.org/web/20120622064335/https://en.wikipedia.org/wiki/Microsoft_Tablet_PC> on Jun. 4, 2014, Jun. 21, 2012, 9 pages.
"Molex:PCI Express Mini Card Connector, Right Angle, Low-Profile, Mid-Mount 0.80mm (.031") Pitch", Retrieved from <http://

(56) References Cited

OTHER PUBLICATIONS rhu004.sma-promail.com/SQLImages/kelmscott/Molex/PDF_Images/987650-4441.PDF> on Feb. 6, 2013, 2010, 3 pages.

"Motion Sensors", Android Developers—retrieved from <http://developer.android.com/guide/topics/sensors/sensors_motion.html> on May 25, 2012, 2012, 7 pages.

"MPC Fly Music Production Controller", AKAI Professional, Retrieved from: <http://www.akaiprompc.com/mpc-fly> on Jul. 9, 2012, 4 pages.

"NI Releases New Maschine & Maschine Mikro", Retrieved from <http://www.djbooth.net/index/dj-equipment/entry/ni-releases-new-maschine-mikro/> on Sep. 17, 2012, 19 pages.

"Non-Final Office Action", U.S. Appl. No. 13/409,967, dated Dec. 10, 2013, 5 pages.

"Non-Final Office Action", U.S. Appl. No. 13/599,635, dated Feb. 25, 2014, 13 pages.

"Non-Final Office Action", U.S. Appl. No. 12/163,614, dated Apr. 27, 2011, 15 pages.

"Non-Final Office Action", U.S. Appl. No. 12/163,614, dated May 24, 2012, 15 pages.

"Non-Final Office Action", U.S. Appl. No. 12/882,994, dated Feb. 1, 2013, 17 pages.

"Non-Final Office Action", U.S. Appl. No. 13/021,448, dated Dec. 13, 2012, 9 pages.

"Non-Final Office Action", U.S. Appl. No. 13/021,448, dated Aug. 16, 2013, 25 pages.

"Non-Final Office Action", U.S. Appl. No. 13/371,725, dated Nov. 7, 2013, 19 pages.

"Non-Final Office Action", U.S. Appl. No. 13/408,257, dated Dec. 5, 2013, 13 pages.

"Non-Final Office Action", U.S. Appl. No. 13/468,918, dated Dec. 26, 2013, 18 pages.

"Non-Final Office Action", U.S. Appl. No. 13/468,949, dated Jun. 20, 2014, 10 pages.

"Non-Final Office Action", U.S. Appl. No. 13/470,951, dated Jul. 2, 2014, 19 pages.

"Non-Final Office Action", U.S. Appl. No. 13/471,001, dated Feb. 19, 2013, 15 pages.

"Non-Final Office Action", U.S. Appl. No. 13/471,001, dated Jun. 17, 2014, 23 pages.

"Non-Final Office Action", U.S. Appl. No. 13/471,030, dated May 15, 2014, 10 pages.

"Non-Final Office Action", U.S. Appl. No. 13/471,054, dated Jun. 3, 2014, 15 pages.

"Non-Final Office Action", U.S. Appl. No. 13/471,139, dated Mar. 21, 2013, 12 pages.

"Non-Final Office Action", U.S. Appl. No. 13/471,186, dated Feb. 27, 2014, 8 pages.

"Non-Final Office Action", U.S. Appl. No. 13/471,202, dated Feb. 11, 2013, 10 pages.

"Non-Final Office Action", U.S. Appl. No. 13/471,237, dated Mar. 24, 2014, 7 pages.

"Non-Final Office Action", U.S. Appl. No. 13/471,336, dated Jan. 18, 2013, 14 pages.

"Non-Final Office Action", U.S. Appl. No. 13/471,336, dated May 7, 2014, 17 pages.

"Non-Final Office Action", U.S. Appl. No. 13/471,376, dated Apr. 2, 2014, 17 pages.

"Non-Final Office Action", U.S. Appl. No. 13/471,405, dated Feb. 20, 2014, 37 pages.

"Non-Final Office Action", U.S. Appl. No. 13/492,232, dated Apr. 30, 2014, 9 pages.

"Non-Final Office Action", U.S. Appl. No. 13/494,651, dated Feb. 4, 2014, 15 pages.

"Non-Final Office Action", U.S. Appl. No. 13/494,722, dated May 9, 2014, 8 pages.

"Non-Final Office Action", U.S. Appl. No. 13/525,070, dated Jan. 17, 2014, 19 pages.

"Non-Final Office Action", U.S. Appl. No. 13/527,263, dated Apr. 3, 2014, 6 pages.

"Non-Final Office Action", U.S. Appl. No. 13/527,263, dated Jul. 19, 2013, 5 pages.

"Non-Final Office Action", U.S. Appl. No. 13/563,435, dated Jun. 14, 2013, 6 pages.

"Non-Final Office Action", U.S. Appl. No. 13/564,520, dated Feb. 14, 2014, 5 pages.

"Non-Final Office Action", U.S. Appl. No. 13/564,520, dated Jun. 19, 2013, 8 pages.

"Non-Final Office Action", U.S. Appl. No. 13/564,520, dated Jun. 16, 2014, 5 pages.

"Non-Final Office Action", U.S. Appl. No. 13/565,124, dated Jun. 17, 2013, 5 pages.

"Non-Final Office Action", U.S. Appl. No. 13/595,700, dated Jun. 18, 2014, 8 pages.

"Non-Final Office Action", U.S. Appl. No. 13/599,763, dated May 28, 2014, 6 pages.

"Non-Final Office Action", U.S. Appl. No. 13/603,918, dated Dec. 19, 2013, 12 pages.

"Non-Final Office Action", U.S. Appl. No. 13/645,405, dated Jan. 31, 2014, 6 pages.

"Non-Final Office Action", U.S. Appl. No. 13/647,479, dated Jul. 3, 2014, 10 pages.

"Non-Final Office Action", U.S. Appl. No. 13/651,195, dated Jan. 2, 2013, 14 pages.

"Non-Final Office Action", U.S. Appl. No. 13/651,232, dated Jan. 17, 2013, 15 pages.

"Non-Final Office Action", U.S. Appl. No. 13/651,232, dated Dec. 5, 2013, 15 pages.

"Non-Final Office Action", U.S. Appl. No. 13/651,272, dated Feb. 12, 2013, 10 pages.

"Non-Final Office Action", U.S. Appl. No. 13/651,287, dated Jan. 29, 2013, 13 pages.

"Non-Final Office Action", U.S. Appl. No. 13/651,304, dated Mar. 22, 2013, 9 pages.

"Non-Final Office Action", U.S. Appl. No. 13/651,327, dated Mar. 22, 2013, 6 pages.

"Non-Final Office Action", U.S. Appl. No. 13/651,726, dated Apr. 15, 2013, 6 pages.

"Non-Final Office Action", U.S. Appl. No. 13/651,871, dated Mar. 18, 2013, 14 pages.

"Non-Final Office Action", U.S. Appl. No. 13/651,871, dated Jul. 1, 2013, 5 pages.

"Non-Final Office Action", U.S. Appl. No. 13/651,976, dated Feb. 22, 2013, 16 pages.

"Non-Final Office Action", U.S. Appl. No. 13/651,976, dated Jun. 16, 2014, 23 pages.

"Non-Final Office Action", U.S. Appl. No. 13/653,321, dated Feb. 1, 2013, 13 pages.

"Non-Final Office Action", U.S. Appl. No. 13/653,682, dated Feb. 7, 2013, 11 pages.

"Non-Final Office Action", U.S. Appl. No. 13/653,682, dated Feb. 26, 2014, 10 pages.

"Non-Final Office Action", U.S. Appl. No. 13/653,682, dated Jun. 3, 2013, 14 pages.

"Non-Final Office Action", U.S. Appl. No. 13/655,065, dated Apr. 24, 2014, 16 pages.

"Non-Final Office Action", U.S. Appl. No. 13/656,055, dated Mar. 12, 2014, 17 pages.

"Non-Final Office Action", U.S. Appl. No. 13/656,055, dated Apr. 23, 2013, 11 pages.

"Non-Final Office Action", U.S. Appl. No. 13/656,520, dated Feb. 1, 2013, 15 pages.

"Non-Final Office Action", U.S. Appl. No. 13/656,520, dated Jun. 5, 2013, 8 pages.

"Non-Final Office Action", U.S. Appl. No. 13/780,228, dated Oct. 30, 2013, 12 pages.

"Non-Final Office Action", U.S. Appl. No. 13/938,930, dated Aug. 29, 2013, 9 pages.

"Non-Final Office Action", U.S. Appl. No. 13/939,002, dated Aug. 28, 2013, 6 pages.

"Non-Final Office Action", U.S. Appl. No. 13/939,002, dated Dec. 20, 2013, 5 pages.

(56) References Cited

OTHER PUBLICATIONS

"Non-Final Office Action", U.S. Appl. No. 13/939,032, dated Aug. 29, 2013, 7 pages.
"Non-Final Office Action", U.S. Appl. No. 13/974,994, dated Jun. 4, 2014, 24 pages.
"Non-Final Office Action", U.S. Appl. No. 13/975,087, dated May 8, 2014, 18 pages.
"Non-Final Office Action", U.S. Appl. No. 14/063,912, dated Jan. 2, 2014, 10 pages.
"Non-Final Office Action", U.S. Appl. No. 14/199,924, dated Apr. 10, 2014, 6 pages.
"Non-Final Office Action", U.S. Appl. No. 14/200,595, dated Apr. 11, 2014, 4 pages.
"Non-Final Office Action", U.S. Appl. No. 14/225,250, dated Jun. 17, 2014, 5 pages.
"Non-Final Office Action", U.S. Appl. No. 14/225,276, dated Jun. 13, 2014, 6 pages.
"Non-Final Office Action", U.S. Appl. No. 14/277,240, dated Jun. 13, 2014, 6 pages.
"Notice of Allowance", U.S. Appl. No. 12/163,614, dated Apr. 3, 2013, 9 pages.
"Notice of Allowance", U.S. Appl. No. 12/882,994, dated Jul. 12, 2013, 9 pages.
"Notice of Allowance", U.S. Appl. No. 13/409,967, dated Feb. 14, 2014, 4 pages.
"Notice of Allowance", U.S. Appl. No. 13/468,918, dated Jun. 17, 2014, 5 pages.
"Notice of Allowance", U.S. Appl. No. 13/470,633, dated Mar. 22, 2013, 7 pages.
"Notice of Allowance", U.S. Appl. No. 13/471,139, dated Mar. 17, 2014, 4 pages.
"Notice of Allowance", U.S. Appl. No. 13/471,186, dated Jul. 3, 2014, 7 pages.
"Notice of Allowance", U.S. Appl. No. 13/471,202, dated May 28, 2013, 7 pages.
"Notice of Allowance", U.S. Appl. No. 13/471,237, dated May 12, 2014, 8 pages.
"Notice of Allowance", U.S. Appl. No. 13/471,405, dated Jun. 24, 2014, 9 pages.
"Notice of Allowance", U.S. Appl. No. 13/563,435, dated Nov. 12, 2013, 5 pages.
"Notice of Allowance", U.S. Appl. No. 13/565,124, dated Dec. 24, 2013, 6 pages.
"Notice of Allowance", U.S. Appl. No. 13/589,773, dated Sep. 16, 2014, 8 pages.
"Notice of Allowance", U.S. Appl. No. 13/651,195, dated Jul. 8, 2013, 9 pages.
"Notice of Allowance", U.S. Appl. No. 13/651,232, dated Apr. 25, 2014, 9 pages.
"Notice of Allowance", U.S. Appl. No. 13/651,272, dated May 2, 2013, 7 pages.
"Notice of Allowance", U.S. Appl. No. 13/651,287, dated May 2, 2014, 6 pages.
"Notice of Allowance", U.S. Appl. No. 13/651,304, dated Jul. 1, 2013, 5 pages.
"Notice of Allowance", U.S. Appl. No. 13/651,327, dated Jun. 11, 2013, 7 pages.
"Notice of Allowance", U.S. Appl. No. 13/651,726, dated May 31, 2013, 5 pages.
"Notice of Allowance", U.S. Appl. No. 13/651,871, dated Oct. 2, 2013, 7 pages.
"Notice of Allowance", U.S. Appl. No. 13/653,321, dated Dec. 18, 2013, 4 pages.
"Notice of Allowance", U.S. Appl. No. 13/656,520, dated Oct. 2, 2013, 5 pages.
"Notice of Allowance", U.S. Appl. No. 13/667,408, dated Mar. 13, 2014, 11 pages.
"Notice of Allowance", U.S. Appl. No. 13/715,133, dated Jan. 6, 2014, 7 pages.
"Notice of Allowance", U.S. Appl. No. 13/938,930, dated Feb. 20, 2014, 4 pages.
"Notice of Allowance", U.S. Appl. No. 13/939,002, dated Mar. 3, 2014, 4 pages.
"Notice of Allowance", U.S. Appl. No. 13/939,032, dated Apr. 3, 2014, 4 pages.
"Notice of Allowance", U.S. Appl. No. 14/018,286, dated May 23, 2014, 8 pages.
"Notice of Allowance", U.S. Appl. No. 14/199,924, dated Jun. 10, 2014, 4 pages.
"Notice to Grant", CN Application No. 201320097089.9, dated Sep. 29, 2013, 2 Pages.
"Notice to Grant", CN Application No. 201320097124.7, dated Oct. 8, 2013, 2 pages.
"On-Screen Keyboard for Windows 7, Vista, XP with Touchscreen", Retrieved from <www.comfort-software.com/on-screen-keyboard.html> on Aug. 28, 2012, Feb. 2, 2011, 3 pages.
"Optical Sensors in Smart Mobile Devices", ON Semiconductor, TND415/D, Available at <http://www.onsemi.jp/pub_link/Collateral/TND415-D.PDF>,Nov. 2010, pp. 1-13.
"Optics for Displays: Waveguide-based Wedge Creates Collimated Display Backlight", OptoIQ, retrieved from <http://www.optoiq.com/index/photonics-technologies-applications/lfw-display/lfw-article-display.articles.laser-focus-world.volume-46.issue-1.world-news.optics-for_displays.html> on Nov. 2, 2010,Jan. 1, 2010, 3 pages.
"PCI Express® SMT Connector | FCI", Retrieved from <http://www.ttiinc.com/object/fp_fci_PCISMT> on Feb. 6, 2013, Feb. 2013, 1 page.
"Position Sensors", Android Developers—retrieved from <http://developer.android.com/guide/topics/sensors/sensors_position.html> on May 25, 2012, 5 pages.
"Real-Time Television Content Platform", retrieved from <http://www.accenture.com/us-en/pages/insight-real-time-television-platform.aspx> on Mar. 10, 2011, May 28, 2002, 3 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/468,918, dated Nov. 29, 2013, 6 pages.
"Restriction Requirement", U.S. Appl. No. 13/603,918, dated Nov. 27, 2013, 8 pages.
"Restriction Requirement", U.S. Appl. No. 13/715,133, dated Oct. 28, 2013, 6 pages.
"Restriction Requirement", U.S. Appl. No. 13/367,812, dated Mar. 11, 2014, 6 pages.
"Restriction Requirement", U.S. Appl. No. 13/471,139, dated Jan. 17, 2013, 7 pages.
"Restriction Requirement", U.S. Appl. No. 13/494,722, dated Dec. 20, 2013, 6 pages.
"Restriction Requirement", U.S. Appl. No. 13/589,773, dated Aug. 6, 2014, 6 pages.
"Restriction Requirement", U.S. Appl. No. 13/595,700, dated May 28, 2014, 6 pages.
"Restriction Requirement", U.S. Appl. No. 13/651,304, dated Jan. 18, 2013, 7 pages.
"Restriction Requirement", U.S. Appl. No. 13/651,726, dated Feb. 22, 2013, 6 pages.
"Restriction Requirement", U.S. Appl. No. 13/651,871, dated Feb. 7, 2013, 6 pages.
"Restriction Requirement", U.S. Appl. No. 13/715,133, dated Dec. 3, 2013, 6 pages.
"Restriction Requirement", U.S. Appl. No. 13/715,229, dated Aug. 13, 2013, 7 pages.
"RoPD® Connectors", Retrieved from <http://www.rosenberger.de/documents/headquarters_de_en/ba_automotive/AUTO_RoPD_Flyer_2012.pdf> on May 14, 2013, Jun. 2012, 6 pages.
"SMART Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.

(56) References Cited

OTHER PUBLICATIONS

"SolRxTM E-Series Multidirectional Phototherapy ExpandableTM 2-Bulb Full Body Panel System", Retrieved from: <http://www.solarcsystems.com/us_multidirectional_uv_light_therapy_1_intro.html > on Jul. 25, 2012, 2011, 4 pages.
"Supplemental Notice of Allowance", U.S. Appl. No. 13/653,321, dated Mar. 28, 2014, 4 pages.
"Supplemental Notice of Allowance", U.S. Appl. No. 14/018,286, dated Jun. 11, 2014, 5 pages.
"Surface", Retrieved from <http://www.microsoft.com/surface/en-us/support/hardware-and-drivers/type-cover> on Dec. 24, 2013, 6 pages.
"Teach Me Simply", Retrieved From: <http://techmesimply.blogspot.in/2013/05/yugatech_3.html> on Nov. 22, 2013, May 3, 2013, pp. 1-6.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.
"Tilt Shift Lenses: Perspective Control", retrieved from http://www.cambridgeincolour.com/tutorials/tilt-shift-lenses1.htm, Mar. 28, 2008 , 11 Pages.
"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.
"Welcome to Windows 7", Retrieved from: <http://www.microsoft.com/en-us/download/confirmation.aspx?id=4984> on Aug. 1, 2013, Sep. 16, 2009, 3 pages.
"What is Active Alignment?", http://www.kasalis.com/active_alignment.html, retrieved on Nov. 22, 2012,Nov. 22, 2012, 2 Pages.
"What is the PD-Net Project About?", retrieved from <http://pd-net.org/about/> on Mar. 10, 2011, Mar. 10, 2011, 3 pages.
"Windows 7: Display Reminder When Click on Shutdown?", Retrieved From: <http://www.sevenforums.com/customization/118688-display-reminder-when-click-shutdown.html> Jul. 8, 2014, Oct. 18, 2010, 5 Pages.
"Write & Learn Spellboard Advanced", Available at <http://somemanuals.com/VTECH,WRITE%2526LEARN--SPELLBOARD--ADV--71000,JIDFHE.PDF>, 2006, 22 pages.
Bathiche, et al., "Input Device with Interchangeable Surface", U.S. Appl. No. 13/974,749, Aug. 23, 2013, 51 pages.
Bert, et al., "Passive Matrix Addressing of Electrophoretic Image Display", Conference on International Display Research Conference, Retrieved from <http://www.cmst.be/publi/eurodisplay2002_s14-1.pdf>,Oct. 1, 2002, 4 pages.
Block, et al., "DeviceOrientation Event Specification", W3C, Editor's Draft, retrieved from <https://developer.palm.com/content/api/dev-guide/pdk/accessing-device-sensors.html> on May 25, 2012,Jul. 12, 2011, 14 pages.
Breath, "ThinkSafe: A Magnetic Power Connector for Thinkpads", Retrieved from <http://www.instructables.com/id/ThinkSafe%3A-A-Magnetic-Power-Connector-for-Thinkpad/> on May 14, 2013, Oct. 26, 2006, 9 pages.
Brown, "Microsoft Shows Off Pressure-Sensitive Keyboard", retrieved from <http://news.cnet.com/8301-17938_105-10304792-1.html> on May 7, 2012, Aug. 6, 2009, 2 pages.
Burge, et al.,' "Determination of off-axis aberrations of imaging systems using on-axis measurements", SPIE Proceeding, Retrieved from <http://www.loft.optics.arizona.edu/documents/journal_articles/Jim_Burge_Determination_of_off-axis_aberrations_of_imaging_systems_using_on-axis_measurements.pdf>,Sep. 21, 2011, 10 pages.
Butler, et al.,' "SideSight: Multi-"touch" Interaction around Small Devices", In the proceedings of the 21st annual ACM symposium on User interface software and technology., retrieved from <http://research.microsoft.com/pubs/132534/sidesight_crv3.pdf> on May 29, 2012,Oct. 19, 2008, 4 pages.
Campbell, "Future iPhones May Unlock, Hide Messages based on a User's Face", Retrieved From:<http://appleinsider.com/articles/13/12/03/future-iphones-may-unlock-hide-messages-based-on-a-users-face> Jul. 3, 2014, Dec. 3, 2013, 11 Pages.
Caprio, "Enabling Notification Badges for Whatsapp and Other Android Apps", Retrieved From: <http://geek.ng/2013/05/enabling-notification-badges-for-whatsapp-and-other-android-apps.html> Jul. 3, 2014, May 20, 2014, 7 Pages.
Carlon, "How to Add a WhatsApp Widget to your Lock Screen", Retrieved From: <http://www.androidpit.com/how-to-add-a-whatsapp-widget-to-your-lock-screen> Jul. 3, 2014, Apr. 9, 2014, 6 Pages.
Chang, et al.,' "Optical Design and Analysis of LCD Backlight Units Using ASAP", Optical Engineering, Available at <http://www.opticsvalley.com/resources/kbasePDF/ma_oe_001_optical_design.pdf>,Jun. 2003, 15 pages.
Chavan, et al.,' "Synthesis, Design and Analysis of a Novel Variable Lift Cam Follower System", In Proceedings: International Journal of Design Engineering, vol. 3, Issue Inderscience Publishers,Jun. 3, 2010, 1 Page.
Constine, "Cover is an Android-Only Lockscreen that Shows Apps When You Need Them", Retrieved From: <http://techcrunch.com/2013/10/24/cover-android/> Jul. 2, 2014, Oct. 24, 2013, 15 pages.
Crider, "Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.
Das, et al.,' "Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.
Dietz, et al.,' "A Practical Pressure Sensitive Computer Keyboard", In Proceedings of UIST 2009, Oct. 2009, 4 pages.
Diverdi, et al.,' "An Immaterial Pseudo-3D Display with 3D Interaction", In the proceedings of Three-Dimensional Television: Capture, Transmission, and Display, Springer, Retrieved from <http://www.cs.ucsb.edu/~holl/pubs/DiVerdi-2007-3DTV.pdf>,Feb. 6, 2007, 26 pages.
Eckel, "Personalize Alerts with the Help of OS X Mavericks Notifications", Retrieved From: <http://www.techrepublic.com/article/customize-os-x-mavericks-notifications-to-personalize-alerts/> Jul. 8, 2014, Mar. 10, 2014, 7 Pages.
Gaver, et al.,' "A Virtual Window on Media Space", retrieved from <http://www.gold.ac.uk/media/15gaver-smets-overbeeke.MediaSpaceWindow.chi95.pdf> on Jun. 1, 2012, retrieved from <http://www.gold.ac.uk/media/15gaver-smets-overbeeke.MediaSpaceWindow.chi95.pdf> on Jun. 1, 2012,May 7, 1995, 9 pages.
Glatt, "Channel and Key Pressure (Aftertouch).", Retrieved from: <http://home.roadrunner.com/~jgglatt/tutr/touch.htm> on Jun. 11, 2012, 2012, 2 pages.
Grossman, et al.,' "Multi-Finger Gestural Interaction with 3D Volumetric Displays", In the proceedings of the 17th annual ACM symposium on User interface software and technology, Retrieved from <http://www.dgp.toronto.edu/papers/tgrossman_UIST2004.pdf>,Oct. 24, 2004, 61-70.
Hanlon, "ElekTex Smart Fabric Keyboard Goes Wireless", Retrieved from: <http://www.gizmag.com/go/5048/ > on May 7, 2012, Jan. 15, 2006, 5 pages.
Harada, et al.,' "VoiceDraw: A Hands-Free Voice-Driven Drawing Application for People With Motor Impairments", In Proceedings of Ninth International ACM SIGACCESS Conference on Computers and Accessibility, retrieved from <http://citeseerx.ist.psu.edu/viewdoc/download?doi=10.1.1.113.7211&rep=rep1&type=pdf> on Jun. 1, 2012,Oct. 15, 2007, 8 pages.
Haslam, "This App for Android Customizes your Lock Screen Automatically Depending on Time of Day or Situation", Retrieved From: <http://www.redmondpie.com/this-app-for-android-customizes-your-lock-screen-automatically-depending-on-time-of-day-or-situation/> Jul. 8, 2014, Jun. 1, 2012, 6 Pages.
Henry, "Supercharge Your Lock Screen with DashClock and These Add-Ons", Retrieved From: <http://lifehacker.com/supercharge-your-lock-screen-with-dashclock-and-these-a-493206006> Jul. 3, 2014, May 7, 2013, 12 Pages.
Hinckley, et al.,' "Codex: A Dual Screen Tablet Computer", Conference on Human Factors in Computing Systems, Apr. 9, 2009, 10 pages.

(56) References Cited

OTHER PUBLICATIONS

Iwase, "Multistep Sequential Batch Assembly of Three-Dimensional Ferromagnetic Microstructures with Elastic Hinges", Retrieved at <<http://ieeexplore.ieee.org/stamp/stamp.jsp?tp=&arnumber=1549861>> Proceedings: Journal of Microelectromechanical Systems, Dec. 2005, 7 pages.
Izadi, et al., "ThinSight: A Thin Form-Factor Interactive Surface Technology", Communications of the ACM, vol. 52, No. 12, retrieved from <http://research.microsoft.com/pubs/132532/p90-izadi.pdf> on Jan. 5, 2012,Dec. 2009, pp. 90-98.
Jacobs, et al.,' "2D/3D Switchable Displays", In the proceedings of Sharp Technical Journal (4), Available at <https://cgi.sharp.co.jp/corporate/rd/journal-85/pdf/85-04.pdf>,Apr. 2003, pp. 15-18.
Justin, "SEIDIO ACTIVE with Kickstand for the Galaxy SIII", Retrieved From: <http://www.t3chniq.com/seidio-active-with-kickstand-gs3/> on Nov. 22, 2013, Jan. 3, 2013, 5 Pages.
Kaufmann, et al.,' "Hand Posture Recognition Using Real-time Artificial Evolution", EvoApplications'09, retrieved from <http://evelyne.lutton.free.fr/Papers/KaufmannEvolASP2010.pdf> on Jan. 5, 2012,Apr. 3, 2010, 10 pages.
Kaur, "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.
Khuntontong, et al.,' "Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.
Kim, et al.,' "A Controllable Viewing Angle LCD with an Optically isotropic liquid crystal", Journal of Physics D: Applied Physics, vol. 43, No. 14, Mar. 23, 2010, 7 Pages.
Lahr, "Development of a Novel Cam-based Infinitely Variable Transmission", Proceedings: In Thesis of Master of Science in Mechanical Engineering, Virginia Polytechnic Institute and State University,Nov. 6, 2009, 91 pages.
Lambert, "Cam Design", In Proceedings: Kinematics and dynamics of Machine, University of Waterloo Department of Mechanical Engineering,Jul. 2, 2002, pp. 51-60.
Lane, et al.,' "Media Processing Input Device", U.S. Appl. No. 13/655,065, Oct. 18, 2012, 43 pages.
Lee, "Flat-Panel Autostereoscopic 3D Display", Optoelectronics, IET, Available at <http://ieeexplore.ieee.org/stamp/stamp.jsp?arnumber=04455550>,Feb. 2008, pp. 24-28.
Lee, "Flat-panel Backlight for View-sequential 3D Display", Optoelectronics, IEE Proceedings—.vol. 151. No. 6 IET, Dec. 2004, 4 pages.
Lee, et al.,' "Depth-Fused 3D Imagery on an Immaterial Display", In the proceedings of IEEE Transactions on Visualization and Computer Graphics, vol. 15, No. 1, Retrieved from <http://ieeexplore.ieee.org/stamp/stamp.jsp?arnumber=04540094>,Jan. 2009, 20-33.
Lee, et al.,' "LED Light Coupler Design for a Ultra Thin Light Guide", Journal of the Optical Society of Korea, vol. 11, Issue.3, Retrieved from <http://opticslab.kongju.ac.kr/pdf/06.pdf>,Sep. 2007, 5 pages.
Li, et al.,' "Characteristic Mode Based Tradeoff Analysis of Antenna-Chassis Interactions for Multiple Antenna Terminals", In IEEE Transactions on Antennas and Propagation, Retrieved from <http://ieeexplore.ieee.org/stamp/stamp.jsp?tp=&arnumber=6060882>,Feb. 2012, 13 pages.
Linderholm, "Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.
Liu, et al.,' "Three-dimensional PC: toward novel forms of human-computer interaction", In the proceedings of Three-Dimensional Video and Display: Devices and Systems vol. CR76, Retrieved from <http://www.google.co.in/url?sa=t&rct=j&q=Three-dimensional+PC:+toward+novel+forms+of+human-computer+interaction&source=web&cd=1&ved=0CFoQFjAA&url=http%3A%2F%2Fciteseerx.ist.psu.edu%2Fviewdoc%2Fdownload%3Fdoi%3D10.1.1.32.9469%26rep%3Drep1%26,Nov. 5, 2000, 250-281.

Mack, "Moto X: The First Two Weeks", Retrieved From: <http://www.gizmag.com/two-weeks-motorola-google-moto-x-review/28722/> Jul. 8, 2014, Aug. 16, 2013, 8 pages.
Manresa-Yee, et al.,' "Experiences Using a Hands-Free Interface", In Proceedings of the 10th International ACM SIGACCESS Conference on Computers and Accessibility, retrieved from <http://dmi.uib.es/~cmanresay/Research/%5BMan08%5DAssets08.pdf> on Jun. 1, 2012,Oct. 13, 2008, pp. 261-262.
McLellan, "Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.
McLellan, "Microsoft Surface Review", Retrieved from <http://www.zdnet.com/microsoft-surface-review-7000006968/> on May 13, 2013, Nov. 6, 2012, 17 pages.
Miller, "MOGA gaming controller enhances the Android gaming experience", Retrieved from <http://www.zdnet.com/moga-gaming-controller-enhances-the-android-gaming-experience-7000007550/> on Nov. 20, 2012, Nov. 18, 2012, 9 pages.
Morookian, et al.,' "Ambient-Light-Canceling Camera Using Subtraction of Frames", NASA Tech Briefs, Retrieved from <http://ntrs.nasa.gov/archive/nasa/casi.ntrs.nasa.gov/20110016693_2011017808.pdf>,May 2004, 2 pages.
Nakanishi, et al.,' "Movable Cameras Enhance Social Telepresence in Media Spaces", In Proceedings of the 27th International Conference on Human Factors in Computing Systems, retrieved from <http://smg.ams.eng.osaka-u.ac.jp/~nakanishi/hnp_2009_chi.pdf> on Jun. 1, 2012,Apr. 6, 2009, 10 pages.
Patterson, "iOS 7 Tip: Alerts, Banners, and Badges—What's The Difference?", Retrieved From: <http://heresthethingblog.com/2014/01/22/ios-7-tip-whats-difference-alert/>, Jan. 22, 2014, 6 Pages.
Peli, "Visual and Optometric Issues with Head-Mounted Displays", IS & T/OSA Optics & Imaging in the Information Age, The Society for Imaging Science and Technology, available at <http://www.u.arizona.edu/~zrui3/zhang_pHMPD_spie07.pdf>,1996, pp. 364-369.
Piltch, "ASUS Eee Pad Slider SL101 Review", Retrieved from <http://www.laptopmag.com/review/tablets/asus-eee-pad-slider-sl101.aspx>, Sep. 22, 2011, 5 pages.
Post, et al.,' "E-Broidery: Design and Fabrication of Textile-Based Computing", IBM Systems Journal, vol. 39, Issue 3 & 4, Jul. 2000, pp. 840-860.
Prospero, "Samsung Outs Series 5 Hybrid PC Tablet", Retrieved from: <http://blog.laptopmag.com/samsung-outs-series-5-hybrid-pc-tablet-running-windows-8> on Oct. 31, 2013, Jun. 4, 2012, 7 pages.
Purcher, "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a- new-3d-gui-for-ios-devices.html> on Jun. 4, 2012,Jan. 12, 2012, 15 pages.
Qin, et al.,' "pPen: Enabling Authenticated Pen and Touch Interaction on Tabletop Surfaces", In Proceedings of ITS 2010, Available at <http://www.dfki.de/its2010/papers/pdf/po172.pdf>,Nov. 2010, pp. 283-284.
Ramirez, "Applying Solventless Elastomeric Polyurethanes on Concrete in Wastewater Service", In Proceedings: Journal of Protective Coatings and Linings, May 1995, 13 pages.
Reilink, et al.,' "Endoscopic Camera Control by Head Movements for Thoracic Surgery", In Proceedings of 3rd IEEE RAS & EMBS International Conference of Biomedical Robotics and Biomechatronics, retrieved from <http://doc.utwente.nl/74929/1/biorob_online.pdf> on Jun. 1, 2012,Sep. 26, 2010, pp. 510-515.
Reisman, et al.,' "A Screen-Space Formulation for 2D and 3D Direct Manipulation", In the proceedings of the 22nd annual ACM symposium on User interface, Retrieved from <http://innovis.cpsc.ucalgary.ca/innovis/uploads/Courses/TableTopDetails2009/Reisman2009.pdf>,Oct. 4, 2009, 69-78.
Ritche, "How to Use Lock Screen, Today, Popups, and Banners in Notification Center for iPhone and iPad", Retrieved From: <http://www.imore.com/how-use-notification-center-iphone-ipad> Jul. 3, 2014, Apr. 30, 2014, 8 pages.

(56) References Cited

OTHER PUBLICATIONS

Royman, "NiLS Lockscreen Notifications", Retrieved From: <https://play.google.com/store/apps/details?id=com.roymam.android.notificationswidget&hl=en> Jul. 3, 2014, Jun. 28, 2014, 3 Pages.

Salman, "Create a Minimal Lock Screen With WidgetLocker", Retrieved From: <http://android.appstorm.net/how-to/create-a-minimal-lock-screen-with-widgetlocker/> Jul. 3, 2014, Dec. 26, 2011, 12 Pages.

Sanap, et al.,' "Design and Analysis of Globoidal Cam Index Drive", Proceedings: In International Journal of Scientific Research Engineering & Technology, Jun. 2013, 6 Pages.

Schoning, et al.,' "Building Interactive Multi-Touch Surfaces", Journal of Graphics, GPU, and Game Tools, vol. 14, No. 3, available at <http://www.libavg.com/raw-attachment/wiki/Multitouch/Multitouchguide_draft.pdf>,Nov. 2009, pp. 35-55.

Siddiqui, "Hinge Mechanism for Rotatable Component Attachment", U.S. Appl. No. 13/852,848, Mar. 28, 2013, 51 pages.

Staff, "Gametel Android controller turns tablets, phones into portable gaming devices", Retrieved from <http://www.mobiletor.com/2011/11/18/gametel-android-controller-turns-tablets-phones-into-portable-gaming-devices/#> on Nov. 20, 2012, Nov. 18, 2011, 5 pages.

Sumimoto, "Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.

Sundstedt, "Gazing at Games: Using Eye Tracking to Control Virtual Characters", In ACM SIGGRAPH 2010 Courses, retrieved from <http://www.tobii.com/Global/Analysis/Training/EyeTrackAwards/veronica_sundstedtpdf> on Jun. 1, 2012,Jul. 28, 2010, 85 pages.

Takamatsu, et al.,' "Flexible Fabric Keyboard with Conductive Polymer-Coated Fibers", In Proceedings of Sensors 2011, Oct. 28, 2011, 4 pages.

Thurrott, "Nokia Lumia "Black": Glance 2.0", Retrieved From:<http://winsupersite.com/windows-phone/nokia-lumia-black-glance-20> Jul. 8, 2014, Jan. 11, 2014, 3 Pages.

Travis, et al.,' "Collimated Light from a Waveguide for a Display Backlight", Optics Express, 19714, vol. 17, No. 22, retrieved from <http://download.microsoft.com/download/D/2/E/D2E425F8-CF3C-4C71-A4A2-70F9D4081007/OpticsExpressbacklightpaper.pdf> on Oct. 15, 2009,Oct. 15, 2009, 6 pages.

Travis, et al.,' "Flat Projection for 3-D", In Proceedings of the IEEE, vol. 94 Issue: 3, Available at <http://ieeexplore.ieee.org/stamp/stamp.jsp?tp=&arnumber=1605201>,Mar. 13, 2006, pp. 539-549.

Travis, et al.,' "P-127: Linearity in Flat Panel Wedge Projection", SID 03 Digest, retrieved from <http://www2.eng.cam.ac.uk/~arlt1/Linearity%20in%20flat%20panel%20wedge%20projection.pdf>,May 12, 2005, pp. 716-719.

Travis, et al.,' "The Design of Backlights for View-Sequential 3D", retrieved from <http://download.microsoft.com/download/D/2/E/D2E425F8-CF3C-4C71-A4A2-        70F9D4081007/Backlightforviewsequentialautostereo.docx> on Nov. 1, 2010, 4 pages.

Valli, "Notes on Natural Interaction", retrieved from <http://www.idemployee.id.tue.nl/g.w.m.rauterberg/lecturenotes/valli-2004.pdf> on Jan. 5, 2012, Sep. 2005, 80 pages.

Valliath, "Design of Hologram for Brightness Enhancement in Color LCDs", Retrieved from <http://www.loreti.it/Download/PDF/LCD/44_05.pdf> on Sep. 17, 2012, May 1998, 5 pages.

Vauchelle, "Scopemate, A Robotic Microscope!", Architectradure, retrieved from <http://architectradure.blogspot.com/2011/10/at-uist-this-monday-scopemate-robotic.html> on Jun. 6, 2012,Oct. 17, 2011, 2 pages.

Whitwam, "How to Tweak Android's Lock Screen and Notifications", Retrieved From: <http://www.tested.com/tech/android/457766-tips-and-tricks-make-androids-lock-screen-and-notifications-even-better/?icid=pets%7Chat%7Ctestedlink%7C457766-how-to-tweak-androids-lock-screen-and-notifications> Jul. 3, 2014, Sep. 18, 2013, 4 Pages.

Williams, "A Fourth Generation of LCD Backlight Technology", Retrieved from <http://cds.linear.com/docs/Application%20Note/an65f.pdf>, Nov. 1995, 124 pages.

Xu, et al.,' "Hand Gesture Recognition and Virtual Game Control Based on 3D Accelerometer and EMG Sensors", IUI'09, Feb. 8-11, 2009, retrieved from <http://sclab.yonsei.ac.kr/courses/10TPR/10TPR.files/Hand%20Gesture%20Recognition%20and%20Virtual%20Game%20Control%20based%20on%203d%20accelerometer%20and%20EMG%20sensors.pdf> on Jan. 5, 2012,Feb. 8, 2009, 5 pages.

Xu, et al.,' "Vision-based Detection of Dynamic Gesture", ICTM'09, Dec. 5-6, 2009, retrieved from <http://ieeexplore.ieee.org/stamp/stamp.jsp?tp=&arnumber=5412956> on Jan. 5, 2012,Dec. 5, 2009, pp. 223-226.

Yagi, "The Concept of "AdapTV"", Series: The Challenge of "AdapTV", Broadcast Technology, No. 28, 2006, pp. 16-17.

Yan, et al.,' "Edge-Lighting Light Guide Plate Based on Micro-Prism for Liquid Crystal Display", Journal of Display Technology, vol. 5, No. 9, Available at <http://ieeexplore.ieee.org/ielx5/9425/5196834/05196835.pdf?tp=&arnumber=5196835&isnumber=5196834>,Sep. 2009, pp. 355-357.

Yu, et al.,' "A New Driving Scheme for Reflective Bistable Cholesteric Liquid Crystal Displays", Society for Information Display International Symposium Digest of Technical Papers, Retrieved from <http://www.ee.ust.hk/~eekwok/publications/1997/bcd_sid.pdf >,May 1997, 4 pages.

Zhang, "Design of Head Mounted Displays", Retrieved at <<http://www.optics.arizona.edu/optomech/student%20reports/2007/Design%20of%20mounteddisplays%20Zhang.pdf>>, Dec. 12, 2007, 6 pages.

Zhang, et al.,' "Model-Based Development of Dynamically Adaptive Software", In Proceedings of ICSE 2006, Available at <http://www.irisa.fr/lande/lande/icse-proceedings/icse/p371.pdf>,May 20, 2006, pp. 371-380.

Zhu, et al.,' "Keyboard before Head Tracking Depresses User Success in Remote Camera Control", In Proceedings of 12th IFIP TC 13 International Conference on Human-Computer Interaction, Part II, retrieved from <http://csiro.academia.edu/Departments/CSIRO_ICT_Centre/Papers?page=5> on Jun. 1, 2012,Aug. 24, 2009, 14 pages.

"Final Office Action", U.S. Appl. No. 14/200,595, dated Nov. 19, 2014, 5 pages.

"Non-Final Office Action", U.S. Appl. No. 13/371,725, dated Nov. 3, 2014, 27 pages.

"Non-Final Office Action", U.S. Appl. No. 13/564,520, dated Jan. 26, 2015, 6 pages.

"Supplemental Notice of Allowance", U.S. Appl. No. 13/589,773, dated Jan. 27, 2015, 2 pages.

"Supplemental Notice of Allowance", U.S. Appl. No. 13/589,773, dated Nov. 5, 2014, 2 pages.

"Can I see a Skydrive folder in Windows as computer disk?", retrieved from http://forums.techarena.in/technology-internet/1386082.htm on Aug. 5, 2011, 3 pages.

"Corrected Notice of Allowance", U.S. Appl. No. 13/371,725, dated Mar. 29, 2016, 2 pages.

"Corrected Notice of Allowance", U.S. Appl. No. 13/371,725, dated May 5, 2016, 2 pages.

"Corrected Notice of Allowance", U.S. Appl. No. 14/727,001, dated Jan. 25, 2016, 2 pages.

"Corrected Notice of Allowance", U.S. Appl. No. 14/727,001, dated Dec. 15, 2015, 2 pages.

"Final Office Action", U.S. Appl. No. 13/229,554, dated Dec. 4, 2013, 19 pages.

"Final Office Action", U.S. Appl. No. 13/551,297, dated Nov. 5, 2014, 18 pages.

"Final Office Action", U.S. Appl. No. 14/447,419, dated May 17, 2016, 10 pages.

"International Search Report and Written Opinion", Application No. PCT/US2015/042187, dated Oct. 20, 2015, 10 pages.

"International Search Report and Written Opinion", Application No. PCT/US2015/042259, dated Oct. 12, 2015, 11 pages.

"International Search Report and Written Opinion", Application No. PCT/US2015/041046, dated Nov. 9, 2015, 15 pages.

(56) References Cited

OTHER PUBLICATIONS

"Non-Final Office Action", U.S. Appl. No. 13/229,554, dated Aug. 16, 2013, 16 pages.
"Non-Final Office Action", U.S. Appl. No. 13/229,554, dated Nov. 17, 2014, 25 pages.
"Non-Final Office Action", U.S. Appl. No. 13/551,297, dated May 23, 2014, 17 pages.
"Non-Final Office Action", U.S. Appl. No. 14/447,419, dated Feb. 2, 2016, 8 pages.
"Non-Final Office Action", U.S. Appl. No. 14/994,737, dated Apr. 5, 2016, 6 pages.
"Notice of Allowance", U.S. Appl. No. 13/371,725, dated Jan. 29, 2016, 10 pages.
"Notice of Allowance", U.S. Appl. No. 14/727,001, dated Dec. 15, 2015, 2 pages.
"Second Written Opinion", Application No. PCT/US2015/021127, dated Feb. 25, 2016, 7 pages.
"Supplemental Notice of Allowance", U.S. Appl. No. 14/447,464, dated Jan. 12, 2016, 2 pages.
"Windows Live Logo Windows Live SkyDrive", retrieved from http://toostep.com/trends/india-one-three-chosen-to-test-skydrive-online-storage on Aug. 5, 2011, 2 pages.
"Windows Phone—Pictures Hub", retrieved from http://www.microsoft.com/windowsphone/en-gb/howto/wp7/pictures/pictures-hub.aspx on Jun. 21, 2012, 2012, 2 pages.
Antonopoulos,"Efficient Updates for Web-Scale Indexes over the Cloud", IEEE 28th International Conference on Data Engineering Workshops, Apr. 2012, 8 pages.
Levandoski,"Ranking and New Database Architectures", In Proceedings of the 7th International Workshop on Ranking in Databases, Aug. 2013, 4 pages.
Snavely,"Modeling the World from Internet Photo Collections", International Journal of Computer Vision, vol. 80, Issue 2—Available at <http://phototour.cs.washington.edu/ModelingTheWorld_ijcv07.pdf>, Nov. 2008, 22 pages.
"Non-Final Office Action", U.S. Appl. No. 14/448,946, dated Oct. 27, 2016, 17 pages.
"Non-Final Office Action", U.S. Appl. No. 14/460,985, dated Oct. 20, 2016, 19 pages.
"Non-Final Office Action", U.S. Appl. No. 14/448,911, dated Oct. 31, 2016, 22 pages.
"Second Written Opinion", Application No. PCT/US2015/041945, dated Jul. 12, 2016, 8 pages.
"Final Office Action", U.S. Appl. No. 13/229,554, dated Feb. 27, 2015, 29 pages.
"Final Office Action", U.S. Appl. No. 13/229,554, dated Jun. 16, 2016, 35 pages.
"Final Office Action", U.S. Appl. No. 14/447,262, dated Nov. 22, 2016, 20 pages.
"Final Office Action", U.S. Appl. No. 14/543,746, dated Dec. 1, 2016, 13 pages.
"Foreign Notice of Allowance", CN Application No. 201180071183.0, dated Sep. 27, 2016, 6 pages.
"International Preliminary Report on Patentability", Application No. PCT/US2015/042226, dated Nov. 2, 2016, 7 pages.
"International Preliminary Report on Patentability", Application No. PCT/US2015/042218, dated Nov. 3, 2016, 7 pages.
"International Preliminary Report on Patentability", Application No. PCT/US2015/042205, dated Nov. 8, 2016, 7 pages.
"International Preliminary Report on Patentability", Application No. PCT/US2015/042259, dated Sep. 16, 2016, 8 pages.
"International Preliminary Report on Patentability", Application No. PCT/US2015/043892, dated Oct. 10, 2016, 8 pages.
"International Preliminary Report on Patentability", Application No. PCT/US2015/042371, dated Oct. 20, 2016, 8 pages.
"International Preliminary Report on Patentability", Application No. PCT/US2015/041930, dated Oct. 26, 2016, 9 pages.
"Non-Final Office Action", U.S. Appl. No. 13/229,554, dated Feb. 3, 2016, 33 pages.
"Non-Final Office Action", U.S. Appl. No. 14/447,190, dated Nov. 8, 2016, 10 pages.
"Non-Final Office Action", U.S. Appl. No. 14/746,298, dated Aug. 28, 2015, 6 pages.
"Notice of Allowance", U.S. Appl. No. 14/994,737, dated Nov. 30, 2016, 5 pages.
"Foreign Notice of Allowance", RU Application No. 2013152630, dated Jun. 21, 2016, 20 pages.
"International Preliminary Report on Patentability", Application No. PCT/US2015/021127, dated Jun. 3, 2016, 8 pages.
"International Search Report and Written Opinion", Application No. PCT/US2015/061713, dated May 12, 2016, 16 pages.
"Non-Final Office Action", U.S. Appl. No. 14/221,541, dated Jul. 7, 2016, 24 pages.
"Non-Final Office Action", U.S. Appl. No. 14/335,927, dated Jun. 3, 2016, 8 pages.
"Non-Final Office Action", U.S. Appl. No. 14/447,262, dated Jun. 3, 2016, 13 pages.
"Non-Final Office Action", U.S. Appl. No. 14/448,913, dated Jul. 28, 2016, 29 pages.
"Non-Final Office Action", U.S. Appl. No. 14/448,975, dated Jul. 1, 2016, 17 pages.
"Non-Final Office Action", U.S. Appl. No. 14/543,746, dated Jun. 1, 2016, 9 pages.
"Second Written Opinion", Application No. PCT/US2015/041909, dated Jun. 21, 2016, 6 pages.
"Second Written Opinion", Application No. PCT/US2015/041930, dated Jun. 21, 2016, 5 pages.
"Second Written Opinion", Application No. PCT/US2015/042187, dated Jun. 30, 2016, 5 pages.
"Second Written Opinion", Application No. PCT/US2015/042205, dated Jul. 8, 2016, 6 pages.
"Second Written Opinion", Application No. PCT/US2015/042218, dated Jul. 22, 2016, 6 pages.
"Second Written Opinion", Application No. PCT/US2015/042259, dated Jul. 7, 2016, 7 pages.
"Second Written Opinion", Application No. PCT/US2015/042371, dated Jun. 27, 2016, 7 pages.
"Final Office Action", U.S. Appl. No. 13/863,369, dated Aug. 18, 2016, 19 pages.
"Final Office Action", U.S. Appl. No. 14/,447,419, dated Aug. 29, 2016, 11 pages.
"Final Office Action", U.S. Appl. No. 14/994,737, dated Aug. 26, 2016, 6 pages.
"International Search Report and Written Opinion", Application No. PCT/US2015/054350, dated Feb. 5, 2016, 9 pages.
"Notice of Allowance", U.S. Appl. No. 14/335,927, dated Sep. 12, 2016, 7 pages.
"Second Written Opinion", Application No. PCT/US2015/041900, dated Jun. 30, 2016, 6 pages.
"Second Written Opinion", Application No. PCT/US2015/041965, dated Jul. 4, 2016, 6 pages.
March,"A Read-Only Distributed Has Table", IN Journal of Grip Computing, vol. 9, Issue 4, Apr. 27, 2011, pp. 501-529.
"Corrected Notice of Allowance", U.S. Appl. No. 14/944,737, dated Jan. 18, 2017, 2 pages.
"Corrected Notice of Allowance", U.S. Appl. No. 14/994,737, dated Mar. 2, 2017, 2 pages.
"Examiner's Answer to Appeal Brief", U.S. Appl. No. 14/447,419, dated Feb. 27, 2017, 8 pages.
"Final Office Action", U.S. Appl. No. 14/221,541, dated Mar. 9, 2017, 27 pages.
"Final Office Action", U.S. Appl. No. 14/448,911, dated Mar. 7, 2017, 28 pages.
"Final Office Action", U.S. Appl. No. 14/448,913, dated Feb. 9, 2017, 25 pages.
"Final Office Action", U.S. Appl. No. 14/448,946, dated Feb. 24, 2017, 25 pages.
"Final Office Action", U.S. Appl. No. 14/448,975, dated Dec. 16, 2016, 22 pages.
"International Preliminary Report on Patentability", Application No. PCT/US2015/041900, dated Oct. 11, 2016, 6 pages.

(56) References Cited

OTHER PUBLICATIONS

"International Preliminary Report on Patentability", Application No. PCT/US2015/042187, dated Oct. 31, 2016, 7 pages.
"International Preliminary Report on Patentability", Application No. PCT/US2015/041965, dated Dec. 19, 2016, 7 pages.
"International Preliminary Report on Patentability", Application No. PCT/US2015/041945, dated Sep. 8, 2016, 9 pages.
"Non-Final Office Action", U.S. Appl. No. 14/448,871, dated Feb. 17, 2017, 38 pages.
"Non-Final Office Action", U.S. Appl. No. 14/543,746, dated Mar. 10, 2017, 12 pages.
"Restriction Requirement", U.S. Appl. No. 14/447,44, dated Feb. 9, 2017, 7 pages.
Schrauwen,"Focused-Ion-Beam Fabrication of Slanted Grating Couplers in Silicon-on-Insulator Waveguides", IEEE Photonics Technology Letters, vol. 19, Issue 11, Jun. 1, 2007, 3 pages.
"Notice of Allowance", U.S. Appl. No. 15/426,116, dated Sep. 14, 2017, 7 pages.
"Final Office Action", U.S. Appl. No. 14/447,262, dated Dec. 12, 2017, 20 pages.
"Advisory Action", U.S. Appl. No. 14/448,913, dated Jun. 14, 2017, 3 pages.
"Corrected Notice of Allowance", U.S. Appl. No. 14/460,985, dated Aug. 15, 2017, 2 pages.
"Corrected Notice of Allowance", U.S. Appl. No. 14/460,985, dated Sep. 8, 2017, 2 pages.
"Final Office Action", U.S. Appl. No. 14/448,871, dated Aug. 24, 2017, 42 pages.
"Non-Final Office Action", U.S. Appl. No. 14/221,541, dated Jul. 7, 2017, 28 pages.
"Non-Final Office Action", U.S. Appl. No. 14/447,190, dated Jun. 28, 2017, 12 pages.
"Non-Final Office Action", U.S. Appl. No. 14/447,262, dated Jun. 28, 2017, 19 pages.
"Non-Final Office Action", U.S. Appl. No. 14/447,446, dated Jun. 9, 2017, 15 pages.
"Non-Final Office Action", U.S. Appl. No. 14/448,975, dated Jul. 28, 2017, 17 pages.
"Notice of Allowance", U.S. Appl. No. 14/448,913, dated Aug. 9, 2017, 10 pages.
"Notice of Allowance", U.S. Appl. No. 14/543,746, dated Jun. 12, 2017, 11 pages.
"Notice of Allowance", U.S. Appl. No. 14/543,746, dated Aug. 4, 2017, 5 pages.
"Advisory Action", U.S. Appl. No. 14/447,190, dated May 19, 2017, 3 pages.
"Corrected Notice of Allowance", U.S. Appl. No. 14/994,737, dated Mar. 20, 2017, 2 pages.
"Corrected Notice of Allowance", U.S. Appl. No. 14/994,737, dated Mar. 30, 2017, 2 pages.
"Corrected Notice of Allowance", U.S. Appl. No. 14/994,737, dated May 10, 2017, 2 pages.
"Final Office Action", U.S. Appl. No. 14/447,190, dated Mar. 10, 2017, 17 pages.
"Notice of Allowance", U.S. Appl. No. 14/460,985, dated May 25, 2017, 8 pages.

* cited by examiner

SHUTDOWN NOTIFICATIONS

BACKGROUND

Many computing devices, such as desktop computing devices and mobile phones, provide content-based notifications to users such as calendar reminders, text message alerts, voicemail indications, and so forth. Various notifications may come in the form of an icon which may or may not have a number associated with it. For example, e-mail notifications may come in the form of an envelope icon with a number that represents the number of new e-mails that have been received. Likewise, weather notifications may come in the form of some type of weather-based icon (such as a cloud). Notifications may be selectable in some instances to access underlying content and/or launch corresponding applications. Unfortunately, users do not have access to notifications when their devices unexpectedly shutdown, such as when critical battery level causes an automatic shutdown. As such, important notifications such as meeting reminders and unread text messages may be missed, which can be frustrating to the users.

SUMMARY

Shutdown notification techniques are described in which notifications associated with various applications and functionality of a device are presented in conjunction with a shutdown sequence. In one or more implementations, a shutdown of the device may be initiated automatically in response to low power conditions, device/application errors, restarts, or explicitly by a user. A notification system of a device may be configured to enable designation of particular notifications to show upon shutdown. Notifications to output at shutdown may be selected based upon various criteria including but not limited to selection based on a perceived importance, notification type, particular application(s), and/or particular user contacts. When a shutdown is initiated, a check is performed to determine whether any designated notifications are available. Then, available notifications may be exposed in various ways prior to complete shutdown, such as by showing the notifications as part of a user interface(s) for the shutdown sequence.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditionally, users do not have access to notifications provided by their devices when power levels or other conditions cause an unexpected shutdown. As such, important notifications such as meeting reminders and unread text messages may be missed, which can lead to user dissatisfaction.

Shutdown notification techniques are described in which notifications associated with various applications and functionality of a device are presented in conjunction with a shutdown sequence. In one or more implementations, a shutdown of the device may be initiated automatically in response to low power conditions, device/application errors, restarts, or explicitly by a user. A notification system of a device may be configured to enable designation of particular notifications to show upon shutdown. Notifications to output at shutdown may be selected based upon various criteria including but not limited to selection based on a perceived importance, notification type, particular application(s), and/or particular user contacts. When a shutdown is initiated, a check is performed to determine whether any designated notifications are available. Then, available notifications may be exposed in various ways prior to complete shutdown, such as by showing the notifications as part of a user interface(s) for the shutdown sequence.

The shutdown notifications described herein provide a mechanism by which users may have access to reminders before the reminders become inaccessible due to shutdown of the device. Accordingly, the shutdown notifications may assist in avoiding situations in which a user misses important notifications due to unexpected device shutdown. Moreover, the shutdown experience may be customized by the user to efficiently present selected types of notifications that the user perceives as being most important.

In the following discussion, an example environment is first described that may employ the techniques described herein. Example devices, user interfaces, and procedures are then described which may implemented within the example environment as well as in other environments. Consequently, implementation of the example devices, user interfaces and procedures is not limited to the example environment and the example environment is not limited to the example devices, user interfaces, and procedures.

Example Environment

Figure 1:
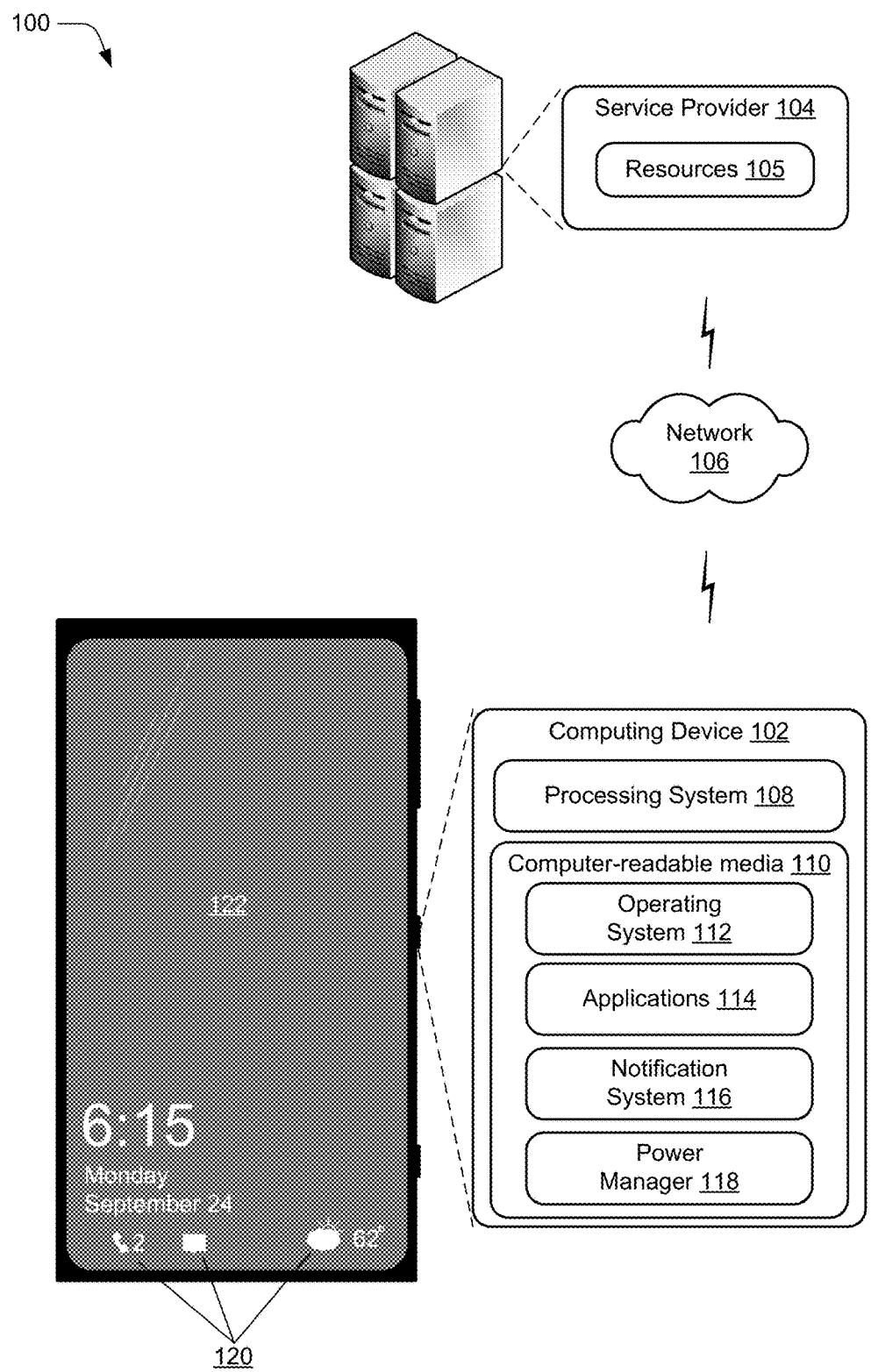
FIG. 1 illustrates an example operating environment in accordance with one or more implementations.

FIG. 1 is an illustration of an environment 100 in an example implementation that is operable to employ techniques described herein. The illustrated environment 100 includes a computing device 102 and a service provider 104 having various resources 105 that are communicatively coupled via a network 106. The computing device may be configured in various ways to access and interact with various resources 105 (e.g., content and services) that are made available by the service provider 104 over the network 106. Resources 105 can include any suitable combination of content and/or services typically made available over a network by one or more service providers. For instance, content can include various combinations of text, video, ads, audio, multi-media streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service. The computing device 102 and the service provider 104 may be implemented by a wide range of computing devices.

For example, a computing device 102 may be configured as a computer that is capable of communicating over the network 106, such as a desktop computer, a mobile station, an entertainment appliance, a tablet or slate device, a surface computing device, a set-top box communicatively coupled to a display device, a mobile communication device (e.g., a wireless phone as illustrated), a game console, and so forth. The computing device 102 may be configured as any suitable computing system and/or device that employ various processing systems, some additional examples of which are discussed in relation to the example system of FIG. 10.

The computing device 102 is further illustrated as including a processing system 108 and computer-readable media 110 through which various functionality described herein may be implemented. Details and examples of suitable processing systems and computer-readable media are also included below in the discussion of the example system of FIG. 10.

The computer-readable media 110 is depicted as storing example program modules representative of various functionality that may be executed via the processing system 108, including an operating system 112, applications 114, a notification system 116, and a power manager 118 that operate as described herein. Generally speaking, the operating system 112 is configured to abstract underlying functionality of the computing device 102 to applications 114 that are executable on the computing device 102. For example, the operating system 112 may abstract processing, memory, network, and/or display functionality of the computing device 102 such that the applications 114 may be written without knowing "how" this underlying functionality is implemented. The application 114, for instance, may provide data to the operating system 112 to be rendered and displayed by the display device without understanding how this rendering will be performed. The operating system 112 may provide various services, interfaces, and functionality that applications 114 may invoke to take advantage of system features. A variety of applications 114 to provide a wide range of functionality to the computing device 102 are contemplated including but not limited to a browser, an office productivity application, an email client, a multimedia management program, device management software, networking applications, to name a few examples.

Figure 4:
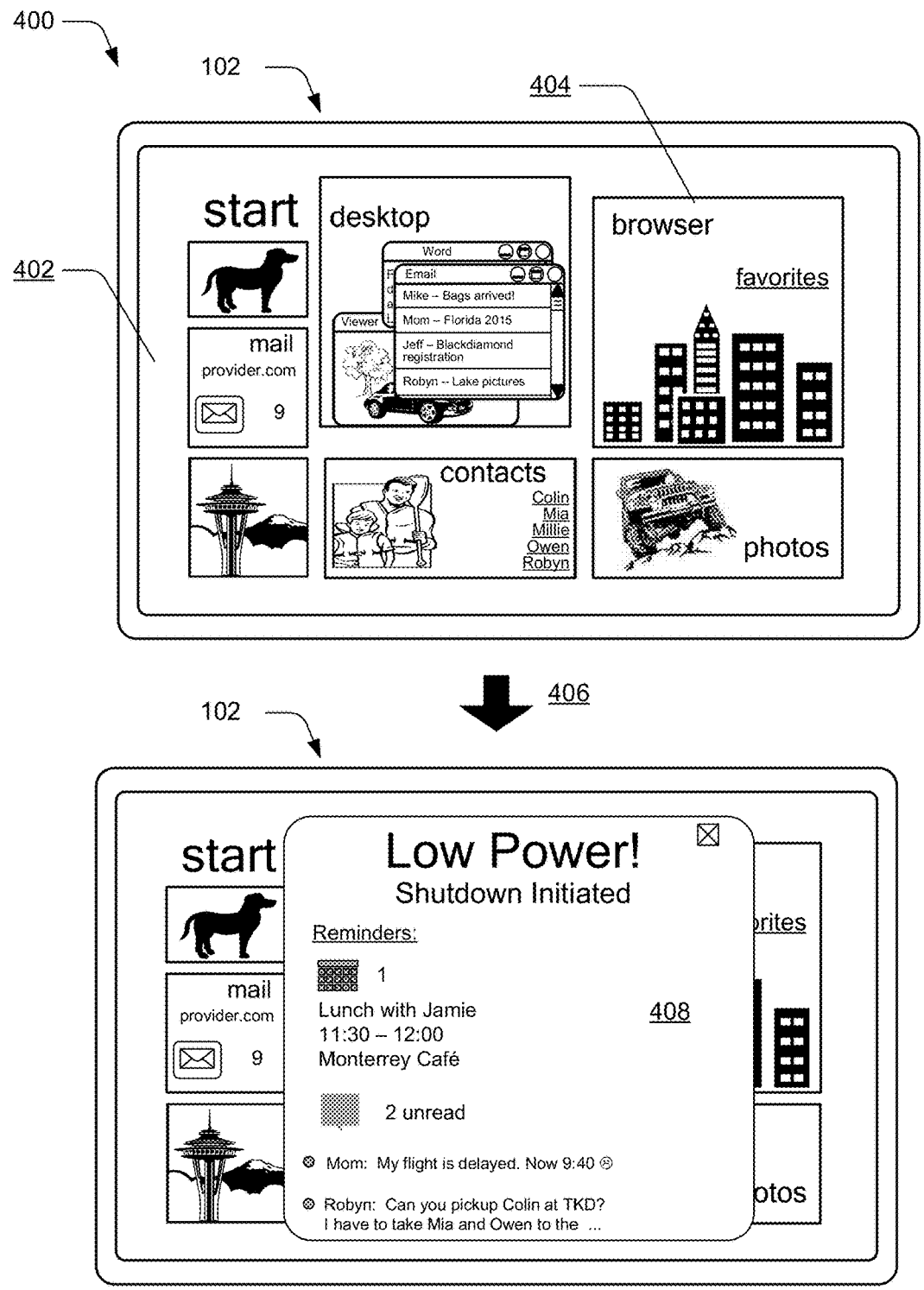
FIG. 4 illustrates another example user experience for a computing device having shutdown notifications in accordance with one or more implementations.

In one or more implementations, the operating system 112 is configured to facilitate interaction between applications 114 and the notification system 116 to obtain, configure, output and otherwise manage notifications 120 that may be exposed via various user interfaces 122. Additionally, the operating system 112 may represent other functionality, such as to manage a file system and a user interface(s) navigable by a user of the computing device 102. An example of this is illustrated as the user interface 122 configured as lock screen for the computing device 102 in FIG. 1. The lock screen is a user interface that is typically used by a device's operating system. Lock screens regulate immediate access to a device by having a user perform a certain action in order to receive access such as, by way of example and not limitation, entering a password, using a certain button combination, or by performing a certain gesture using the device's touchscreen. In this example, the lock screen is configured to display notifications 120 from various sources, such as indications of phone messages, text message alerts, and content from a weather application as shown. Further, the operating system 112 may also provide a start screen or home page UI for the device that includes representations of a various applications 114 that may be configured in various ways, such as by using icons, tiles, textual descriptions, and so forth. The representations may also incorporate live content that is associated with applications 114 including notifications 120. The start screen may include representations of selected items from a hierarchical file structure of the file system managed by the operating system 112. The representations or "tiles" may be selectable to launch a corresponding one of applications 110 for execution on the computing device 102. In this way, a user may readily navigate through a file structure and initiate execution of applications of interest. An example of a tile-based start screen is depicted in FIG. 4, which is discussed later in this document.

The notification system 116 and power manager 118, may be employed to implement techniques for shutdown notifications as well as other techniques. Although illustrated in the depicted example as standalone applications, the notification system 116 and power manager 118 may be combined together and/or or with other applications 114, or may alternatively represent components integrated with the operating system 112. The notification system 116 is representative of functionality to manage notifications including notifications 120 for alerts, messages, updates, and/or other live content that may be displayed as part of the representations of the applications an via various user interfaces 122. The notification system 116 may further provide functionality to view and manage notification settings including settings for shutdown notifications described herein. For example, the notification system 116 may enable a user to selectively turn shutdown notifications on and off, as well as to make selections to set-up and customize shutdown notifications.

The notification system 116 may operate to obtain various notifications on behalf of applications 114 that register with the notification system. Accordingly, the notifications may be handled by the notification system 116 without executing the corresponding applications 114. For example, the notification system 116 may receive notifications 120 from a variety of different sources, such as from software (e.g., other applications executed by the computing device 102), from a service provider 104 via the network 106, and so on.

For instance, the notification system 116 may interact with the service provider 104 to obtain notifications associated with various resources 105 using a push model, a pull model, or other suitable techniques suitable for obtaining notifications. The notification system 116 may then process the notifications and manage how the notifications are displayed as part of the representations and/or within various user interface without executing the applications 114. This approach may be used to improve battery life and performance of the computing device by not running each of the applications to handle the notifications.

The power manager 118 represents various functionality for power management of the computing device 102. For example, the power manager 118 may operate to handle power allocation to various device components, perform operations to switch between available power sources (e.g., battery, AC adapter, etc.), detect power conditions, perform power conservation functions, and so forth. In relation to shutdown notification techniques described herein, the power manager 118 may operate to determine conditions that initiate a shutdown sequence and implement a shutdown experience to gracefully handle the shutdown. The shutdown experience may involve exposing one or more user interfaces designed to inform a user regarding the shutdown and/or the timing of the shutdown, as well as to optionally enable some actions by the user prior to a complete shutdown (e.g., closing applications, saving files, etc.). In addition, the power manager 118 may communicate with or otherwise interact with the notification system 116 to facilitate inclusion of shutdown notifications as part of the shutdown experience.

In operation, communication may occur between the power manager 118 and the notification system 116 that is sufficient to convey indications to the notification system 116 when shutdowns of the device are initiated. Responsive to these indications, the notification system 116 performs operations to ascertain whether shutdown notifications are activated and determine whether any designated notifications are available. Then, the notification system 116 may cause available notifications to be exposed in various ways prior to complete shutdown, such as by configuring the notifications to be displayed via one or more user interfaces exposed via the power manager 118 during the shutdown sequence Shutdown notifications may also be presented in connection with a low power mode implemented via the power manager 118. Generally speaking, the low power mode causes the device to enter a state in which non-critical processing and applications may be suspended, the display screen brightness is set to a designated low level (e.g., dimmed), and minimal information is presented via the display. In one scenario, a low power microprocessor of a device, when available, may be used to implement the low power mode. Accordingly, a primary processing system and/or the operating system may be shutdown in the low power mode to reduce power consumption. The low power mode may be triggered by the power manager 118 to extend battery life in response to power conditions, such as when the device battery is drained to a configurable battery level, after a period of inactivity, or in response to user action to enter the low power mode. In a shutdown situation, using the low power mode may provide extended time for a user to view and/or take action in response to shutdown notifications that are shown in the display. In some scenarios, information regarding the shutdown including the notifications may be shown intermittently by periodically turning the display on and off, and/or keeping the display off until user interaction with the device is detected (e.g., picking up the device, placing a finger on or near the screen/device, and so forth). To do so, information sufficient to form the notifications may be loaded into memory associated with the display and then accessed as needed to output the notifications. Some devices may include persistent displays such as electrophoretic or other electronic paper displays, in which case shutdown notifications may be loaded to be presented on these display even after shutdown occurs. In an implementation, a device, case for the device, or accessory for the device may include or be adapted to include a persistent display that can be utilized in the described manner as well for other purposes and/or that may be employed with the device for dedicated display of important notifications (e.g., a dedicated notification display).

In any case, the display in the low power mode may be configured to provide access to important notifications, reminders, and other information at a glance for a period of time between initiation of a shutdown and a time at which shutdown occurs. This "at a glance" approach may further extend the time that shutdown notifications may be made available before complete shutdown. Details regarding these and other aspects of shutdown notifications can be found in the discussion that follows.

Having considered an example operating environment, consider now the following discussion of shutdown notification implementation details that includes description of representative example procedures and user interfaces.

Shutdown Notification Implementations Details

As introduced above, a notification system 116 associated with a computing device 102 may be configured to obtain, generate, output, and otherwise manage various notifications 120 related to different applications and device functionality. This may include providing notifications 120 in association with a shutdown sequence that is initiated via a power manger 118. Details regarding aspects of such shutdown notifications are described in this section in relation to some example procedures and user interface examples. The described procedures and user interfaces may be implemented by way of suitably configured devices, such as by a computing device 102 of FIG. 1 that includes or otherwise make use of a notification system 116 and/or power manager 118.

The procedures described in this document may be implemented utilizing the previously described environment, system, devices, and components and in connection with any suitable hardware, software, firmware, or combination thereof. The procedures may be represented as a set of blocks that specify operations performed by one or more entities and are not necessarily limited to the orders shown for performing the operations by the respective blocks.

In general, functionality, features, and concepts described in relation to the examples above may be employed in the context of the example user interfaces and procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples in this description.

Figure 2:
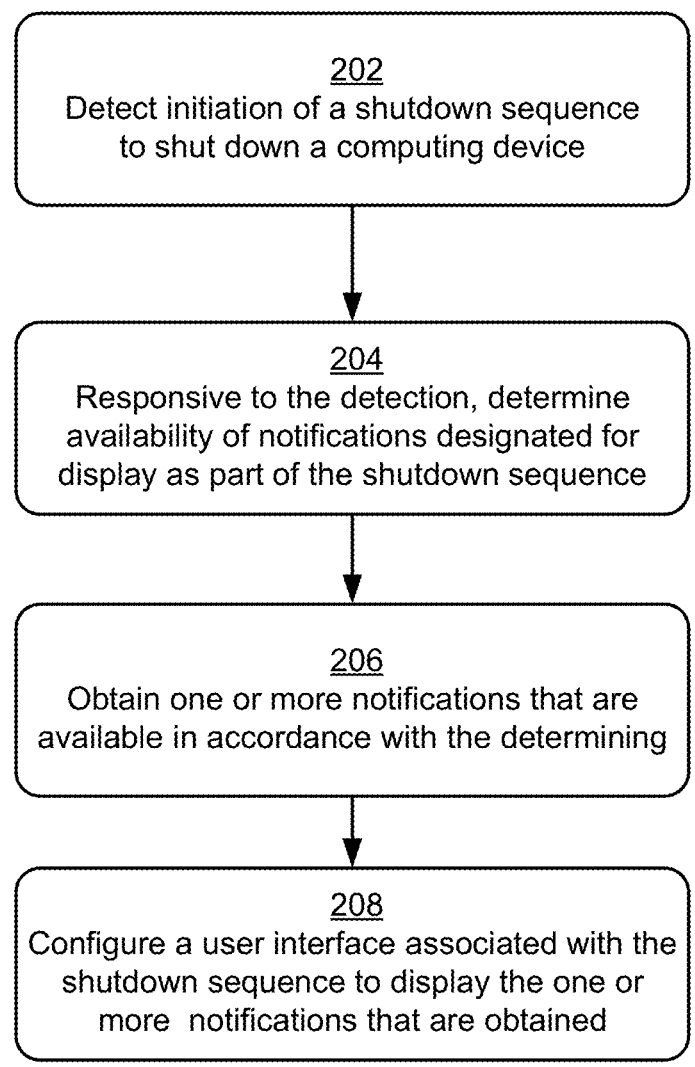
FIG. 2 is a flow diagram that depicts an example procedure to output shutdown notifications in accordance with one or more implementations.

As an example, consider FIG. 2 which illustrates an example procedure 200 in which notifications may be provided for a shutdown sequence in accordance with one or more implementations. Initiation of a shutdown sequence to shut down a computing device is detected (block 202). For example, the notification system 116 discussed previously may be configured to detect an impending shutdown in various ways. For instance, signals indicative of the shutdown may be communicated in response to various triggers, such as operation of an on/off control and/or when low power or other conditions occur that prompt an automatic shutdown to avoid data loss. In one approach, the shutdown sequence is triggered when a low power threshold designated for the computing device is reached, such as a configurable amount or percentage of remaining battery life. The low power threshold may be set to reserve enough power to provide sufficient time to present notifications as part of the shutdown and give users an adequate opportunity to view the notifications and take action if appropriate. The notification system 116 may be configured to recognize conditions indicative of a shutdown directly or through interaction with a power manager 118 as mentioned previously.

Responsive to the detection, availability of notifications designated for display as part of the shutdown sequence is determined (block 204). For example, the notification system 116 may be configured to perform operations to check whether any notifications of particular types selected for presentation during the shutdown sequence are available. This may involve a determination regarding whether or not shutdown notifications are activated for the device. Additionally, the notification system 116 may identify types or categories of notifications selected for display as part of the shutdown sequence and assess whether notifications corresponding to the identified types or categories are available.

As noted previously, notifications to output at shutdown may be selected based upon various criteria including but not limited to selection based on a perceived importance, notification type, particular application(s), and/or particular user contacts. Examples of notifications include calendar events and to-do-list items from a personal information management application, unread text messages from a messaging application, new emails associated with an email client, social network alerts (e.g., updates) from a social networking application, and alerts associated with other applications such as a new application, weather application, and so forth. Users may make selections via a settings user interface to designated particular information to include as notifications in the shutdown experience, details of which are discussed below in relation to FIGS. 8 and 9.

In the absence of user customizations of the notifications (or in addition to customizations), though, the notification system 116 may be configured to intelligently make automatic selections of notifications based on various criteria indicative of a perceived importance to the user. Criteria utilized to ascertain the perceived importance of a communication can include, by way of example and not limitation, one or more pre-defined types of notifications likely to be of high importance to users (e.g., calendar reminders and unread texts), people who have been identified as important to the user (such as by being specifically identified by a user, appearing in the user's contact list, and the like), people with whom frequent communication takes place, people with whom recent communication has taken place, and the like. At least some of the criteria may be derived from an analysis of communication logs such as e-mail logs, network logs, phone call and text logs, communication history, and the like.

Notifications to display as part of a shutdown sequence may also be identified based on a combination of criteria used for automatic selection and explicit user customizations described herein. For instance, available notifications including user-designated notifications and notifications in default categories may be ranked one to another and selectively displayed accordingly. In this example, preference may be given to user-designated notifications, but automatically selected notifications may be selectively shown along with user-designated notifications depending upon space constraints and/or in place of user-designated notifications when such notifications are not available (for example, no new messages are available from a designated user contact).

If shutdown notifications are turned off, or if no suitable notifications are available, then the shutdown sequence may proceed without presenting the notifications in the manner discussed herein. Assuming that the at least some available notifications are identified, though, one or more notifications that are available in accordance with the determining are obtained (block 206). The notifications may be obtained in various ways. For example, the notification system 116 may be configured to manage notifications on behalf of various applications as mentioned previously. To do so, the notification system 116 may collect notifications and maintain a database from which the notifications may be obtained. One or more application programming interfaces (APIs) or other interaction mechanisms may be provided to enable collection of the notifications from various sources and delivery of the notifications to various applications. Notifications may also be output in user interfaces associated with an operating system 112, such as via tiles or other representations. In this context, the notification system 116 may operate to collect notifications in advance of a shutdown and obtain notifications for designated types and categories directly from the mentioned database. In addition or alternatively, one or more applications may be configured to manage their own notification individually. In this case, the notification system 116 may obtain appropriate notifications through communications with individual applications, such as to request and receive notification updates from the applications. Various other techniques to obtain available notifications are also contemplated.

Thereafter, a user interface associated with the shutdown sequence is configured to display the one or more notifications that are obtained (block 208). Generally, one or more user interfaces associated with a shutdown experience may be configured to include or otherwise provide access to designated notifications. For, example notifications may be displayed as a scrollable list on a shutdown user interface configured to alert a user regarding an impending shutdown. Notifications may be presented as a continuous list or within groups such as for different applications and/or for different contacts. Different notifications or groups of notifications may also be presented via separate screens that are navigable by interaction with navigation controls (e.g., forward and back arrows) included within a shutdown user interface. In addition or alternatively, the shutdown user interface may be configured to include animations to transition between displays of different information.

For example, the interface may be configured to display an alert message to inform the user regarding the shutdown. Optionally, a representation of a timer may be included with the alert message to indicate time remaining prior to shutdown. An animation may then occur to expose indications of various notifications in a list or otherwise, such as fading in the notification and relocating/resizing the alert message. In addition or alternatively, transitions between different screens having different notifications or groups of notifications may be animated, such as by switching between the screens automatically at a time interval of a few seconds (e.g., cycling between views every two to five seconds). In this manner, screen real estate is conserved by conveying information for different notifications via different views.

Figure 3:
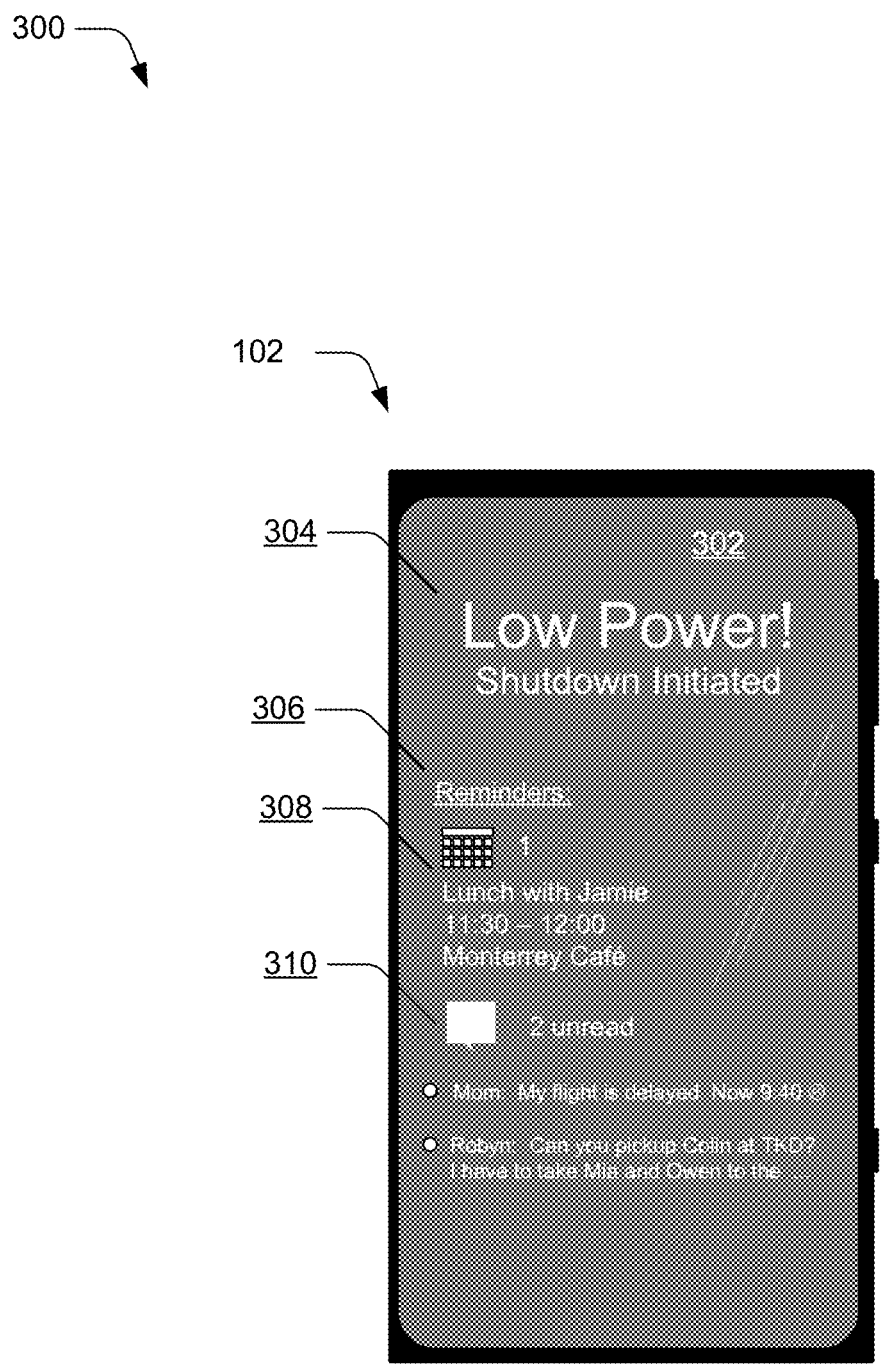
FIG. 3 illustrates an example user experience for a computing device having shutdown notifications in accordance with one or more implementations.
Figure 5:
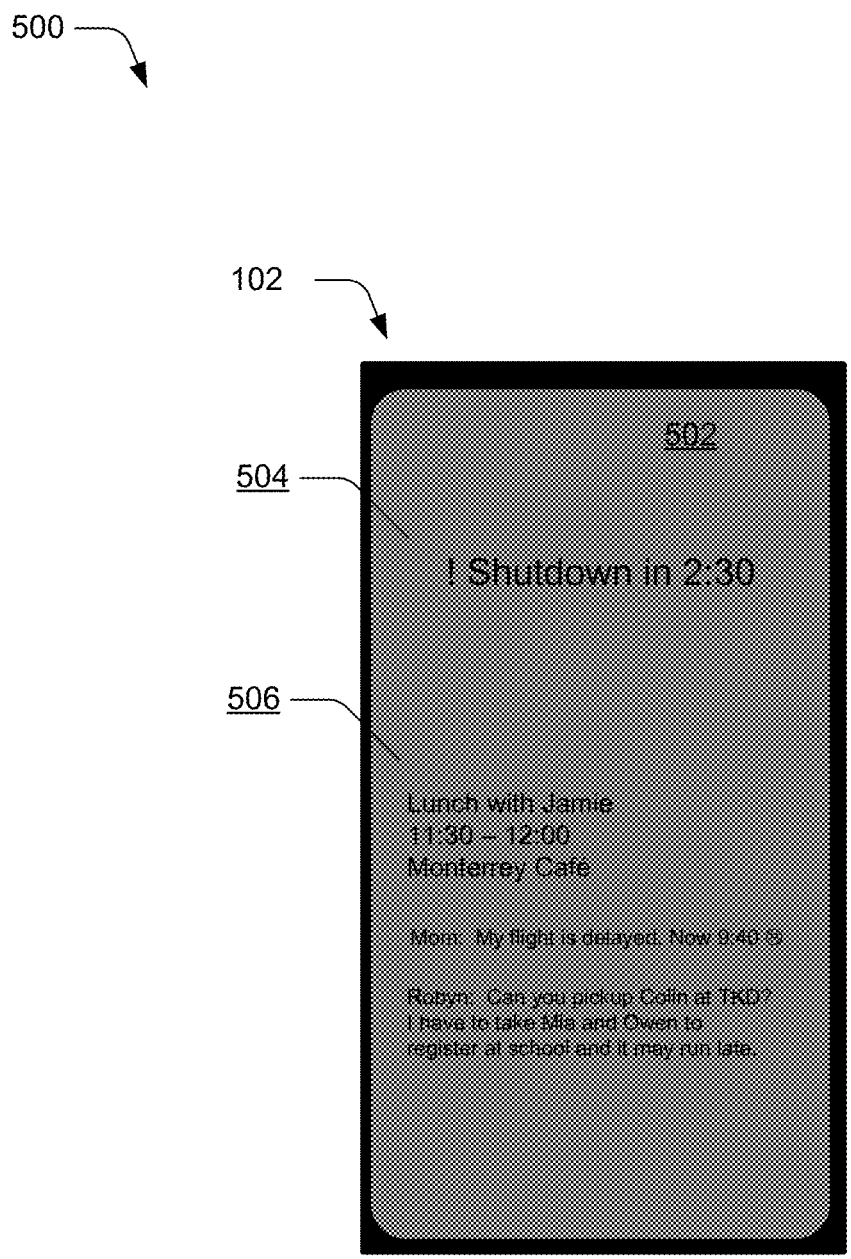
FIG. 5 illustrates another example user experience for a computing device having shutdown notifications in accordance with one or more implementations.

Additional details regarding suitable user interfaces and techniques that may be employed to present notifications as part of a shutdown sequence are discussed in relation to representative user interfaces of FIGS. 3-5. It is to be appreciated and understood, however, that other types of user interfaces can be utilized to implement notifications comparable to those discussed herein without departing from the spirit and scope of the claimed subject matter.

For example, FIG. 3 depicts generally at 300 an example computing device 102 in accordance with one or more implementations. In this example, the computing device displays an example shutdown user interface 302 on the computing device's display device that is associated with a shutdown sequence for the device. The shutdown user interface 302 may be output by a power manager 118 responsive to detection of conditions that prompt a shutdown of the device. Additionally, the shutdown user interface 302 may be configured by a notification system 116 to include various notifications. In this example, the shutdown user interface 302 includes an alert message 304 designed to inform a user regarding an impending shutdown. In particular, the example message indicates "Low Power! Shutdown Initiated." In accordance with techniques described herein, the shutdown user interface 302 may be configured to present one or more notifications 120 along with the alert message 304 in various ways. The alert message and notifications may appear together within the user interface and/or may be rendered in succession using transitions and animations, and/or different screens as mentioned previously. In the illustrated example, a reminder section 306 is depicted in which notifications designated in the manner described above and below may be displayed. For instance, notifications of selected types, from particular applications, and/or from designated contacts may be arranged within the reminder section 306. Here, the reminder section 306 is configured to organize designated notifications in groups by type or application. Groups may also be configured for individual contacts to show notifications associated with the contacts across different types and applications. The groups represented in this example include a calendar group 308 to present notifications in the form of calendar events and a messaging group 310 to present notifications regarding unread text messages. Naturally, additional groups and/or types of notifications may also be arranged in a comparable manner.

FIG. 4 depicts generally at 400 another example computing device 102 in accordance with one or more implementations. In this example, the computing device 102 is represented as a tablet device, wireless phone or other mobile device including a user interface 402 in the form of a start screen for the device that provides representations 404 of a various applications 114 that may be configured in various ways, such as by using icons, tiles, textual descriptions, and so forth. In the depicted example, the representations 404 are configured in the form of tiles. As mentioned, the notification system 116 is representative of functionality to manage notifications including providing notifications 120 for alerts, messages, updates, and/or other live content that may be displayed as part of the representations 404 and/or in connection with a shutdown sequence as described herein.

For example, in response to a trigger 406 a shutdown user interface 408 may be output as represented in FIG. 4. The shutdown user interface 408 may be configured in various ways examples of which are described in the preceding discussion and in relation to additional example below. In the example, of FIG. 4, the shutdown user interface 408 is configured as a message box or window that is exposed in connection with the user interface 402. The shutdown user interface 408 may be configured to include alert messages and notifications in various forms, including the examples discussed above in relation to FIGS. 1-3. The shutdown user interface 408 may alternatively be configured as a message for a notification bar, a slide out "toast message", a split screen window, a full screen presentation, or other suitable user interface instrumentalities.

FIG. 5 depicts generally at 500 another example computing device 102 in accordance with one or more implementations. In this example, the computing device displays an example shutdown user interface 502 on the computing device's display device that is associated with a shutdown sequence for the device. Specifically, the shutdown user interface 502 is representative of an interface that may be exposed in connection with a low power mode as discussed previously in relation to FIG. 1. To briefly reiterate, the low power mode is configured to provide access to important notifications, reminders, and other information at a glance for a period of time between initiation of a shutdown and a time at which shutdown occurs. This "at a glance" approach may be employed to further extend the time that shutdown notifications may be made available before complete shutdown. The low power mode may be implemented by a microprocessor or other "low power" processing system that is separate from a primary processing system of the device. Accordingly, in low power mode the primary processing system and/or operating system may be shut down or suspended. The low power mode may be facilitated by using a display device that includes capabilities to implement the low power mode, such as an integrated memory to store notifications and/or persistent display technology.

Moreover, the user interface shutdown 502 for the low power mode may be configured to include features designed to reduce power consumption and extend battery life. For instance, color schemes and arrangement of elements may be selected with power considerations in mind. Further, the shutdown user interface 502 may be configured to present minimal information and screen brightness may be dimmed to a designated low level. To illustrate these aspects, the shutdown user interface 502 is illustrated as having a relatively small alert message 504 that indicates "! Shutdown in 2:30." Note that the alert message 504 in this example incorporates a timer to indicate remaining time as discussed previously. Additionally, the reminder section 506 is configured as a simple list of notifications rather than having the groups and details represented in relation to FIG. 3. Further, a darker color scheme is depicted to represent power efficient scheme selection and dimmed presentation that may occur in conjunction with the low power mode.

Figure 6:
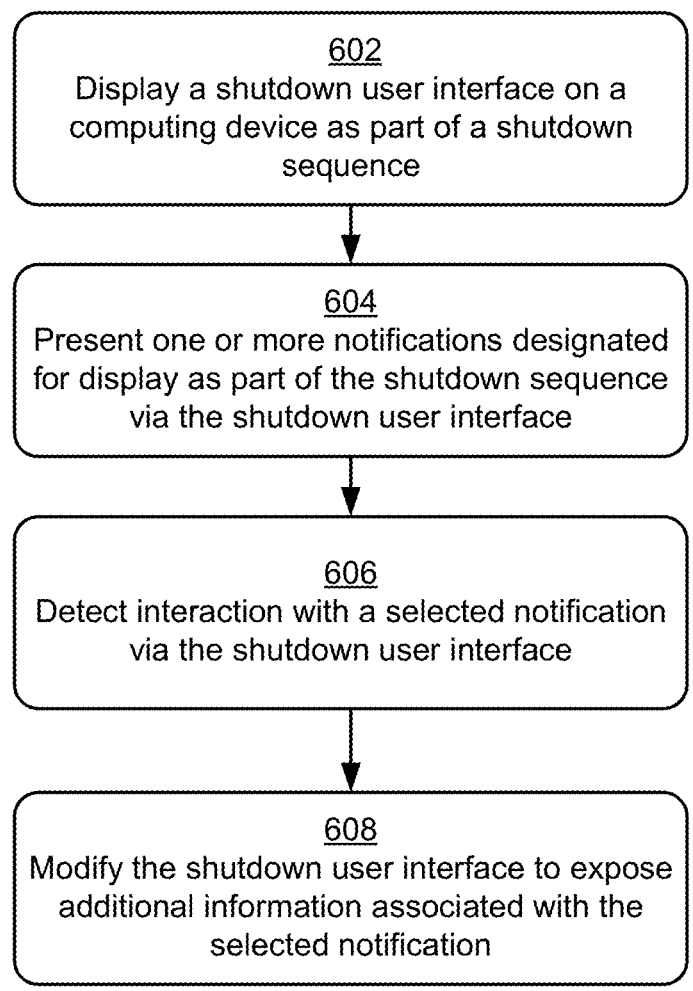
FIG. 6 is a flow diagram that depicts an example procedure for interaction with shutdown notifications in accordance with one or more implementations.

FIG. 6 is a flow diagram that depicts an example procedure 600 for interaction with shutdown notifications in accordance with one or more implementations. A shutdown user interface is displayed on a computing device as part of a shutdown sequence (block 602) and one or more notifications designated for display are presented as part of the shutdown sequence via the shutdown user interface (604). For example, a notification system 116 as described previously may be implemented to determine notifications designated for display during shutdown, obtain the notifications, and configure user interfaces to present the notifications in various ways, including employing any of the techniques and examples described in relation to FIGS. 1 to 5 as well as in the following discussion.

Interaction with a selected notification via the shutdown user interface is detected (block 606). In response to the interaction, the shutdown user interface is modified to expose additional information associated with the selected notification (block 608). For example, one or more of the notifications presented via a shutdown user interface may be selectable to access additional content regarding the notifications. This may involve expanding the representation of the selected notification in response to the interaction to show an expanded view. The user interface may be modified accordingly to selectively show expanded and compact view of notifications.

In addition or alternatively, the modification may involve linking into an underlying application corresponding to the selected notification to provide access to additional information and enable user interaction with functionality provided by the application. The interaction to initiate linking can be accomplished in any suitable way such as, by way of example and not limitation, through a touch gesture, natural user interface (NUI) gesture, an input device selection, and the like. In one approach, linking involves launching or otherwise activating the application and rendering a split screen to show the additional information from the application along with a view of the alert information contained in the shutdown user interface. In addition or alternatively, the shutdown user interface may be minimized and a separate user interface associated with the application may be exposed. Linking directly from the shutdown user interface enables a user to quickly and efficiently take action in response to last minute notifications without having to manually navigate to find and launch the particular application.

Figure 7:
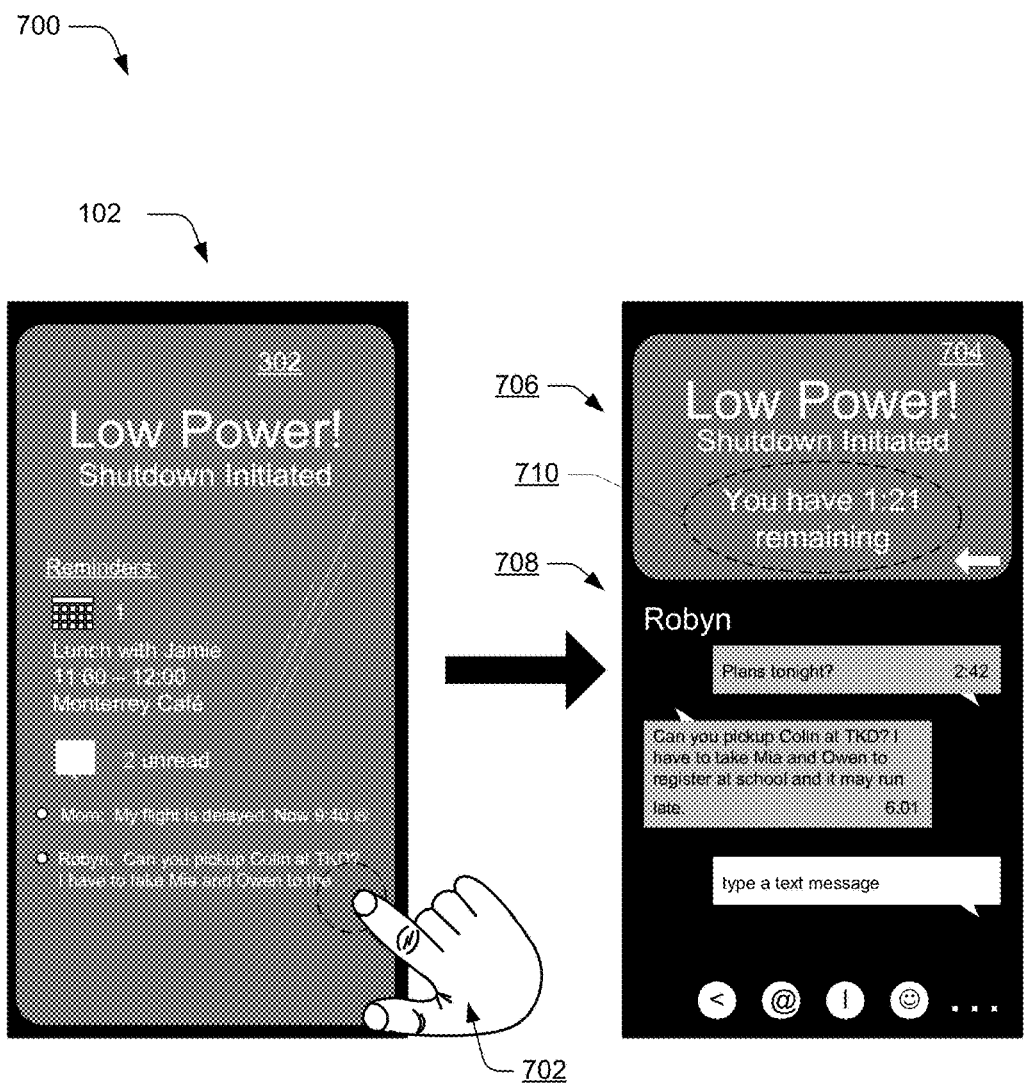
FIG. 7 illustrates an example interaction scenario to access details of a shutdown notification in accordance with one or more implementations.

As an example, consider FIG. 7 which illustrates generally at 700 an example interaction scenario to access details of a shutdown notification in accordance with one or more implementations. In this scenario, the shutdown user interface 302 described in relation to FIG. 3 is again depicted. As mentioned, at least some notifications presented in connection with a shutdown sequence may be selectable to access further content and functionality related to the notifications. In this example, interaction 702 is illustrated. In particular, the interaction 702 is represented as touch interaction to select a notification indicative of a text message from one of the user's contacts, namely "Robyn".

In response to the interaction 702, the shutdown user interface 302 may be modified to expose additional information associated with the selected notification in various ways discussed above. The scenario of FIG. 7 represents linking to an underlying application, in this case a messaging application associated with the selected text message. As a result, a modified user interface such as the example shutdown user interface 704 may be displayed. Shutdown user interface 704 is configured to present a split screen (or multiple windows) in which both a shutdown alert portion 706 and a linked application view 708 are shown.

The shutdown alert portion 706 may contain a compact view of the alerts and/or reminder shown in the shutdown user interface 302. The shutdown alert portion 706 may be minimized down to a compact bar or window view (as illustrated) that contains less information that the full view of the shutdown user interface 302. In an implementation, shutdown alert portion 706 may contain or be configured as a navigation control selectable to return back to the full view (e.g., shutdown user interface 302). As represented, the shutdown alert portion 706 may optionally include a representation 710 of a timer that indicates remaining time before shutdown. In this scenario, the timer provides continuous feedback on the shutdown timing so that the user is continually advised of how long they have to interact with the linked application and/or take other action before complete shutdown occurs.

The linked application view 708 provides access to additional content for the notification, which in this case is shown as a portion of a messaging thread with the contact "Robyn." The linked application view 708 may also provide access to functionality to take action with respect to the notification, such as to prepare and send a quick responsive text message prior to shutdown. Thus, the linked application view 708 may provide access to application functionality directly through the shutdown experience without having to back out and manually launch the application.

Figure 8:
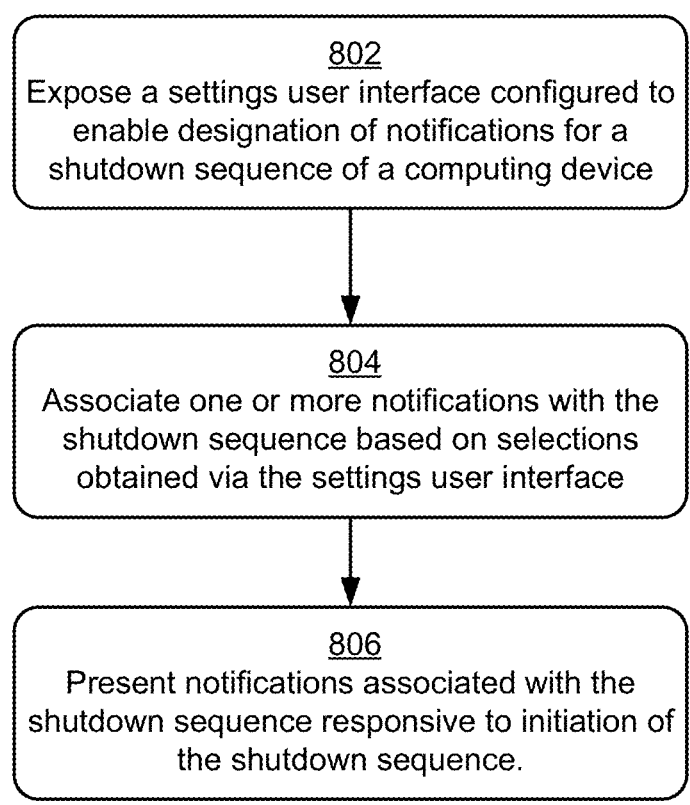
FIG. 8 is a flow diagram that depicts an example procedure for designation of shutdown notifications in accordance with one or more implementations.

FIG. 8 is a flow diagram that depicts an example procedure 800 for set-up of shutdown notifications in accordance with one or more implementations. A settings user interface is exposed that is configured to enable designation of notifications for a shutdown sequence of a computing device (block 802). For example, an operating system 112 for a computing device 102 may provide a user experience to manage settings for various applications, including settings for the notification system 116 with respect to shutdown notifications. Alternatively, settings for the notification system 116 may be accessed directly through the notification system. In either case, a settings user interface may be provided that enables user selections to designate notifications to include at shutdown and/or to set-up customized notifications.

One or more notifications are associated with the shutdown sequence based on selections obtained via the settings user interface (block 804). For instance, the settings user interface may provide functionality to select different types of notifications from a list of available notifications, such as text messages, calendar events, to-do-list items, social updates, email notices, and so forth. The settings user interface may also enable selections to designate particular applications and/or user contacts for which shutdown notifications are activated. Various examples regarding designation of notifications are described throughout this document. Moreover, an option to turn shutdown notifications on or off may also be provided. Thus, users may interact with the settings user interface to specify one or more various sets of notifications to present upon shutdown. The notification system 116 may be configured to maintain or access a list, data file, data structure, or other suitable data that is indicative of the selected notification types, applications, contacts, and so forth. The notification system 116 is therefore configured to recognize and obtain appropriate notifications that are designated for display during a shutdown sequence using the mentioned list or other indicative data.

Notifications associated with the shutdown sequence are presented responsive to initiation of the shutdown sequence (block 806). The notifications may be presented in various ways using any of the example techniques and user interfaces described herein. For example, a user interface may be configured to include notifications in accordance with procedure 200 of FIG. 2. Any suitable interfaces may also be employed, including the examples discussed in relation to FIGS. 3-5 and 7. Further, modifications of the user interface may occur in response to interaction with one or more notifications in accordance with procedure 600 of FIG. 6.

Figure 9:
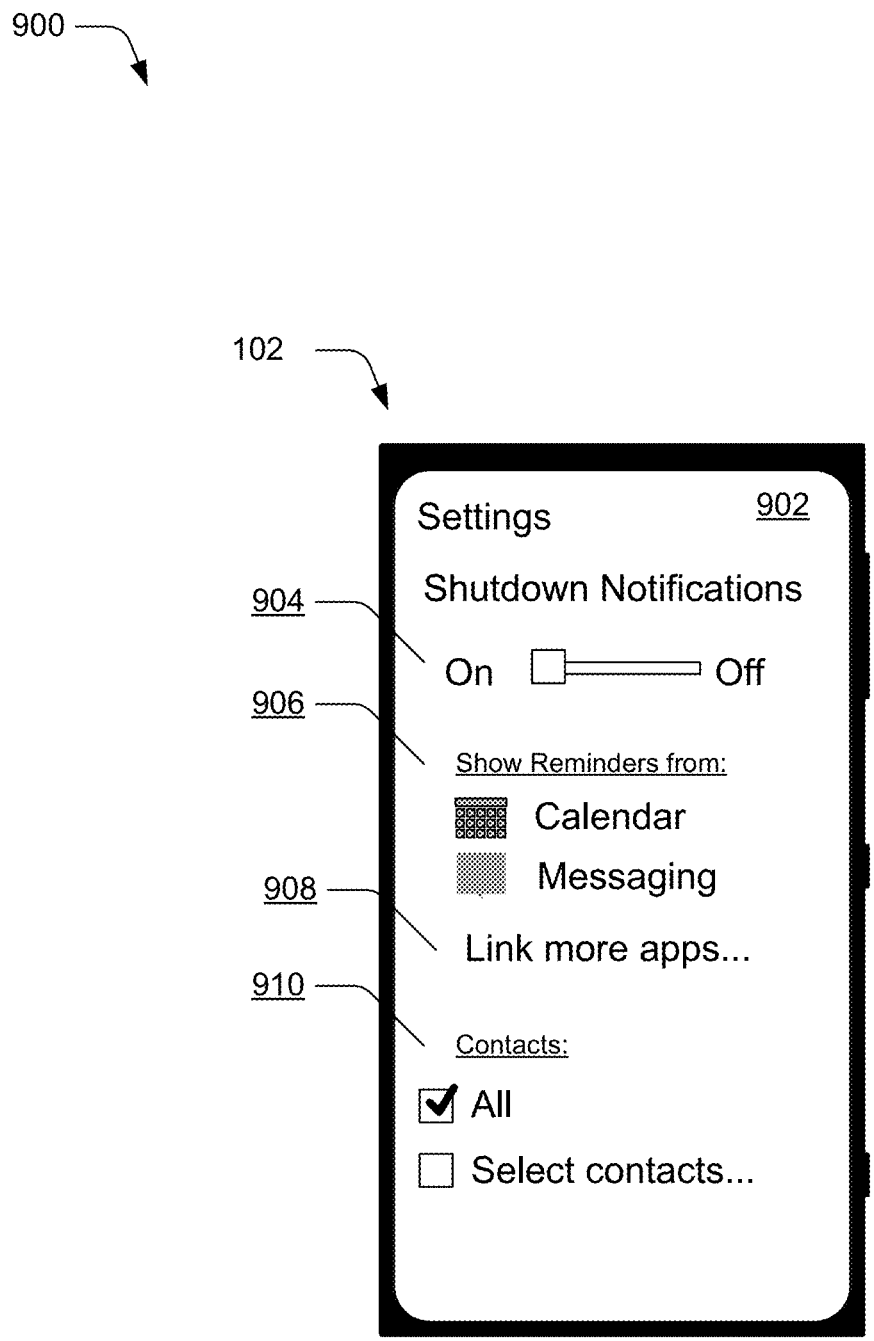
FIG. 9 illustrates an example settings user experience for configuration of shutdown notifications in accordance with one or more implementations.

As an example, FIG. 9 illustrates generally at 900 an example settings user experience for configuration of shutdown notifications in accordance with one or more implementations. In particular, a representative settings user interface 902 is depicted that provides various options selectable to configure shutdown notifications. The settings user interface 902 may be accessed via a settings menu provided via an operating system 112, the notification system 116, or otherwise. Various settings and features related to shutdown notifications may be managed via the settings user interface 902 using any suitable user interface instrumentalities and controls.

By way of example and not limitation, the settings user interface 902 is illustrated here as having a toggle control 904 operable to selectively turn shutdown notifications on and off. Further, the settings user interface 902 includes an application selection portion 906 showing applications for which shutdown notifications are selected. Various functionality for selection and deselection of applications may be provided via the portion. For instance, application selection portion 906 may include a link control 908 or other suitable control(s) operable to add more applications to the selected set of applications and/or remove selected applications. The settings user interface 902 further includes include a contacts selection portion 910 showing contacts for which shutdown notifications are selected. Various functionality for selection and deselection of contacts may also be provided via the portion. For instance, checkbox controls (as illustrated) or other types of controls may be employed to select or deselect contacts including selection of all contacts or individual contacts. Contacts selection portion 910 may provide linked access to a contacts list to facilitate the interaction related to contact selection. Various other types of controls and UI arrangements related to selection of particular applications and contacts, as well as for settings corresponding to other types of shutdown notifications and customizations, are also contemplated.

Having considered example implementation details, consider now the following discussion of an example system which may be employed in one or more implementations to provide shutdown notifications described herein.

Example System

Figure 10:
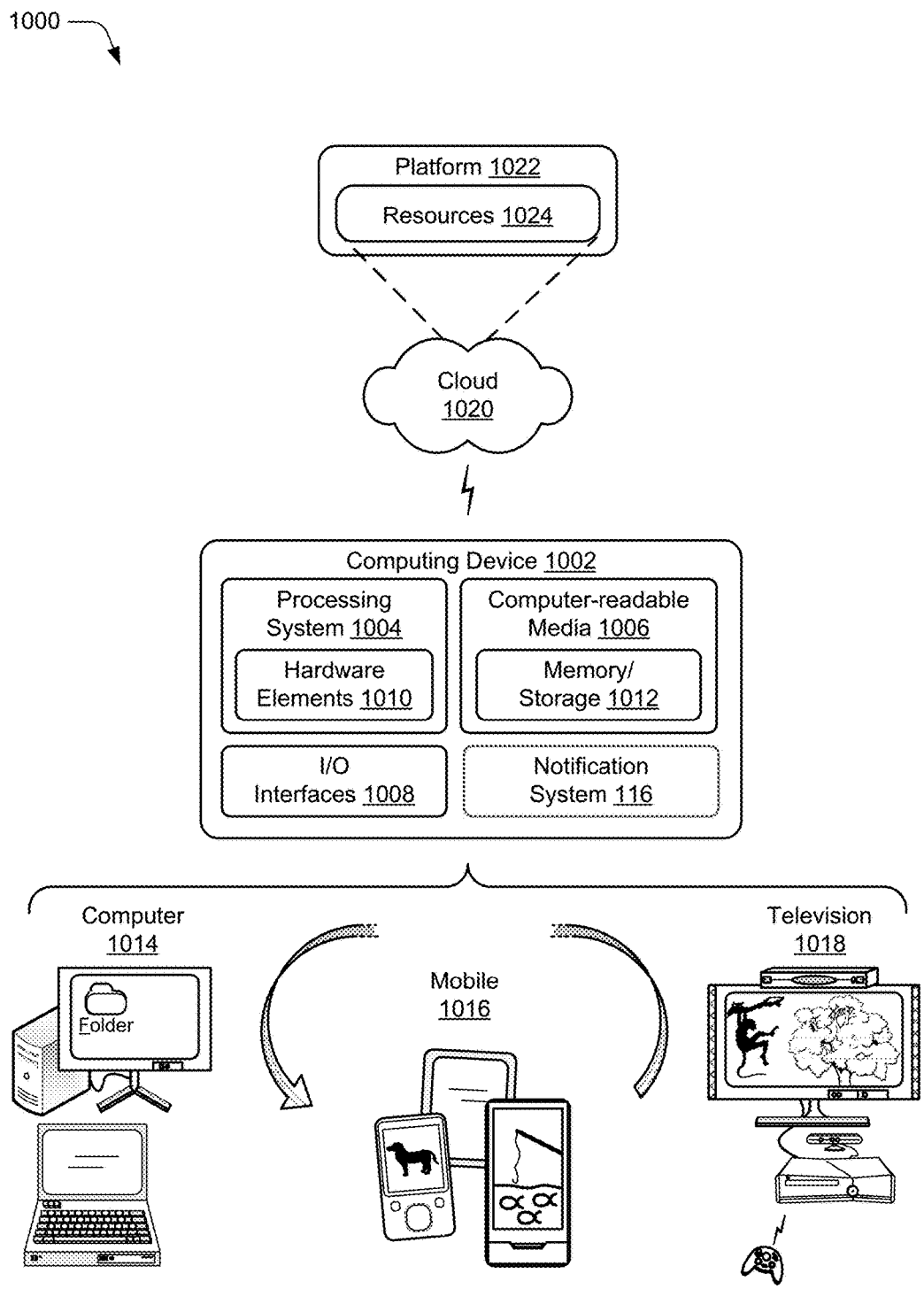
FIG. 10 illustrates an example system and components that can be configured as any type of system or device to implement aspects of the techniques described herein.

FIG. 10 illustrates an example system 1000 that includes an example computing device 1002 that is representative of one or more computing systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data.

Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to signal-bearing media that is configured to transmit instructions to the hardware of the computing device 1002, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including the operating system 112, applications 114, notification system 116, power manager 118 and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1014, mobile 1016, and television 1018 uses. Each of these configurations includes devices that may have generally different constructs and capabilities, and thus the computing device 1002 may be configured according to one or more of the different device classes. For instance, the computing device 1002 may be implemented as the computer 1014 class of a device that includes a personal computer, desktop computer, a multi-screen computer, laptop computer, netbook, and so on.

The computing device 1002 may also be implemented as the mobile 1016 class of device that includes mobile devices, such as a mobile phone, portable music player, portable gaming device, a tablet computer, a multi-screen computer, and so on. The computing device 1002 may also be implemented as the television 1018 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This is illustrated through inclusion of the notification system 116 on the computing device 1002. The functionality represented by the notification system 116 and other modules/applications may also be implemented all or in part through use of a distributed system, such as over a "cloud" 1020 via a platform 1022 as described below.

The cloud 1020 includes and/or is representative of a platform 1022 for resources 1024. The platform 1022 abstracts underlying functionality of hardware (e.g., servers) and software resources of the cloud 1020. The resources 1024 may include applications and/or data that can be utilized while computer processing is executed on servers that are remote from the computing device 1002. Resources 1024 can also include services provided over the Internet and/or through a subscriber network, such as a cellular or Wi-Fi network.

The platform 1022 may abstract resources and functions to connect the computing device 1002 with other computing devices. The platform 1022 may also serve to abstract scaling of resources to provide a corresponding level of scale to encountered demand for the resources 1024 that are implemented via the platform 1022. Accordingly, in an interconnected device embodiment, implementation of functionality described herein may be distributed throughout the system 1000. For example, the functionality may be implemented in part on the computing device 1002 as well as via the platform 1022 that abstracts the functionality of the cloud 1020.

CONCLUSION

Although techniques and aspects have been described in language specific to structural features and/or methodological acts, it is to be understood that the subject matter defined in the appended claims are not necessarily limited to the specific features or acts described. Rather, the specific features and acts are disclosed as example forms of implementing the claimed subject matter.

What is claimed is:

1. A method implemented by a computing device comprising: detecting initiation of a shutdown sequence to shut down the computing device in response to a low power condition, the shutdown sequence comprising:
    transitioning, in response to the low power condition, to a low power mode, the low power mode extending an amount of time a user interface is available for user interaction as part of the shutdown sequence;
    displaying an alert regarding shutdown of the computing device on the user interface;
    automatically determining availability of notifications that satisfy one or more criteria for display during the shutdown sequence;
    obtaining one or more notifications that satisfy the one or more criteria;
    configuring the user interface as part of the low power mode, to display the one or more notifications;
    detecting a user interaction to select one of the one or more notifications; and
    modifying the user interface, responsive to detecting the user interaction, to launch an application related to the selected notification while continuing to display the alert.

2. The computer-implemented method of claim 1, further comprising associating the one or more notifications with the shutdown sequence based on user designations received via a shutdown settings interface.

3. The computer-implemented method of claim 2, wherein the shutdown settings interface is configured to enable designation of notifications for display at shutdown according to one or more of notification type, application, or particular user contacts.

4. The computer-implemented method of claim 1, wherein the configuring the user interface comprises grouping the one or more notifications by notification type, application, or particular user contact.

5. The computer-implemented method of claim 1, wherein modifying the user interface to present the additional content comprises exposing a linked view of an application interface for an application associated with the selected one of the notifications to present the additional content in connection with the shutdown sequence.

6. The computer-implemented method of claim 1, wherein the notifications comprise user customized information corresponding to one or more applications of the computing device designated for display at shutdown.

7. The computer-implemented method of claim 1, wherein the notifications are configured to include one or more of calendar events, to-do-list items, text messages, voicemail indications, or emails.

8. The computer-implemented method of claim 1, wherein the user interface for display during the shutdown sequence further displays an alert message that indicates the amount of time remaining prior to shutdown.

9. The computer-implemented method of claim 1, wherein:
    the low power mode is implemented by a low power microprocessor and a primary processing system and an operating system of the computing device are shutdown to reduce power consumption; and
    configuring the user interface comprises intermittently outputting the user interface associated with the shutdown sequence to display the one or more notifications in the low power mode.

10. The computer-implemented method of claim 1, further comprising outputting the user interface via a persistent display configured to provide persistent display of the one or more notification after shutdown occurs.

11. A computing device comprising:
    a processing system;
    one or more computer readable storage media storing instructions which, when executed by the one or more processors, perform operations comprising:
        associating one or more notifications with a shutdown sequence of the computing device based on selections obtained via a settings user interface configured to enable designation of criteria for selection of notifications for the shutdown sequence;
        entering a low power mode responsive to a low power condition triggering the shutdown sequence, the low power mode extending an amount of time a shutdown user interface is available for user interaction as part of the shutdown sequence;
        displaying, in the shutdown user interface, an alert regarding shutdown of the computing device;
        presenting, in the shutdown user interface, the one or more notifications that are associated with the shutdown sequence and obtained automatically responsive to initiation of the shutdown sequence and during the shutdown sequence;
        detecting, in the low power mode, a user interaction to select one of the one or more notifications during the shutdown sequence; and
        modifying the shutdown user interface, responsive to detecting the user interaction, to launch an application related to the selected notification while continuing to display the alert.

12. The computing device of claim 11, wherein presenting the one or more notifications comprises:
    configuring the shutdown user interface associated with the shutdown sequence to include an alert regarding the shutdown sequence and representations of the notifications that are obtained; and
    outputting the shutdown user interface having the notifications for display via a display device associated with the computing device.

13. The computing device of claim 11, wherein presenting the one or more notifications comprises exposing the one or more notifications as part of a user experience for the shutdown sequence for a configurable length of time prior to shutdown of the computing device.

14. The computing device of claim 11, wherein the criteria for selection of notifications are configurable via the settings user interface to include information from a particular contact designated by a user.

15. The computing device of claim 11, wherein the criteria for selection of notifications are configurable via the settings user interface to include information from one or more applications designated by a user.

16. One or more computer readable storage media storing computer-readable instructions which, when executed by a processing system, implement a notification system configured to perform operations comprising:

displaying a shutdown user interface on a computing device as part of a shutdown sequence, the shutdown user interface including a displayed alert regarding shutdown of the computing device, the shutdown sequence triggered by a low power condition, and effective to cause the computing device to operate in a low power mode;

presenting, automatically and during the shutdown sequence, and as part of the low power mode, one or more notifications that satisfy one or more criteria to be designated for display as part of the shutdown sequence via the shutdown user interface at least partially concurrently with the displayed alert;

detecting, during the shutdown sequence, and in the low power mode, a user interaction with a selected notification via the shutdown user interface; and modifying the shutdown user interface to launch an application associated with the selected notification while continuing to display the alert.

17. The one or more computer readable storage media of claim 16, wherein said presenting further comprises prioritizing the one or more notifications based on perceived importance to present notifications deemed important to a user.

18. The one or more computer readable storage media of claim 16, wherein the one or more notifications designated for display as part of the shutdown sequence include one or more of: calendar events and to-do-list items from a personal information management application, text messages from a messaging application, emails associated with an email client, or social network alerts from a social networking application.

19. The one or more computer readable storage media of claim 16, wherein the displayed alert is configured to provide a representation of a timer to indicate time remaining prior to shutdown.

20. The one or more computer readable storage media of claim 16, further comprising displaying the one or more notifications on a persistent display after the shutdown sequence is completed.

* * * * *